(12) United States Patent
Dupré et al.

(10) Patent No.: US 8,818,841 B2
(45) Date of Patent: Aug. 26, 2014

(54) METHODS AND APPARATUS TO MONITOR IN-STORE MEDIA AND CONSUMER TRAFFIC RELATED TO RETAIL ENVIRONMENTS

(75) Inventors: William J. Dupré, Downers Grove, IL (US); Matthew C. Cakora, Plainfield, IL (US); Daniel G. Brown, Buffalo Grove, IL (US); Michael J. Zenor, Deerfield, IL (US); Frank W. Piotrowski, Arlington Heights, IL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 807 days.

(21) Appl. No.: 12/110,146

(22) Filed: Apr. 25, 2008

(65) Prior Publication Data

US 2008/0294476 A1   Nov. 27, 2008

Related U.S. Application Data

(60) Provisional application No. 60/949,769, filed on Jul. 13, 2007, provisional application No. 60/941,224, filed on May 31, 2007, provisional application No. 60/914,589, filed on Apr. 27, 2007.

(51) Int. Cl.
    *G06Q 10/00* (2012.01)
(52) U.S. Cl.
    USPC .......................... 705/7.37; 705/7.29; 705/7.38
(58) Field of Classification Search
    None
    See application file for complete search history.

(56) References Cited

U.S. PATENT DOCUMENTS

| | | | |
|---|---|---|---|
| 4,373,133 A | 2/1983 | Clyne et al. | |
| 4,888,709 A | 12/1989 | Revesz et al. | |
| 4,973,952 A | 11/1990 | Malec et al. | |
| 5,128,548 A | 7/1992 | Goodson et al. | |
| 5,287,266 A | 2/1994 | Malec et al. | |
| 5,331,544 A * | 7/1994 | Lu et al. | 705/7.29 |
| 5,465,115 A | 11/1995 | Conrad et al. | |
| 5,541,835 A | 7/1996 | Dextraze et al. | |
| 5,557,513 A * | 9/1996 | Frey et al. | 705/7.12 |
| 5,566,069 A | 10/1996 | Clark, Jr. et al. | |

(Continued)

FOREIGN PATENT DOCUMENTS

WO   2006058274   6/2006

OTHER PUBLICATIONS

Walters, Retail Promotions and Retail Store Performance: A Test of Some Key Hypotheses, Journal of Retailing, vol. 64, No. 2, Summer 1988, p. 153-80.*

(Continued)

*Primary Examiner* — David Rines
(74) *Attorney, Agent, or Firm* — Hanley, Flight and Zimmerman, LLC

(57) ABSTRACT

Methods and apparatus to monitor in-store media and consumer traffic related to retail environments are disclosed herein. In a disclosed example method to monitor a monitored establishment, a survey is presented to an auditor and a user-provided survey response is received indicative of a condition in a monitored establishment that affects an accuracy of shopper count information provided by the auditor. Instructions are displayed to the auditor to sequentially move to a plurality of predetermined locations in the monitored establishment and collect a shopper count corresponding to each of the predetermined locations. The example method also involves receiving and storing each of the plurality of shopper counts.

21 Claims, 45 Drawing Sheets

(56) References Cited

U.S. PATENT DOCUMENTS

| | | | |
|---|---|---|---|
| 5,640,002 A | 6/1997 | Ruppert et al. | |
| 5,699,244 A | 12/1997 | Clark, Jr. et al. | |
| 5,712,830 A * | 1/1998 | Ross et al. | 367/93 |
| 5,821,513 A | 10/1998 | O'Hagan et al. | |
| 5,867,110 A | 2/1999 | Naito et al. | |
| 5,884,278 A | 3/1999 | Powell | |
| 5,991,730 A | 11/1999 | Lubin et al. | |
| 5,995,015 A | 11/1999 | DeTemple et al. | |
| 6,091,956 A | 7/2000 | Hollenberg | |
| 6,133,947 A | 10/2000 | Mikuni | |
| 6,304,855 B1 | 10/2001 | Burke | |
| 6,327,573 B1 | 12/2001 | Walker et al. | |
| 6,386,450 B1 | 5/2002 | Ogasawara | |
| 6,563,529 B1 | 5/2003 | Jongerius | |
| 6,574,614 B1 | 6/2003 | Kesel | |
| 6,584,375 B2 | 6/2003 | Bancroft et al. | |
| 6,587,835 B1 | 7/2003 | Treyz et al. | |
| 6,647,269 B2 | 11/2003 | Hendrey et al. | |
| 6,654,047 B2 | 11/2003 | Iizaka | |
| 6,697,104 B1 | 2/2004 | Yakobi et al. | |
| 6,848,542 B2 | 2/2005 | Gailey et al. | |
| 6,911,908 B1 | 6/2005 | Beart | |
| 6,912,507 B1 | 6/2005 | Phillips et al. | |
| 6,928,343 B2 | 8/2005 | Cato | |
| 6,967,674 B1 | 11/2005 | Lausch | |
| 7,069,238 B2 | 6/2006 | I'Anson et al. | |
| 7,076,441 B2 | 7/2006 | Hind et al. | |
| 7,080,061 B2 | 7/2006 | Kabala | |
| 7,093,748 B1 | 8/2006 | Matsko et al. | |
| 7,127,261 B2 | 10/2006 | Van Erlach | |
| 7,148,803 B2 | 12/2006 | Bandy et al. | |
| 7,149,549 B1 | 12/2006 | Ortiz et al. | |
| 7,206,753 B2 | 4/2007 | Bancroft et al. | |
| 7,222,080 B2 | 5/2007 | Hale et al. | |
| 7,415,510 B1 | 8/2008 | Kramerich et al. | |
| 7,420,464 B2 | 9/2008 | Fitzgerald et al. | |
| 7,996,256 B1 * | 8/2011 | Anand et al. | 705/7.31 |
| 2002/0007295 A1 | 1/2002 | Kenny et al. | |
| 2002/0010655 A1 | 1/2002 | Kjallstrom | |
| 2002/0111847 A1 * | 8/2002 | Smith, II | 705/10 |
| 2003/0055707 A1 | 3/2003 | Busche et al. | |
| 2003/0097302 A1 | 5/2003 | Overhultz et al. | |
| 2004/0145658 A1 | 7/2004 | Lev-Ran et al. | |
| 2004/0224703 A1 | 11/2004 | Takaki et al. | |
| 2005/0006466 A1 | 1/2005 | Overhultz et al. | |
| 2005/0035198 A1 | 2/2005 | Wilensky | |
| 2005/0149398 A1 | 7/2005 | McKay | |
| 2005/0200476 A1 | 9/2005 | Forr et al. | |
| 2005/0201826 A1 | 9/2005 | Zhang et al. | |
| 2005/0203798 A1 | 9/2005 | Jensen et al. | |
| 2005/0234774 A1 | 10/2005 | Dupree | |
| 2005/0243784 A1 | 11/2005 | Fitzgerald et al. | |
| 2005/0273377 A1 * | 12/2005 | Ouimet et al. | 705/10 |
| 2006/0010027 A1 | 1/2006 | Redman | |
| 2006/0010030 A1 | 1/2006 | Sorensen | |
| 2006/0067456 A1 | 3/2006 | Ku et al. | |
| 2006/0106674 A1 | 5/2006 | Muller | |
| 2006/0111961 A1 | 5/2006 | McQuivey | |
| 2006/0161474 A1 | 7/2006 | Diamond et al. | |
| 2006/0200378 A1 * | 9/2006 | Sorensen | 705/10 |
| 2008/0002893 A1 | 1/2008 | Vincent et al. | |
| 2008/0002914 A1 | 1/2008 | Vincent et al. | |
| 2008/0002916 A1 | 1/2008 | Vincent et al. | |
| 2008/0077473 A1 | 3/2008 | Allin-Bradshaw et al. | |
| 2008/0086356 A1 | 4/2008 | Glassman et al. | |
| 2008/0126420 A1 | 5/2008 | Wright et al. | |
| 2008/0172282 A1 | 7/2008 | McNeill et al. | |
| 2008/0288209 A1 | 11/2008 | Hunt et al. | |
| 2008/0288538 A1 | 11/2008 | Hunt et al. | |
| 2008/0294372 A1 | 11/2008 | Hunt et al. | |
| 2008/0294487 A1 | 11/2008 | Nasser | |
| 2008/0294583 A1 | 11/2008 | Hunt et al. | |
| 2008/0294996 A1 | 11/2008 | Hunt et al. | |
| 2009/0012971 A1 | 1/2009 | Hunt et al. | |
| 2009/0144143 A1 | 6/2009 | Iyer | |

OTHER PUBLICATIONS

Walters and McKenzie, A Structural Equations Analysis of the Impact of Price Promotions on Store Performance, Journal of Marketing Research, vol. 25, No. 1, Feb. 1988, p. 51-62.*

Lam, Uncovering the Multiple Impacts of Retail Promotion on Apparel Store Performance, 1998, p. 1-259.*

Walters and Rinnie, An Empirical Investigation into the Impact of Price Promotions on Retail Store Performance, Journal of Retailing, vol. 62, No. 3, Fall 1986, p. 237-266.*

Clark, Julie. "Shopping with Detectives: Customer Tracking Takes the Mystery out of store Design (Digital Store)," Display and Design Ideas, May 2002 (v14, n5, p. 48, 2 pages).

Sirohi, Niren; McLaughlin, Edward W.; Wittink, Dick R. "A Model of Consumer Perceptions and Store Loyalty Intentions for a Supermaket Retailer," Journal of Retailing, Summer 1998 (vol. 74, Issue 2, 15 pages).

International Bureau, "International Preliminary Report on Patentability," issued in connection with PCT application Serial No. PCT/US2008/061643, issued Oct. 27, 2009 (7 pages).

Microsoft Dynamics Retail Management System (RMS) [Retrieved Apr. 28, 2008 from http://www.microsoft.com/dynamics/rms/default.mspx] (1 page).

International Searching Authority, "International Search Report", for counterpart PCT application Serial No. PCT/US2008/061643, mailed Dec. 31, 2008 (4 pages).

International Searching Authority, "Written Opinion", for counterpart PCT application Serial No. PCT/US2008/061643, mailed Dec. 31, 2008 (6 pages).

"In-store Advertising Audience Measurement Principles," Developed by Prime Consulting Group and ARF The Research Authority, Jul. 2003 (18 pages).

Mulhern and Leone, "Retail promotional advertising: Do the number of deal items and size of deal discounts affect store performance?", Journal of Business Research, vol. 21, Issue 3, Nov. 1990, pp. 179-194 (16 pages).

"Arbitron & Scarborough Unveil New Mall Shopper Audience Measurement", Radio Ink, Jun. 22, 2007 (1 page).

"Traffic Pro X", retrieved from http://www.trafficpro.com, 2005 (7 pages).

"Traffic Insight", retrieved from http://www.trafficinsight.com on Aug. 28, 2005, (2 pages).

"Success Stories—Invest Japan", Japan External Trade Organization, 2004 (2 pages).

"Beyond POS—Two Technologies That Can Significantly Increase Sales and Profits", Microsoft.com, May 2003 (9 pages).

ShopperTrak, Retail Traffic Analyzer, shoppertrak.com, 2006 (1 page).

United States Patent and Trademark Office, "Non-Final Office Action," issued in connection with U.S. Appl. No. 12/110,164, on Dec. 22, 2011 (12 pages).

United States Patent and Trademark Office, "Final Office Action," issued in connection with U.S. Appl. No. 12/110,164, on Jul. 26, 2012 (10 pages).

United States Patent and Trademark Office, "Non-Final Office Action," issued in connection with U.S. Appl. No. 12/110,095, on Sep. 23, 2011 (24 pages).

United States Patent and Trademark Office, "Notice of Allowance," issued in connection with U.S. Appl. No. 12/110,095, on Mar. 23, 2012 (22 pages).

United States Patent and Trademark Office, "Final Office Action," issued in connection with U.S. Appl. No. 12/110,164, on Jun. 26, 2013 (12 pages).

* cited by examiner

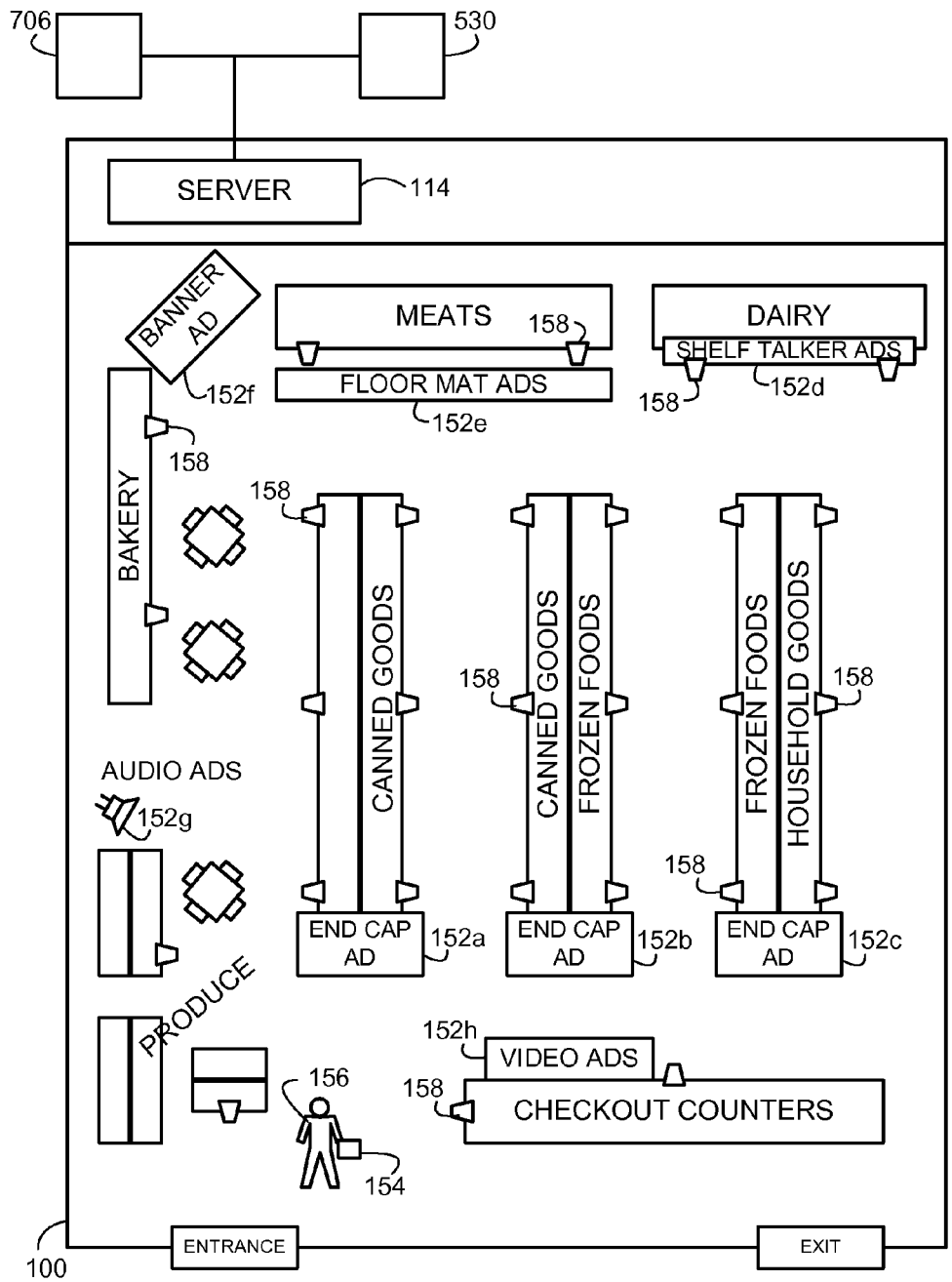
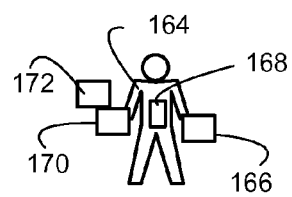
FIG. 1B

800 ⭢   ZONE-CATEGORY
         ASSOCIATION TABLE

| STORE TYPE | ZONE | CATEGORY |
|---|---|---|
| ZAY TYPE1 | 2 | SOUP |
| ZAY TYPE1 | 2 | FRUIT |
| ZAY TYPE1 | 3 | ICE CREAM |
| ZAY TYPE1 | 3 | PIZZA |
| ZAY TYPE1 | 3 | BREAKFAST |
| ZAY TYPE1 | 4 | DETERGENT |

| Data Requirement | Format / Example | Data Definition |
|---|---|---|
| Homescan Survey Identifier | | |
| Homescan ID | 1234567 | |
| Trip Date | 01/01/2007 | |
| Time | 12pm | |
| Chain | ALB | |
| From Homescan Survey | | |
| Demo Group | Adult Female<br>Adult Male<br>Kid Female<br>Kid Male | one record for each |
| # in shopping party | n | one number for each Demo Group |
| From Homescan PDF | | |
| Category Sales (1....n) | | |

STORE PRODUCT SALES DATA STRUCTURE

| Field Name | Size | Type | Location | Field Description |
|---|---|---|---|---|
| ID | 1 | X | 1 | U |
| Store no | 5 | N | 2 | Retailer Store number |
| UPC | 14 | N | 7 | UPC and PLU codes-zero filled. If UPC's have check digits, then all PLU codes must have a digit in the check digit field as well. |
| Type | 1 | X | 21 | not used at this time |
| Sale Date | 8 | N | 22 | The date of the actual sale if providing daily data reports, with 2 digit month, 2 digit day and 4 digit year, otherwise zero fill. |
| Description | 30 | X | 30 | Description of the product |
| Size | 10 | X | 60 | Size and Size description of product |
| Case | 4 | X | 70 | Number of individual items in case - not required |
| Price Multiplier | 2 | N | 74 | The number of products purchased to receive price. |
| Price | 10 (8.2) | N | 76 | Sale price for this UPC at this Price/Price Multiple. Decimal implied |
| Qty of Units or Pounds Sold | 10 (8.2) | N | 86 | Total number of units sold for this UPC, at this price point. Implied Decimal for weighted items |
| Total Dollars | 10 (8.2) | N | 96 | Total Dollars for this UPC at this Price/Price Multiple. Decimal implied |
| Dept No | 4 | N | 106 | The Retailer designated Department Number for this UPC. Recommended breakdowns might include bakery, floral, pharmacy, fresh fruit & veg., farm stand, meat, fish, and deli. |
| Sub Dept | 4 | N | 110 | The Retailer designated Sub Department Number for this UPC - not required |
| Sale or TPR flag | 2 | X | 114 | A numeric or alpha identifier (flag) is recorded for each every unique price point. A separate record is therefore generated for every UPC/Price/Price Point combination. |
| Coupon flag | 2 | X | 114 | |
| Major Ad flag | 2 | X | 114 | |
| Line AD flag | 2 | X | 114 | |
| Display flag | 2 | X | 114 | |
| Preferred or Frequent Shopper flag | 2 | X | 114 | |
| Regular Price | 2 | X | 114 | |
| Weight[1] | 10 (8.2) | N | 116 | Numeric sale weight with 2- position explicit or implied decimal point, for weight based item sales. |
| Weight UOM | 2 | X | 126 | The literal value for the unit of measure for the weight field. Assumed value is pounds. Values must be "LB", "OZ", or blanks. |
| Transaction Count | 10 | N | 128 | Total number of transactions in which an item appears for the specified store period. |
| Blank | 4 | X | 138 | Blank |

SALES TRANSACTION (T-LOG) DATA STRUCTURE

| Field Name | Field Description | Example |
|---|---|---|
| Store Number | Retailer assigned unique store identifier. If store numbers are re-used across retail business units, additional content will be required to establish uniqueness. | 00001234 |
| Transaction Date | The date of the transaction with a 4 digit year, 2 digit month and 2 digit day | 20070402 |
| Transaction Time | The time of the transaction with 2 digit hour and 2 digit minute. (10:04am = 1004, 1:15pm = 1315) | 1004 |
| Basket ID | Unique basket or transaction identifier | 0001 |
| Checkout Lane | Unique checkout lane identifier | 0002 |
| Payment Method | (Optional) Unique code or string identifying payment method. Example: 00 = cash, 01 = credit, 02 = check, 04 = debit, 05 = exchange, 06 = other | 00 |
| Frequent Shopper Number | (Optional) Frequent shopper card number (if applicable) | 1234567654321 |
| Product Number | UPC and PLU code, zero filled.  EAN, GTIN, or LAC. | 000000004640 |
| Sales (Dollars) | Actual amount paid on transaction net of all electronic (linked) discounts. | 0.79 |
| Price | Price not excluding electronic (linked) discounts (commonly called regular price) | 1.19 |
| Net Price | Price or price per pound, net of all electronic (linked) discounts. | 0.99 |
| Price Quantity | Count of products available at above Price. I.e. 2 for $1.00 | 1 |
| Price Type | (Optional) Type indicator of pricing structure. Example: By X get Y, X-for pricing, BOGO, LQD, etc. | |
| Units or Packages Sold | Aggregate quantity for multi-scan of same product within a transaction. | 1 |
| Weight or Volume Sales | Weight value of random weight items | 0.80 |
| Weight UOM | LB, KG, GR, OZ, Length, Gallons, Liters, etc... else spaces | LB |
| Transaction Totals | (Optional) Aggregation record describing transaction totals including total dollars, unique item count and total electronic discounts received | |

FIG. 12

1400 

STORE REFERENCE DATA STRUCTURE

| Field Name | Field Description | Example |
|---|---|---|
| Store Number | Retailer assigned unique store identifier | 00001234 |
| Store Name | Retailer name of the store | XYZ STORES |
| Store Street Address | Physical street address of the store | 123 MAIN STREET |
| Store City | US Postal Service default name of the city | ANYTOWN |
| Store State | USPS State abbreviation | NJ |
| Store Zip | USPS ZIP including zip + 4 when available | 07436-0000 |
| Store Phone | Store Phone Number | (999) 999-9999 |
| Type | Outlet type - super center, etc. | SUPERCENTER |
| TDLINX | TDLinx store code if available else zeros. | 0000000 |

| Data Requirement | Format / Example | Data Definition |
|---|---|---|
| Store Information | | |
| Chain ID | ZAY | outlet 1 |
| Store ID | 1234 | TDLinx ID or Store Psuedo Code |
| Store Type | Layout A | Use assigned definition within Chain |
| Time Information | | |
| Time Stamp | 06/14/2007 16:00:00 | time when store sweep took place YYYYMMDD hh:mm |
| Day of Week | Thursday | Monday, Tuesday... |
| Time of Day | 12pm-4pm | 2-hour or 4-hour measurement period |
| Holiday | Yes/No | |
| Traffic Counts: values here are the raw traffic counts gathered from the 184 store Full Store Sweeps, arranged as zones, along with in/out door count. These will be used to construct the dependent variables. Inferred for the Scoring Model. | | |
| Zone Counts (1.....n) | n | Zones as defined in Capture Plan |
| Door Count (In) | n | In count, out count at store entrance, exit (two fields) |
| Door Count (Out) | n | In count, out count at store entrance, exit (two fields) |
| POS Sales Data: cumulative category sales for the store/time observation. Data can be sourced from either Tlog or RMS data. If from RMS, must be "day-parted" via homescan survey results. All categories coded from competitive categories; competitive categories are mapped into modeling categories from custom table. Scope includes deferred categories; EQ units are defined as counts. For Wal Mart, we will use a custom Wal Mart definition | | |
| Category Sales (1.....n) | $ | $ per category for the defined row store/time either from T Log or "day parted" RMS data |
| Baseline sales: depromoted sales for each category. Source: RMS data | | |
| Category Sales (1.....n) | $ | sum category baseline $ for defined store / time from RMS data |
| Basket penetration: % of baskets containing items from each category for the store/time. Source is Tlog. Potential use as predictor, and/or to identify average number of zone visits and conversion rate. If used as a model predictor, must be inferred from a model (e.g., trip mission) for the scored stores. | | |
| Category Sales (1.....n) | % | count (or %) of transactions containing each category for store/time from T Log data |
| Total # of transactions | n | total number of transactions for store / time |
| Chain Display Info: Used as a covariate in the model to control for expected display effects on traffic. Values: wgted % of category EQ Unit sales on display for the relevant chain/week. Source: Nielsen sample stores | | |
| Category Sales (1.....n) | % | baseline-weighted % of each category EQ Unit sales on display for store / time from RMS data |
| POS Volume Data: cumulative category EQ unit sales for the store/time observation. Data can be sourced from either Tlog or RMS data. If from RMS, must be "day-parted". | | |
| Category Sales (1.....n) | $ | EQ units per category for the defined row store/time either from T Log or "day parted" RMS data |

FIG. 15

OUTPUT MEASURES

METHODS AND APPARATUS TO MONITOR IN-STORE MEDIA AND CONSUMER TRAFFIC RELATED TO RETAIL ENVIRONMENTS

RELATED APPLICATIONS

This patent claims the benefit of U.S. Provisional Application No. 60/914,589, filed Apr. 27, 2007, U.S. Provisional Application No. 60/941,224, filed May 31, 2007, and U.S. Provisional Application No. 60/949,769, filed Jul. 13, 2007, all of which are hereby incorporated herein by reference in their entireties.

FIELD OF THE DISCLOSURE

The present disclosure relates generally to consumer monitoring and, more particularly, to methods and apparatus to monitor in-store media and consumer traffic related to retail environments.

BACKGROUND

Retail establishments and product manufacturers are often interested in the shopping activities, behaviors, and/or habits of people in a retail environment. Consumer activity related to shopping can be used to correlate product sales with particular shopping behaviors and/or to improve placements of products, advertisements, and/or other product-related information in a retail environment. Known techniques for monitoring consumer activities in retail establishments include conducting surveys, counting patrons, and/or conducting visual inspections of shoppers or patrons in the retail establishments.

Acquiring information related to shopping activities, behaviors, and/or habits of people in a retail environment enables retail establishments to arrange their store and product layouts in a manner that is most conducive to maximizing sales of such products by positively influencing shoppers. Acquiring such information also enables product manufacturers to design product packaging that influences shoppers exhibiting certain behaviors or shopping patterns and/or to design different product packaging to target different shopper behaviors, patterns, or habits associated with different geographic areas. Advertisers can also benefit from metering shopping activities, behaviors, and/or habits of people in a retail environment by using such information to create more effective advertisements and/or position advertisements in more opportune locations within different retail establishments. In addition, advertisers can assess which advertisements are more effective than others.

BRIEF DESCRIPTION OF THE DRAWINGS

FIG. 1B illustrates the plan view of the example retail establishment of FIG. 1A in connection with a plurality of in-store advertisement/informational media located therein.

FIG. 8 depicts a product category data structure configured to associate product categories with respective zones in a retail establishment.

FIG. 9 depicts an example home survey that may be used to obtain demographic and shopping information from panel members of a Homescan® metering program.

FIG. 11 depicts an example store product sales data structure that may be used to store the store product sales data of FIG. 10.

FIG. 12 depicts an example sales transaction data structure that may be used to store the sales transaction data of FIG. 10.

FIG. 14 depicts an example store reference data structure that may be used to store the store reference data of FIG. 13.

FIG. 15 depicts an example data structure that may be used to organize information collected using the example methods and apparatus described herein.

DETAILED DESCRIPTION

Figure 1A:
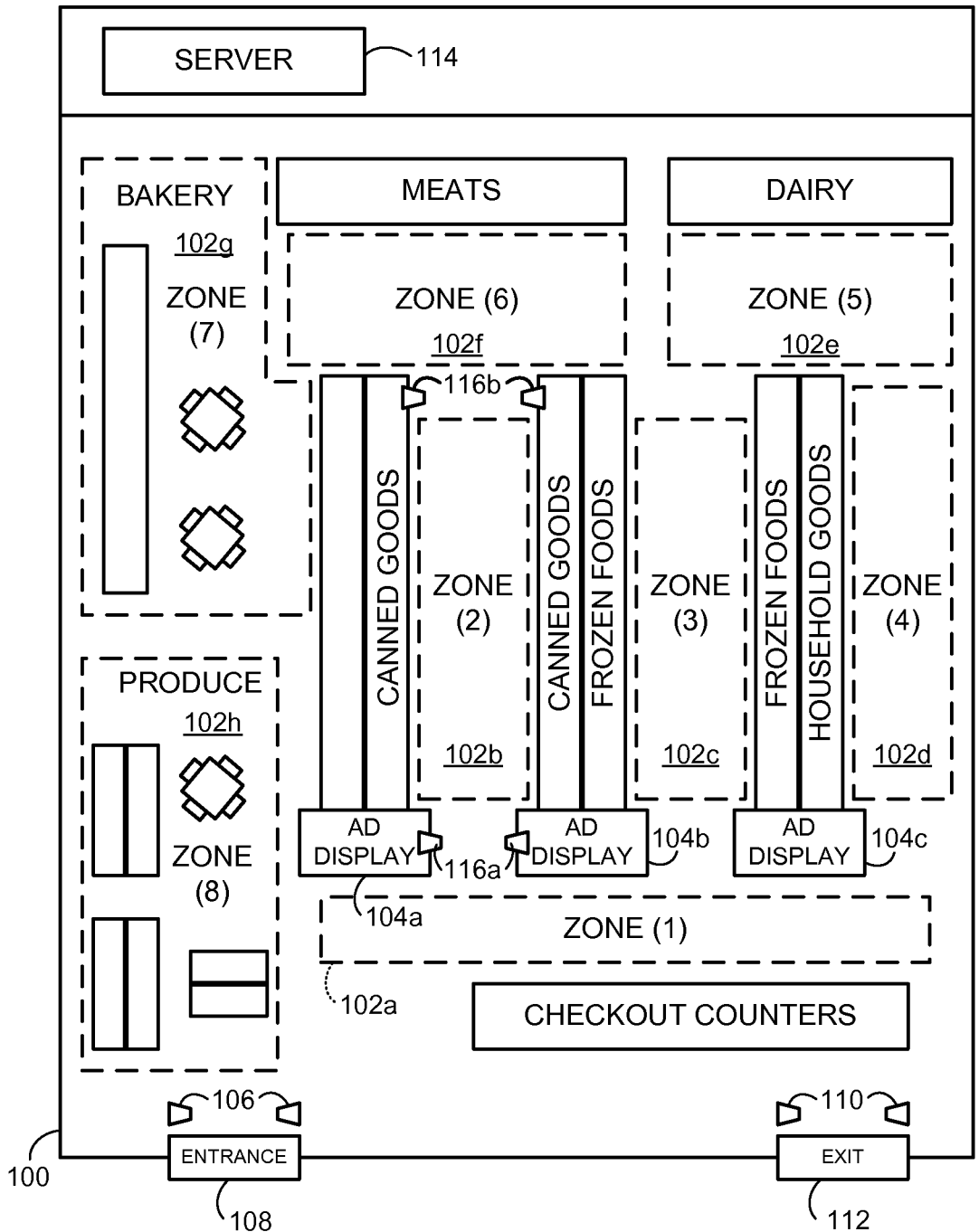
FIG. 1A illustrates a plan view of an example retail establishment having a plurality of product category zones.

Although the following discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, or in any combination of hardware and software. Accordingly, while the following describes example methods, systems, and apparatus, persons having ordinary skill in the art will readily appreciate that the examples provided are not the only way to implement such methods, systems, and apparatus.

The example methods and apparatus described herein may be implemented by a consumer metering entity, by retail businesses, or by any other entity interested in collecting and/or analyzing information to monitor in-store media, consumer exposure to in-store media, and consumer traffic related to retail establishments. The example methods and apparatus may be used to help marketing and media professionals better understand shoppers and how to reach and influence shoppers that buy goods in retail establishments. For example, by monitoring in-store advertising or informational media, the example methods and apparatus described herein can be used to determine when advertising or informational media for products and/or services were displayed and/or presented and the locations of those media in a retail establishment. The temporal and location information of the advertising or informational media can then be used by product suppliers/manufacturers and advertising companies to verify that their in-store media was displayed correctly (e.g., in accordance with terms of an agreement with the retail establishment). In addition, the temporal and location information of the advertising or informational media can be correlated with purchase histories to determine how the in-store media affected consumer purchases. Additionally or alternatively, the temporal and location information can be correlated with shopper location information indicative of paths traveled by shoppers through retail establishments to determine when shoppers were exposed to in-store media in retail establishments. In-store media can include informational/advertising media such as, for example, banners, floor graphics, videos presented on video screens, shelf talkers, shelf trays, hanging mobiles, coupon dispensers, shopping cart talkers, case stackers, cooler/refrigerator displays, countertop displays, display packaging, end cap displays, floor stands, illuminated displays, inflatable displays, kiosks, pallet displays, power wings/sidekicks, wall and slat wall displays, header boards, in-store print media, in-store radio ads, product sampling programs, shelf dividers, posters, street tri-pods, etc.

To monitor consumer traffic related to a retail establishment, the methods and apparatus described herein can be used to track the quantity of shoppers in the retail establishment and the quantities of shoppers in different zones of the retail establishment. For example, the methods and apparatus described herein can be used to partition a retail establishment into a plurality of zones. Each zone is associated with one or more particular types of products. By associating historical quantities of shoppers in particular zones over time and historical purchases of products associated with those zones, the example methods, system, and apparatus described herein can use the product sales data to estimate or forecast shopper traffic through the retail establishment. In addition, by associating shopper quantities per zone with product purchase history, the example methods and apparatus described herein can be used to generate information indicative of the influence of in-store media located in those zones.

To monitor consumer traffic, the methods and apparatus described herein can be configured to employ one or more different techniques to track or monitor the quantities of shoppers in the various zones of a retail establishment. Some example counting techniques involve a metering entity employing people (e.g., people to perform stationary counter duties) to count shoppers in respective zones of a retail establishment. That is, the metering entity can assign each employed person a stationary location corresponding to a respective zone in the retail establishment for which the employed person is responsible for counting the number of shoppers that move through the zone over a specified amount of time (e.g., one or more hours per day). Other example counting techniques involve the metering entity installing a plurality of sensors or people detectors throughout different zones of a retail establishment that are configured to count the quantity of shoppers that move through the zones. Yet other example counting techniques involve the metering entity employing one or more people to audit various retail establishments throughout a day. For example, an auditor may be assigned to several retail establishments for which the auditor is responsible to collect various shopper counts for each establishment in a day. The auditor may drive or otherwise move from retail establishment to retail establishment performing walk-throughs or full store sweeps of the retail establishments to collect various shopper counts, each corresponding to a different zone of a retail establishment. In a full store sweep, the auditor enters a retail establishment and walks through the retail establishment via a predefined walk-through path designed to minimize the amount of time required to count shoppers in every zone of the retail establishment while ensuring a relatively high degree of accuracy in the shopper count values. During the full store sweep, the auditor stops briefly at predefined stopping points along the walk through path and counts the number of shoppers in a corresponding zone. The auditor then proceeds to the next predefined stopping point corresponding to the next zone to be counted. The auditor proceeds in similar fashion through the store until the auditor collects a count for each zone and exits the retail establishment. The auditor can collect counts for various stores in a similar fashion during a day and, in some cases, the auditor may be responsible for returning to the same retail establishments several times per day to collect various counts representative of shopper quantities at various times of day to generate day-parts count data. As used herein, a day-part is a morning, an afternoon, or an evening. However, day-part definitions can be defined differently so that a day is made up of fewer or more day-parts. In some example implementations, the metering entity can use a combination of one or more of the above-described techniques to count shoppers.

The example methods and apparatus described herein can also be used to forecast shopper traffic in retail establishments by collecting historical product/service sales information and quantities of shoppers (e.g., the monitored shopper traffic discussed above) in the retail establishments and in different zones of the retail establishments. When a retail establishment is partitioned into a plurality of zones, each of which is associated with a particular type of product and/or service, the methods and apparatus described herein can be used to collect historical product/service sales information and shopper quantities per retail establishment and per zone within each retail establishment. The historical product sales information and the historical shopper counts can be used to calibrate a shopper traffic count forecasting system that forecasts or predicts future shopper traffic. In particular, by associating historical quantities of shoppers in particular zones over time with historical purchases of products associated with those zones, the example methods and apparatus described herein can be used to forecast shopper traffic in the retail establishment or any other retail establishment based on subsequent sales of products. Alternatively, the example methods and apparatus can be used to estimate shopper traffic that occurred based on data of product sales that already occurred in a retail establishment. That is, instead of physically counting (e.g., in-person-based counts) or automatically counting (e.g., sensor-based counts) shoppers in a retail establishment, the example methods and apparatus may be used to generate a shopper traffic model that can receive previous product sales information and estimate a shopper traffic count based on the product sales information. In any case, whether the product sales occurred previously or the product sales are predictions of the sales activity that may occur, the methods and apparatus described herein can be used to estimate shopper traffic (based on previous product sales) or can be used to predict or forecast shopper traffic (based on product sales predicted to occur). Thus, where shopper traffic counts are described herein as being forecasted or predicted, shopper traffic counts could similarly be estimated, and whether shopper traffic counts are estimated or predicted depends on whether the provided sales data reflects sales that already occurred or sales that are predicted to occur. Similarly, where shopper traffic counts are described as being estimated, shopper traffic counts could similarly be forecasted or predicted for similar reasons. Also, where certain components are described as forecasting components (e.g., a shopper traffic forecasting system or apparatus), they could similarly be configured as estimating components (e.g., a shopper traffic estimating system or apparatus).

In some example implementations, the forecasted or estimated shopper traffic counts may be used to monitor consumer activity related to products, product categories, product promotional information, and in-store media (e.g., advertisement media) in retail establishments. For example, the forecasted or estimated shopper traffic counts may be used to help marketing and media professionals to better understand shoppers and how to reach and influence shoppers that buy goods in retail establishments. For example, by monitoring the forecasted or estimated shopper traffic counts in addition to in-store advertising or informational media, the forecasted or estimated shopper traffic counts can be used to determine the influential effects or potential future influential effects of advertising or informational media for products and/or services on shoppers. For instance, the forecasted or estimated shopper traffic counts may be used by product suppliers/manufacturers and advertising companies to make decisions on how to temporally and/or physically advertise their products and/or services.

The example methods and apparatus described herein can also be used to determine the influential effects of environmental conditions and/or temporal conditions on shoppers. For example, the methods and apparatus can be used to forecast shopper traffic at different seasons of the year, during which climate conditions (e.g., sunny conditions, high-temperature conditions, rainy conditions, snowy conditions, low-temperature conditions, etc.) can change significantly. In addition, the methods and apparatus can be used to forecast shopper traffic during different holiday times (e.g., national holidays, religious holidays, industry-created holidays, regional festivities or events, etc.).

FIG. 1A illustrates a plan view of an example retail establishment 100 having a plurality of product category zones 102a-h. In the illustrated example, the retail establishment 100 is a grocery store. However, the example methods and apparatus described herein can be used to monitor in-store media and consumer traffic in other types of retail establishments (e.g., department stores, clothing stores, specialty stores, hardware stores, etc.) or commercial establishments (e.g., entertainment venues, amusement parks, sports arenas/stadiums, etc.). The monitored retail establishments are classified into retail store types based on similar sets of store characteristics. Store types can include a grocery store type, a drug store type, a mass merchandise store type, a convenient store type, a fast food store type, a big-box store type, a bookstore type, a warehouse/club store type, or any other store types.

The product category zones 102a-h are assigned sequential numerical values and include a first zone (1) 102a, a second zone (2) 102b, a third zone (3) 102c, a fourth zone (4) 102d, a fifth zone (5) 102e, a sixth zone (6) 102f, a seventh zone (7) 102g, and an eighth zone (8) 102h. A zone is an area of a retail establishment in which a shopper can be expected to have the opportunity to select products and/or services to purchase and/or be exposed to advertising and/or informational media. The boundaries of a zone may relate to product layout throughout the retail establishment and/or natural boundaries that a person could relatively easily perceive. In some example implementations, zones are created based on the types of products that are sold in particular areas of a retail establishment. In the illustrated example, the first zone (1) 102a corresponds to a checkout line category, the second zone (2) 102b corresponds to a canned goods category, the third zone (3) 102c corresponds to a frozen foods category, the fourth zone (4) 102d corresponds to a household goods category, the fifth zone (5) 102e corresponds to a dairy category, the sixth zone (6) 102f corresponds to a meats category, the seventh zone (7) 102g corresponds to a bakery category, and the eighth zone (8) 102h corresponds to a produce category. A department store may have other types of zones in addition to or instead of the category zones 102a-h of FIG. 1A that may include, for example, a women's clothing zone, a men's clothing zone, a children's clothing zone, a household appliance zone, an automotive hardware zone, a seasonal items zone, a pharmacy zone, etc.

In the illustrated example, the retail establishment 100 may include different types of in-store media including, for example, the advertisement displays 104a-c. The advertisement displays 104a-c may be implemented using posters, floor mats, video screens, etc. Although not shown, other product advertisement or informational media (e.g., banners, floor graphics, videos presented on video screens, shelf talkers, shelf trays, hanging mobiles, coupon dispensers, shopping cart talkers, case stackers, cooler/refrigerator displays, countertop displays, display packaging, floor stands, illuminated displays, inflatable displays, kiosks, pallet displays, power wings/sidekicks, wall and slat wall displays, header boards, in-store print media, in-store radio ads, product sampling programs, shelf dividers, posters, street tri-pods, etc.) can also be located throughout the retail establishment 100.

To count shoppers in the retail establishment 100 using a sensor-based or automated counting technique, a people detector 106 is provided at an entrance passageway 108 of the retail establishment 100 and another people detector 110 is provided at an exit passageway 112 of the retail establishment 100. The detectors 106 and 110 are communicatively coupled to a local server 114 located in or proximate to the retail establishment 100. The people detector 106 detects each person that walks into the retail establishment 100 through the entrance passageway 108. For each person detected, the people detector 106 can increment an entrance shopper count value stored in a memory coupled to the people detector 106 and subsequently communicate the entrance shopper count value to the local server 114. Alternatively, the people detector 106 can communicate a signal to the local server 114 for each person detected and the local server 114 can increment an in-store shopper count value stored therein.

The people detector 110 located at the exit passageway 112 detects each person that exits the retail establishment 100 through the exit passageway 112 and increments a locally stored exit shopper count value. The people detector 110 can then subsequently communicate the exit shopper count value to the local server 114 and the local server 114 can subtract the exit shopper count value from the in-store shopper count value to update the in-store shopper count value to indicate the quantity of shoppers in the retail establishment 100 each time a shopper exits the retail establishment 100. Alternatively, the people detector 110 at the exit passageway 112 can communicate a signal to the local server 114 each time it detects a shopper exiting the retail establishment 100, and the local server 114 can decrement the in-store shopper count value to update the quantity of shoppers in the retail establishment 100.

In the illustrated example, some of the category zones 102a-h are also provided with people detectors to count the shoppers located in those zones. In particular, zone (2) 102b is provided with end-zone people detectors 116a and 116b. The end-zone people detectors 116a-b are located at opposing ends of zone (2) 102b to determine quantities of people in zone (2) 102b at particular time(s) (e.g., based on time intervals or times of day). In the illustrated example, the end-zone people detectors 116a-b are configured to sense the direction of travel of a person to determine whether a shopper is entering or leaving the zone (2) 102b and to update a count value based on whether the detected shoppers are entering or leaving. Although not shown, end-zone people detectors substantially similar or identical to the end-zone people detectors 116a-b may be provided for any or all of the category zones 102a and 102c-h. Also, in alternative example implementations, other types of people detectors may be installed in the category zones 102a-h to determine quantities of people in those zones. The people detectors 106 and 110 and the end-zone people detectors 116a-b may be implemented using infrared technologies, ultrasonic technologies, electromagnetic technologies or any other suitable type of technology.

Figure 2:
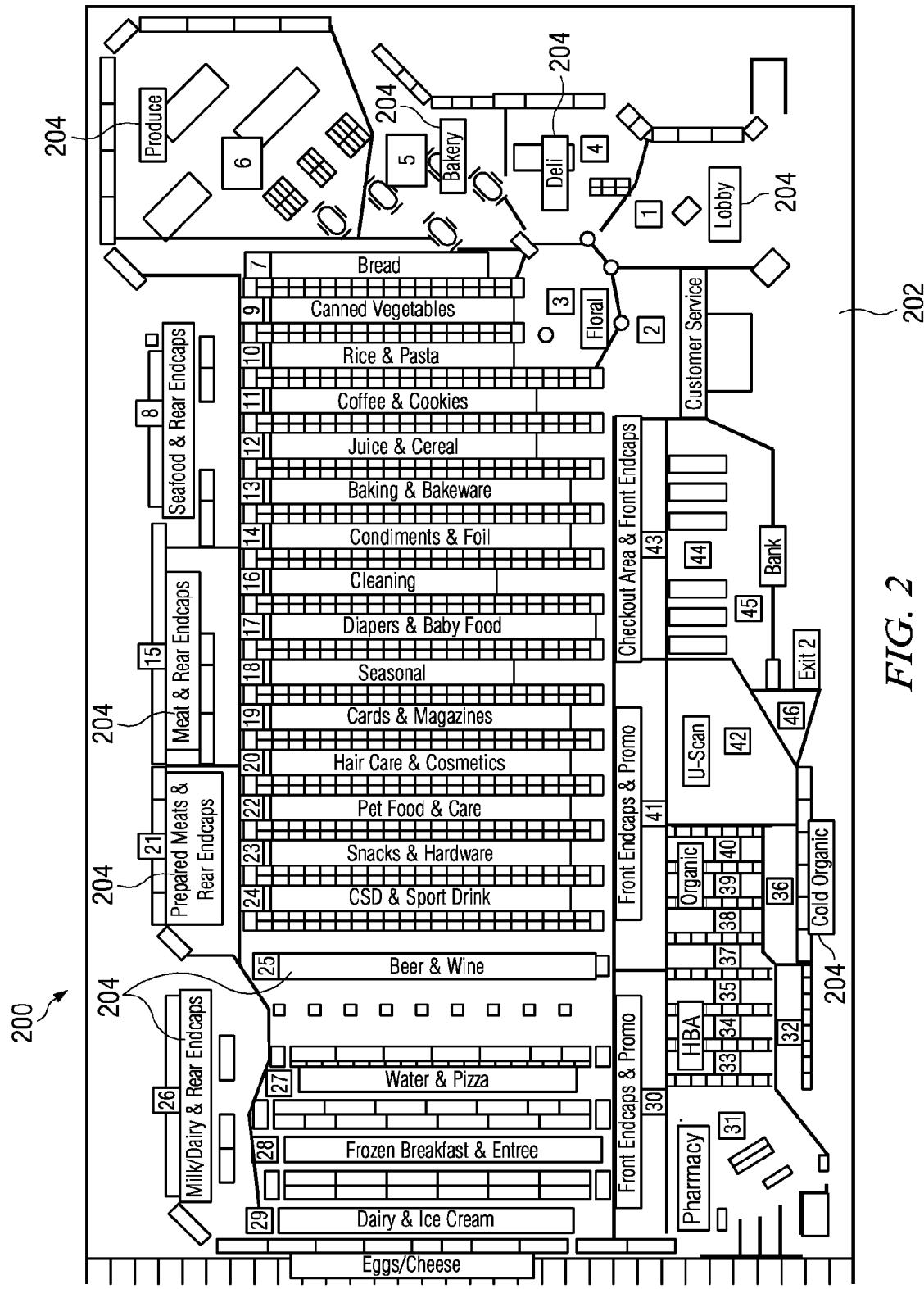
FIG. 2 illustrates a computer aided drawing of another example retail establishment having overlaid product category zone information.
Figure 7:
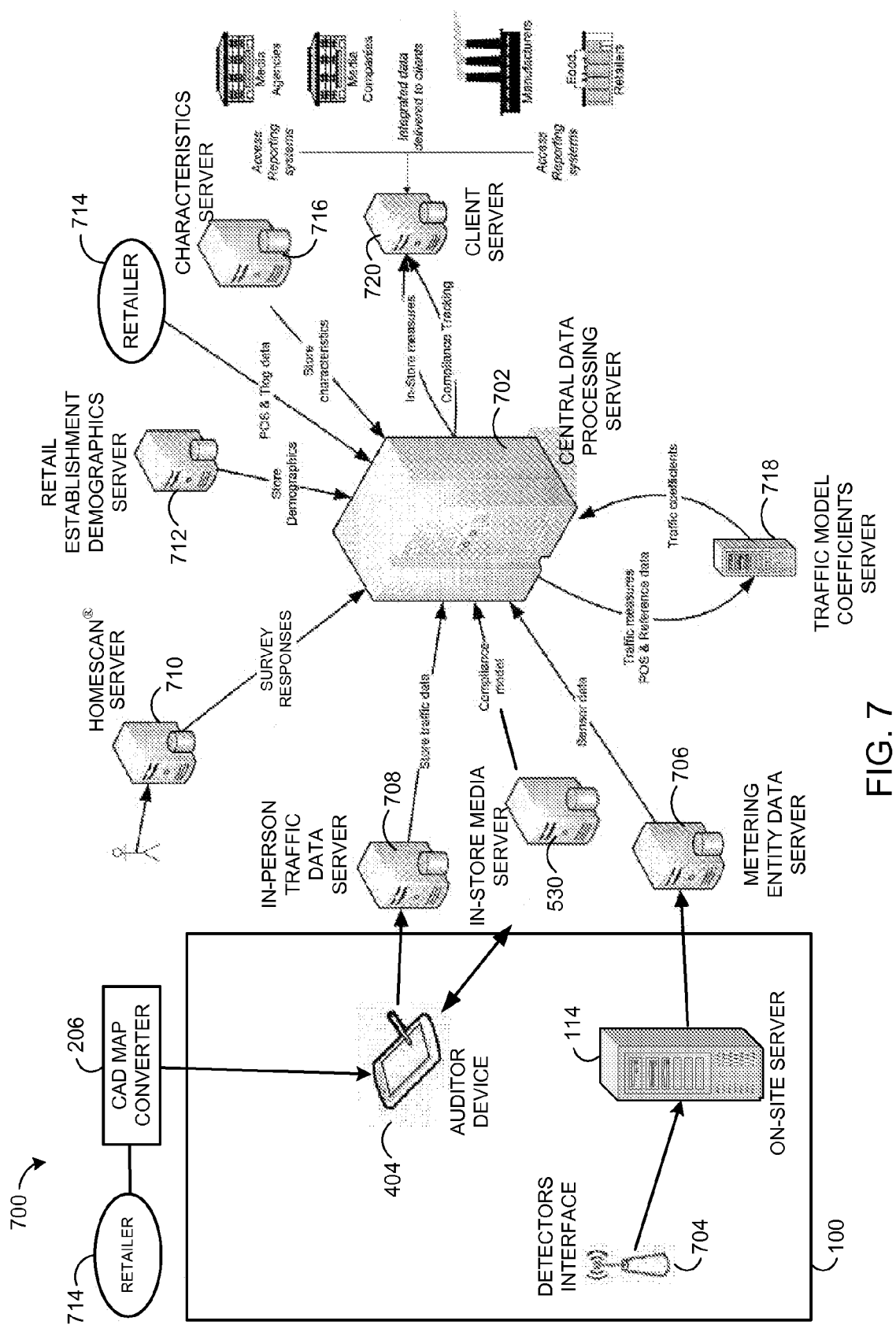
FIG. 7 depicts an example system configured to implement a syndicated retail establishment metering service for a plurality of retail establishments to generate, collect, and process in-store metering information and deliver analysis results to clients of the metering service using the example methods and apparatus described herein.

The methods and apparatus described herein can be used to employ substantially the same techniques to monitor a plurality of retail establishments. A plan view category zone diagram depicting zone information similar to the zone information shown in the plan view of FIG. 1A can be generated for each monitored retail establishment using a software program configured to import a computer aided design (CAD) drawing of a store and to overlay category zone information similar to the category zones 102a-h of FIG. 1A onto the CAD drawing. Turning to FIG. 2, a category zone map 200 of another example retail establishment 202 having overlaid category zone information 204 may be generated using a CAD map converter 206 (FIG. 7). The CAD map converter 206 may be implemented using software and/or hardware and can be configured to detect where product category zones should be located based on structural elements (e.g., shelf units, walls, refrigeration units, etc.) detected in the drawings. The program can then overlay the category zone information 204 onto the areas of the category zone map 200 at which the category zones are located. For example, the CAD map converter 206 can be provided with line recognition processes, pixel recognition processes, vector recognition processes, image recognition processes, text recognition processes, etc. that detect types of structural elements represented by lines, shapes, etc. in the CAD drawings. In an example implementation, the CAD map converter 206 can detect two opposing shelf units and, based on text or other indicia, determine that the two opposing shelf units are stocked with canned goods. The CAD map converter 206 can then overlay zone information (e.g., a block labeled with the zone category name) onto an aisle portion between the two opposing shelf units and specify the zone as a canned goods zone (e.g., zone (2) 102b of FIG. 1A).

In preparation for monitoring a particular retail establishment, the retailer provides a CAD map showing store layout characteristics. The CAD map is then scanned into a database configured to store scanned maps for a plurality of monitored retail establishments. The same scanning and storage format can be used for all scanned retail establishment CAD maps. In addition to providing the CAD map, the retailer can also provide a planogram, which is a diagram, a drawing, or other visual description of a retail establishment's layout, including placement of particular products and product categories. If the retailer cannot provide such information, an audit can be performed of the retailer's establishment by performing a walk through and collecting information indicative of products, product categories, and placements of the same throughout the retail establishment. In any case, the CAD map converter 206 can create the category zone map 200 by importing the scanned CAD map and the planogram or other similar information (e.g., audit information) and adding the category zone information (e.g., the category zones 102a-h of FIG. 1A) to the CAD map based on the planogram information (or similar information). Each category zone map for each retail establishment is individually created based on the CAD map for that retail establishment, and the quantity of zones within each category zone map depends on the selling space, channel (e.g., grocery), and layout of the retail establishment. The CAD map converter 206 can also create a zone-category association table or data structure to associate product categories with respective zones identified by the CAD map converter 206. An example zone-category association table 800 is shown in FIG. 8.

In the illustrated examples describe herein, each category zone is created based on a shopper's point of view (e.g., a shopper's exposure to different areas as the shopper moves throughout the retail establishment). In this manner, correlations can be made between shoppers' locations in the retail establishment and the opportunity those shoppers had to consume or be exposed to in-store product advertising or informational media. For example, a category zone can be created based on a shopper's line of sight when walking down a particular aisle. The category zones can also be created based on natural boundaries throughout a retail establishment such as, for example, changes in floor tile or carpeting, visual obstructions, enclosed areas such as greeting card centers, floral centers, and garden centers. In addition, the category zones can also be created to facilitate counting shoppers by stationary human counters, people detectors, and/or full store sweep auditors. The category zone boundaries should be created such that blind spots and blurring between zones are substantially reduced or eliminated for shopper counters to ensure that shopper counts have relatively high accuracies.

In the illustrated examples described herein, category zones are numerically or alphanumerically sequenced to follow a logical walk-through path of a retail establishment. The first zone (e.g., zone (2) 102b of FIG. 1A) is set near a main entrance (e.g., the entrance 108 of FIG. 1A) and the zones progress sequentially to the right side (or the left side depending on a store layout) of the retail establishment and follow a typical or normal traffic flow from the front to the back of the retail establishment and back to the front. The number of category zones can be selected based on the length of aisles and sizes of open areas. In some example implementations, checkout or service areas of the retail establishment can be the last category zone locations in the sequence. Main aisle (e.g., front and back of retail establishment) category zones enable differentiating between shoppers moving along end cap locations and shoppers moving in aisles.

The example methods and apparatus described herein can be used to make correlations between category zones, transactional sales data for product sales, and shopper traffic through the category zones to determine relationships between the information that can be used to help marketing and media professionals better understand shoppers and how to reach and influence shoppers that buy goods in retail establishments.

Figure 3:
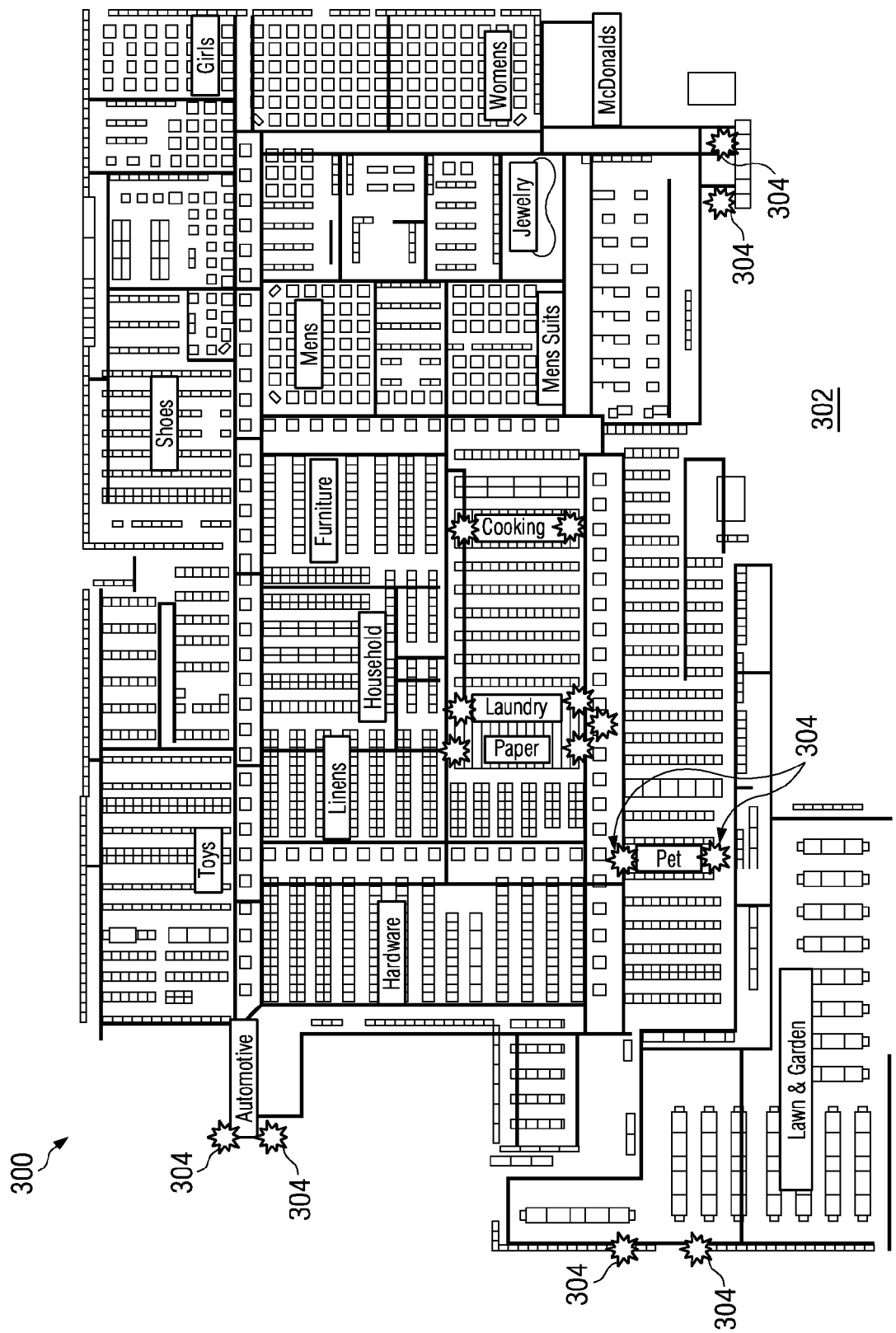
FIG. 3 illustrates another computer aided drawing of another example retail establishment showing a plurality of sensor locations at which people detectors for counting shoppers are located.

In some example implementations, the CAD map converter 206 can also be used to overlay people detector information indicating where people detectors (e.g., the people detectors 106, 110, and 116a-b of FIG. 1A) are located or should be located throughout a retail establishment. For example, FIG. 3 is another example category zone map 300 of another retail establishment 302 shown in connection with a plurality people detector locations 304 throughout the retail establishment 302.

Turning now to FIG. 1B, the plan view of the example retail establishment 100 of FIG. 1A is shown in connection with a plurality of in-store media 152a-h (e.g., advertisement media, product informational media, store informational media, etc.) located therein. The example methods and apparatus described herein can be used to measure compliance of the in-store media 152a-h and consumer exposure to the in-store media 152a-h. For example, marketing agencies and product manufacturers are often interested in measuring compliance by retailers in displaying or presenting their product advertising or informational media in accordance with times and locations specified via instructions from the marketing agencies or product manufacturers or via contractual agreements. The example methods and apparatus described herein can be used to generate compliance measures to determine where and when particular advertising or informational media are presented. Compliance measures may also be used to verify that the advertising or informational media is operational and that the desired human perception is achieved. For example, if an illuminated display is intended to blink when a shopper walks by, the desired human perception by a shopper is to see the display blink when the shopper walks by the illuminated display.

To monitor the temporal and spatial placements and presentations of the in-store media 152a-h, the in-store media 152a-h can be classified into different media-type groups. In the illustrated examples described herein, the in-store media 152a-h are classified into a print media class and an audio-based media class. The print media class includes, for example, banners, floor graphics, shelf talkers, shelf trays, hanging mobiles, coupon dispensers, shopping cart talkers, case stackers, cooler/refrigerator displays, countertop displays, display packaging, end cap displays, floor stands, illuminated displays, inflatable displays, pallet displays, power wings/sidekicks, wall and slat wall displays, header boards, shelf dividers, posters, product sampling programs, street tri-pods, or any other in-store-related print media. The audio-based media class includes, for example, videos presented on video screens, kiosks, in-store radio or audio ads, or any other in-store-related audio-based media.

In the illustrated example of FIG. 1B, the print media class can include the end cap advertisements 152*a-c* (shown as the advertisement displays 104*a-c* in FIG. 1A), the shelf talker advertisements 152*d*, the floor mat advertisements 152*e*, and the banner advertisement 152*f*, and the audio-based media can include the audio advertisements media 152*g* and the video advertisements media 152*h*. As described below, the print media can be monitored by taking photographic images (e.g., digital photographs) of the print media, and the audio-based media can be monitored by using an audio meter to detect audio signals emitted by audio-based media throughout a retail establishment. To determine the identity of the print media a store auditor or surveyor can visually identify each image and tag the image accordingly with identification information using, for example, a compliance application software program 600 discussed below in connection with FIG. 6. Alternatively, a measurement entity implementing the example methods and apparatus described herein can use image and/or text recognition software used to compare the captured images with reference images of known in-store media, and the image/text recognition software can tag each image with a known in-store media identifier or code or other identification information. To determine the identity of the captured audio from audio-based media, the measurement entity can compare signatures of the captured audio to known audio reference signatures of known audio/video media and tag each captured audio with a known in-store media identifier or code or other identification information when a matching reference signature is found. Additionally or alternatively, the measurement entity can work with audio-based media advertisers to insert or embed ancillary audio codes into the audio-based media. The measurement entity can then extract the audio codes from the captured audio of the in-store audio-based media and use audio code comparison software to compare the extracted audio codes to reference audio codes of known audio-based media. When matches are found, the audio code comparison software can tag the captured audio with a known in-store media identifier or code or other identification information.

To determine the amount of exposure of the in-store media 152*a-h* to shoppers that visit the retail establishment 100, the retail establishment 100 is provided with a shopper location tracker system. In the illustrated example, the shopper tracker system is implemented using a receiver device 154 (e.g., a tag or other portable device) carried by a shopper 156 (or mounted on a shopping cart or basket) and a plurality of location information transmitters 158. In the illustrated example, as the shopper 156 walks through the retail establishment 100, the location information transmitters 158 emit location information signals (e.g., one or more of unique transmitter codes, location codes, coordinates, timestamps, etc.) detectable by the receiver device 154. When the shopper 156 walks by one or more of the transmitters 158, the receiver device 154 is configured to detect the emitted location information signals, extract location-related information from the received signals and store the extracted information. In this manner, the receiver device 154 can store a history of the shopper's path of travel through the retail establishment 100. Shoppers' path of travel information can subsequently be correlated with the in-store media identifiers or codes and location information indicative of the locations of the various in-store media 152*a-h* throughout the retail establishment 100 to determine which of the in-store media were exposed to the shopper 156. To collect the shopper path of travel information stored on the receiver device 154, the receiver device 154 may be configured to upload the path of travel information to the local server 114 when the shopper 156 is at the checkout counter or otherwise exits the retail establishment 100, even if the shopper 156 made no purchases. In some example implementations, the measurement entity may issue a loaner receiver device to each shopper that enters the retail establishment 100 and instruct the shoppers to return the loaned receiver devices at the checkout counter prior to exiting the retail establishment 100. The measurement entity can then transfer via a wired or wireless interface the location information data from the loaner receiver devices to the local server 114. The local server 114 can then communicate the information to a metering entity data server 706 described below in connection with FIG. 7.

In other example implementations, path of travel information may be collected using location systems different from the location system described above. For example, in some location systems, the shopper 156 can carry a portable transmitter device that emits a unique code detectable by stationary receiver devices located throughout the retail establishment 100 that are communicatively coupled to the local server 114. In this manner, the stationary receiver devices can be used to track the location of each shopper that moves through the retail establishment 100 and communicate the location information to the local server 114. The portable transmitter device can be implemented using a battery powered electronic device and/or a passive or active RFID tag. Yet other example location systems may alternatively be used to track shopper locations. In addition, in some example implementations, shopper locations may be tracked using manual monitoring techniques in which a person working for the metering entity and/or the retail establishment observes shoppers and records their locations manually via a paper entry method or an electronic device entry method. In any case, the method of collecting shopper path of travel information is not limited to any particular technique.

In some example implementations, the shopper location tracker system can be implemented in connection with the people detectors 106, 116*a-b*, and 110 discussed above in connection with FIG. 1A. In other example implementations, the shopper location tracker system of FIG. 1B may also be configured to operate as a people counter system to count the number of shoppers in the retail establishment 100 and in each of the zones 102*a-h* of the retail establishment in addition to tracking the locations of shoppers.

To monitor compliance of displaying and presenting the in-store media 152*a-h* and to associate shopper path of travel information with the in-store media 152*a-h* to which shoppers were exposed, the measurement entity can identify the content and location of the in-store media 152*a-h* that is presented and/or displayed in the retail establishment 100 by periodically or aperiodically auditing or surveying the retail establishment 100. An example method of surveying the retail establishment 100 involves providing a metering entity agent or auditor 164 with a digital camera 166 and instructing the agent 164 to take photographic images of the in-store media 152*a-h*. The photographic images can be uploaded to an in-store media server 530 (described below in connection with FIGS. 4 and 7) and subsequently processed in a post process at, for example, the in-store media server 530. The photographic images can be processed manually by a person that visually analyzes the images to identify the in-store media represented in each image and the locations thereof in the retail establishment 100. Additionally or alternatively, the images can be processed via an automated process using image and/or text recognition software to identify the in-store media and determine the locations of the in-store media 152*a-h* in the retail establishment 100.

To determine the location of each of the in-store media 152*a-h* photographed by the agent 164, the agent 164 is also provided with a portable location device 168, which may be substantially similar or identical to the portable receiver device 154 described above. As the agent 164 walks through the retail establishment 100, path of travel information is generated and stored for subsequent correlation with the captured images to determine the locations in the retail establishment 100 of the in-store media 152*a-h*. Another example method involves providing the measurement entity agent 164 with a portable computer 170 (e.g., a handheld computer, a portable auditor device, etc.) configured to display a store layout map of the retail establishment 100 and receive user input indicating the locations on the store map representative of locations in the retail establishment 100 at which the in-store media 152*a-h* are located and profile information for each of the in-store media 152*a-h*. The store layout map may be generated based on computer-aided drawings (CAD drawings) of the retail establishment 100. In either example method, the measurement entity may also provide the agent 164 with an audio detection device 172 configured to detect audio signals from in-store audio-based advertisements (e.g., radio advertisements, video presentations, etc.) and generate signatures based on those detected audio signals or extract ancillary codes from the audio signals. An example technique that can be used to collect in-store media information using a walk-through path 400 is discussed below in connection with FIG. 4. In some example implementations, one or more of the digital camera 166, the portable location device 168, the portable computer 170, and/or the audio detection device 172 can be combined into a single device.

Figure 4:
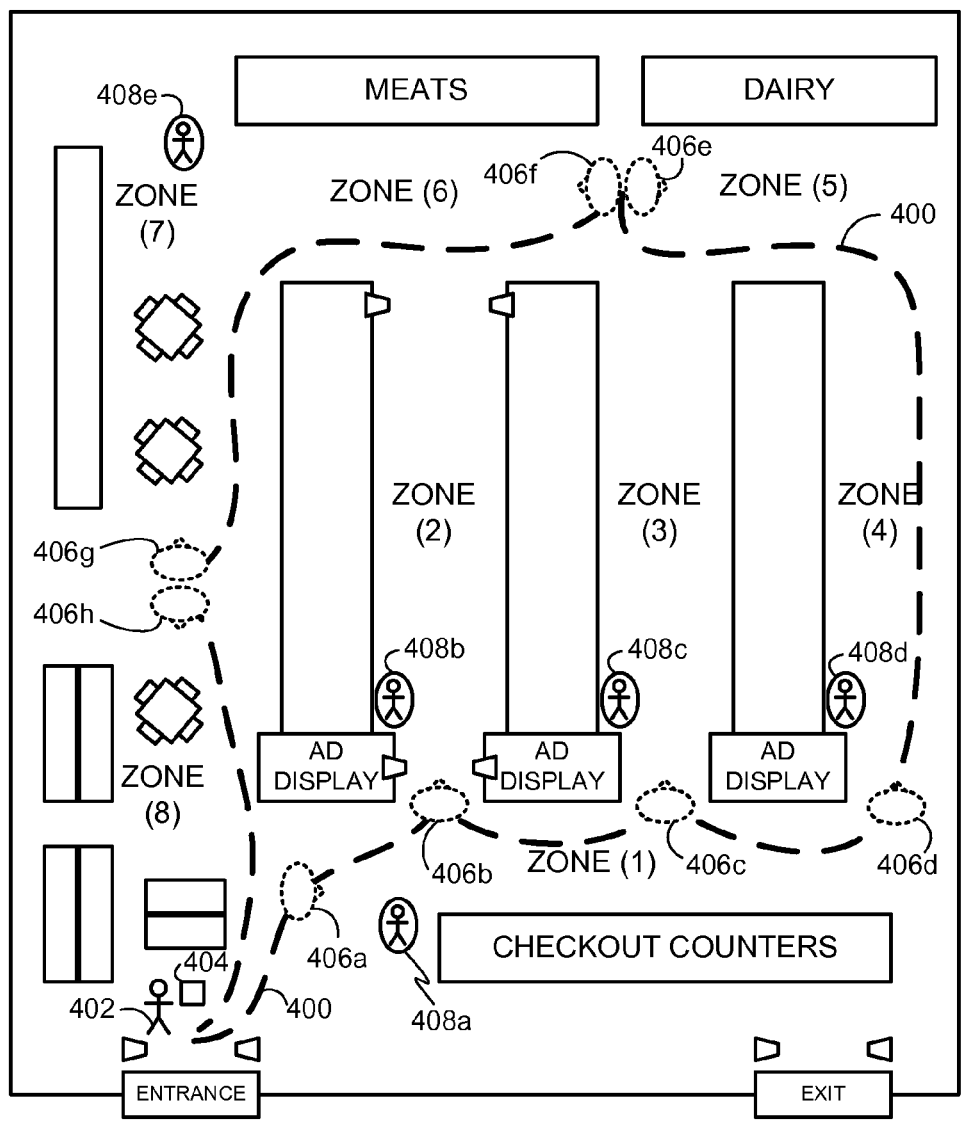
FIG. 4 illustrates an example walk-through path in the example retail establishment of FIG. 1A that may be used to perform a full store sweep walk-through to count shoppers in a plurality of the category zones of the retail establishment.

FIG. 4 is a plan view of the example retail establishment 100 of FIGS. 1A and 1B showing example implementations that may be used to count shoppers in the retail establishment 100. As discussed above in connection with FIG. 1A, the retail establishment 100 may be provided with the people detectors 106, 110, and 116*a-b* to implement a sensor-based (or automated) shopper counting technique. The example shopper counting implementations shown in FIG. 4 are in-person techniques that involve human intervention. In the example implementations described herein, the in-person shopper counting techniques depicted in FIG. 4 are used in connection with the sensor-based shopper counting technique described above in connection with FIG. 1A to calibrate a shopper traffic forecasting system such as, for example, the example shopper traffic forecasting system 2100 of FIG. 21. In some example implementations, the manual shopper counting techniques of FIG. 4 provide relatively more accurate count information than the sensor-based shopper counting technique of FIG. 1A, but some of the in-person shopper counting techniques can be relatively more expensive than the sensor-based shopper counting technique. Thus, in some example implementations, count information can be acquired using the in-person shopper counting techniques only for use in calibrating the example shopper traffic forecasting system 2100, and subsequent shopper count information used to determine forecasted shopper traffic and/or to verify the accuracy of forecasted shopper traffic can be acquired using only the sensor-based shopper counting technique and/or the sensor-based shopper counting technique in combination with only one of the in-person shopper counting techniques. After it is determined that the example shopper traffic forecasting system 2100 is functioning at an acceptable accuracy, the shopper traffic forecasting system 2100 can be subsequently used to forecast shopper traffic for retail establishments (for which no shopper count information was collected) based on product/service sales information for those retail establishments and prediction models calibrated using the in-store shopper counts previously collected at, for example, one or more retail establishments.

An example manual shopper counting technique depicted in FIG. 4 involves creating an example walk-through path 400 in the example retail establishment 100 of FIGS. 1A and 1B that may be used to perform a full store sweep (FSS) to count shoppers in the category zones 102*a-h* of the retail establishment 100. In a full store sweep, an auditor 402 having a portable data input device 404 (e.g., a tablet) or a paper log enters and walks through the retail establishment 100 via the predefined walk-through path 400 to count the quantity of shoppers in each of the category zones 102*a-h*. In the illustrated example, the walk-through path 400 is designed to minimize the amount of time required for the auditor 402 to walk through the retail establishment 100 and count shoppers in every zone while ensuring a relatively high degree of accuracy in the shopper count values. The walk-through path 400 is also designed to avoid zig zag or inconsistent patterns through the retail establishment 100 that may increase the amount of time required to perform full store sweeps and/or that may cause double counting shoppers or missing shopper counts. During a full store sweep, the auditor 402 stops briefly at predefined data collection points 406*a-h* along the walk-through path 400 to count the number of shoppers in each of the category zones 102*a-h* corresponding to respective ones of the data collection points 406*a-h*. The auditor 402 proceeds in a similar fashion through the retail establishment 100 until the auditor 402 collects a count for each of the category zones 102*a-h* and exits the retail establishment 100. The auditor 402 can collect counts for different stores in a similar fashion during a day and, in some cases, the auditor 402 may be responsible for returning to the same retail establishments several times per day to collect different counts representative of shopper quantities at different times of day to generate several day-parts count data. Each retail establishment can have a different predefined walk-through path for the auditor based on the layout of that retail establishment.

Figure 5:
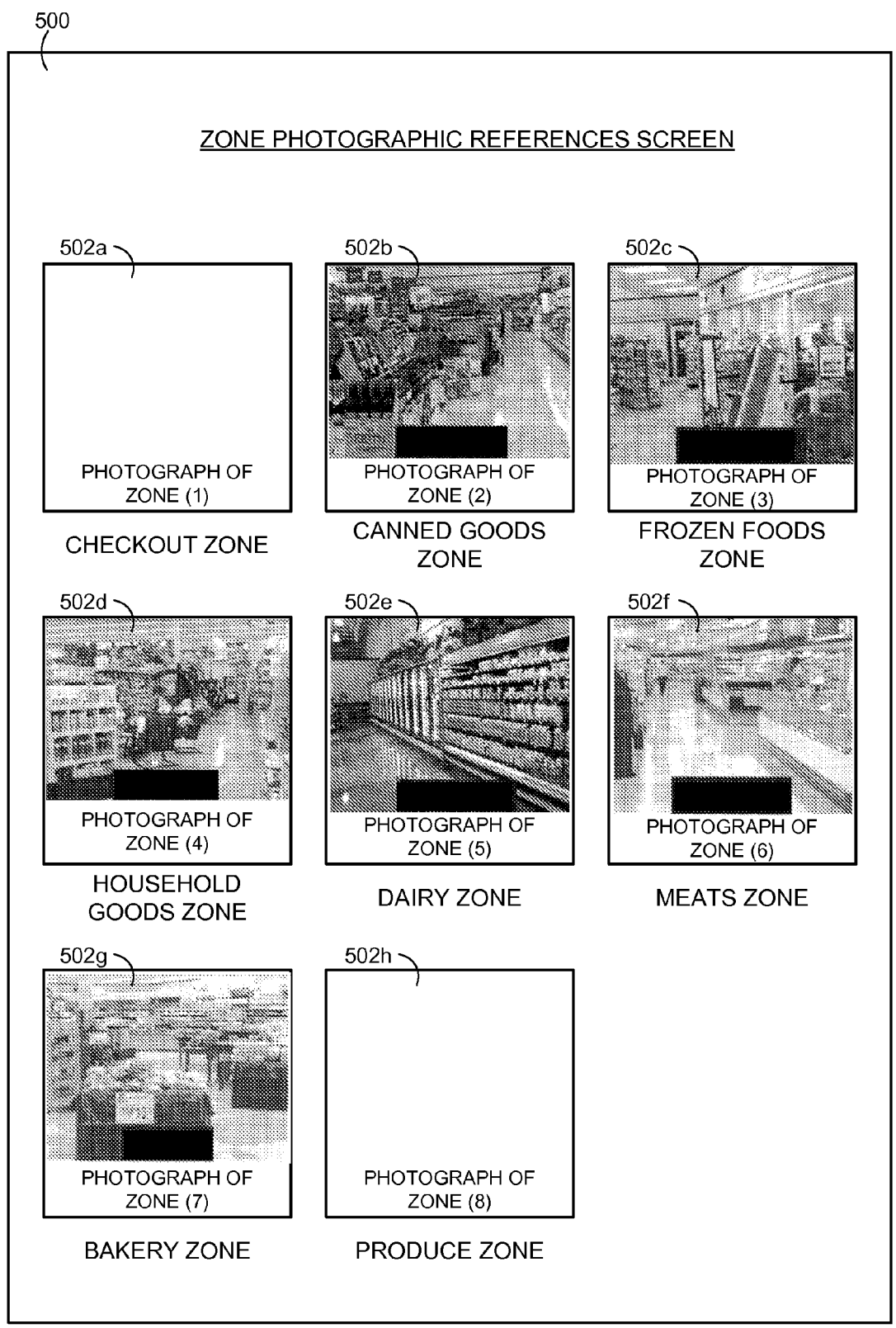
FIG. 5 illustrates a plurality of example zone photographic references corresponding to the zones of the example retail establishment of FIGS. 1A, 1B, and 4.

To facilitate identifying each of the category zones 102*a-h* and the data collection points 406*a-h*, a metering entity can take digital photographic images of the zones 102*a-h* from the perspective of each of the data collection points 406*a-h*. The zone photographs can then be stored on the portable data input device 404 (i.e., the portable auditor device 404) to provide a visual reference to the auditor 402 while performing the full store sweeps. FIG. 5 depicts a zone photographic references screen 500 including a plurality of example zone photographs 502*a-h* that may be displayed by the portable auditor device 404. Each of the zone photographs 502*a-h* corresponds to a respective one of the category zones 102*a-h* of FIG. 1A. As the auditor 402 walks through the retail establishment 100, the auditor 402 can refer to the zone photographs 502*a-h* to determine the location of the data collection points 406*a-h* at which the auditor 402 should stand when counting shoppers in the category zones 102*a-h*. In the illustrated examples described herein, a category zone map for a retail establishment such as, for example, the category zone maps 200 and 300 of FIGS. 2 and 3 can be stored on the portable device 404, and the portable auditor device 404 can display the category zone map for the auditor 402 while the auditor 402 is performing a full store sweep of the retail establishment. In some example implementations, the zone photographs 502*a-h* and the category zone map may be provided to the auditor 402 in paper print format instead of in digital format via the portable auditor device 404.

In some example implementations of full store sweeps for the retail establishment 100, the portable auditor device 404 is configured to display instructions via its screen for performing count data collection. The instructions inform the auditor 402 of where in the retail establishment 100 the data collection points 406*a-h* are located by, for example, displaying text-based descriptions of the locations of the data collection points 406*a-h* and/or by displaying the zone photographs 502*a-h*. When the auditor 402 reaches one of the data collection points 406*a-h*, the auditor 402 will count the total number of shoppers in the corresponding one of the zones 102*a-h* at that snap-shot in time or at that day-part. The instructions instruct the auditor 402 not to count vendors and store employees. Also, the instructions instruct the auditor 402 to move from zone to zone at a pace that eliminates double counting a shopper from one zone to the next. For example, the pace of the auditor 402 should substantially reduce or eliminate the likelihood of following a shopper throughout the retail establishment 100. Also, because the data collection points 406*a-h* are located along a normal flow of shopper traffic, this reduces the likelihood of counting a shopper twice or not counting a shopper, because the auditor 402 will likely be moving in the same direction as the shoppers instead of in an opposite direction. In this manner, the auditor 402 can capture the location of most or all of the shoppers in the retail establishment 100 at a particular time and in a particular one of the category zones 102*a-h*.

Continuing with the same example implementation, the auditor 402 is instructed to begin full store sweeps for the retail establishment 100 at a predetermined time (e.g., 7:00 am on Monday) and can complete each sweep in 5~20 minutes depending on the size of the retail establishment 100. The auditor 402 is instructed to conduct a full store sweep of the retail establishment 100 at predetermined time periods or intervals (e.g., every two hours on the hour until 9:00 pm). Between consecutive sweeps of the retail establishment 100, the auditor 402 can audit other retail establishments.

Another example in-person counting technique involves employing people to assume the roles of stationary human counters 408*a-e*. In the illustrated example, each of the stationary human counters 408*a-e* can be assigned to count shoppers in one or more zones at particular intervals. For example, the stationary human counters 408*a-e* can be instructed to count the number of shoppers in their respective zones every five minutes (or at any other time interval) and to record the shopper counts on paper or an electronic device similar or identical to the portable data input device 404. In the illustrated example, each of the stationary human counters 408*b-d* is assigned to count shoppers in a respective one of the zones (2)-(4), while the stationary human counter 408*a* is assigned to count shoppers in zones (1) and (8) and the stationary human counter 408*e* is assigned to count shoppers in zones (5)-(7). Stationary human counters similar to the stationary human counters 408*a-e* can be employed at each retail establishment for which stationary human-based shopper counts are to be collected.

Unlike the full store sweep technique of counting shoppers using the example path 400, which involves the auditor 402 moving through the store in a continuous fashion, the stationary human counters 408*a-e* stay at the same location for an extended duration (e.g., for several hours). Thus, it is relatively less likely that one of the stationary human counters 408*a-e* will count the same shopper twice or will fail to count a shopper than it is that the auditor 402 (e.g., a moving human counter) will make such an error. In addition, the stationary human counters 408*a-e* can collect more count samples of the same store in a given day than can the auditor 402 performing a full store sweep of several stores in a day. Thus, relatively more accurate shopper counts can be achieved using the stationary human counters 408*a-e* than can be achieved using full store sweeps in connection with the auditor 402 and the example path 400. However, because using stationary human counters 408*a-e* can be relatively more expensive than using the full store sweep technique or sensor-based shopper counting techniques involving, for example, the people detectors 106, 110, and 116*a-b* (FIG. 1A), in some example implementations, the stationary human counters 408*a-e* can be used to collect shopper count information only for calibrating the example shopper traffic forecasting system 2100 of FIG. 21. After, the example shopper traffic forecasting system 2100 is calibrated, full store sweeps and/or sensor-based shopper counting techniques can be used to collect shopper count data used to determine forecasted shopper traffic and/or verify the accuracy of the accuracy of the forecasted or estimated shopper traffic counts.

In some example implementations, the example methods and apparatus described herein can be configured to use the walk-through path 400 and the data collection points 406*a-h* of FIG. 4 to obtain metering information related to the compliance of product advertising or informational media and/or consumer exposure thereto. For example, a metering entity implementing the product advertising or informational media compliance and/or exposure service can assign the auditor 402 (or another auditor) to visit each of a plurality of retail establishments once per week (or at some other time interval) and follow walk-through paths (e.g., the walk-through path 400) for the respective retail establishments to collect in-store media information. The day and time of day or day-part during which to collect the in-store information can be determined based on a best display day. For example, the metering entity may define a best display day as a day on which relatively few shoppers are present in a retail establishment and, thus, would facilitate compliance information collection by minimizing visual obstructions created by shoppers.

Referring to FIG. 1B in combination with FIG. 4, to collect in-store media information of the retail establishment 100 of FIGS. 1A, 1B, and 4, the portable computer 170 (FIG. 1B) may instruct the auditor 164 (FIG. 1B) to capture one or more photographs of the outside or external areas of the retail establishment 100 and then to enter the retail establishment 100 and walk along the walk-through path 400 (FIG. 4), stop briefly at each of the predefined data collection points 406*a-h* (FIG. 4) along the walk-through path 400, and take one or more pictures of each of the zones 102*a-h* using the digital camera. In such example implementations, the photographic images should be captured from a typical shopper's perspective to simulate what a shopper would see when walking through the retail establishment 100. The photographic images of the outside or external areas of the retail establishment 100 can be used to measure compliance of product advertising or informational media displayed on windows or the surrounding areas outside the retail establishment 100. The photographic images captured of each of the zones 102*a-h* of the retail establishment can be used to measure compliance of product advertising or informational media displayed inside the retail establishment 100 and exposure thereto. In some example implementations, to capture information about audio-based in-store media (e.g., the audio advertisement 152*g* of FIG. 1B), the auditor 164, can be instructed to activate the audio detection device 172 while walking along the walk-through path 400.

To increase the likelihood that the digital photographs capture all of the advertising or informational media in each of the zones 102a-h, the portable auditor device 170 may instruct the auditor 164 to aim the camera at several points of interest defined by the locations at which advertising or informational media should be located or is located. In some example implementations, the portable auditor device 170 may instruct the auditor 164 to take a series of digital photographs that cover a 360° view from each of the data collection points 406a-h and digital photographs of the ceiling and the floor at each of the data collection points 406a-h. In this manner, the auditor 164 need not identify or determine the locations at which advertising or informational media should be or is located.

Compliance measure instructions stored on the portable auditor device 170 may also instruct the auditor 164 regarding the techniques to use when capturing digital photographs to ensure capturing images that will provide as much information as possible about product advertising or informational media compliance. Example technique instructions may instruct the auditor 164 to not use a flash, to zoom in for certain photographic captures, to focus on particular media, and to try to avoid taking pictures of shoppers. In addition, the instructions may instruct the auditor 164 not to delete any pictures and, when in doubt about the quality or usability of a picture, to instead re-capture a photographic image of the same view.

When the auditor 164 finishes capturing photographic images for a retail establishment, the auditor 164 uploads the images to the in-store media server 530 (FIG. 7). On a weekly basis (or other interval), a coding process is performed on the photographic images stored in the compliance database to identify advertising or informational media in the images.

Although the above discussion describes capturing photographic images of advertising/informational media, in other example implementations, instead of capturing photographic images of the advertising/informational media, the auditor 164 may alternatively be instructed to record information descriptive of the media based on the auditor's observations. For example, the portable auditor device 170 may be configured to present questions requesting the auditor 164 to provide media type information (e.g., shelf talker, poster, shelf tray, hanging mobile, coupon dispenser, audio-based media, video-based media, etc.), media characteristic information (e.g., advertised product/service, advertised brand, manufacturer, etc.), location of placement, time of day, and/or any other information descriptive of different media observed by the auditor 164 as the auditor 164 walks through the retail establishment 100. Thus, where techniques are described herein as involving the capturing of photographic images to collect media information for purposes of assessing compliance and/or determining media exposure to shoppers, such techniques may alternatively be implemented without capturing photographic images and instead by collecting descriptive media information based on auditor observations.

Figure 6:
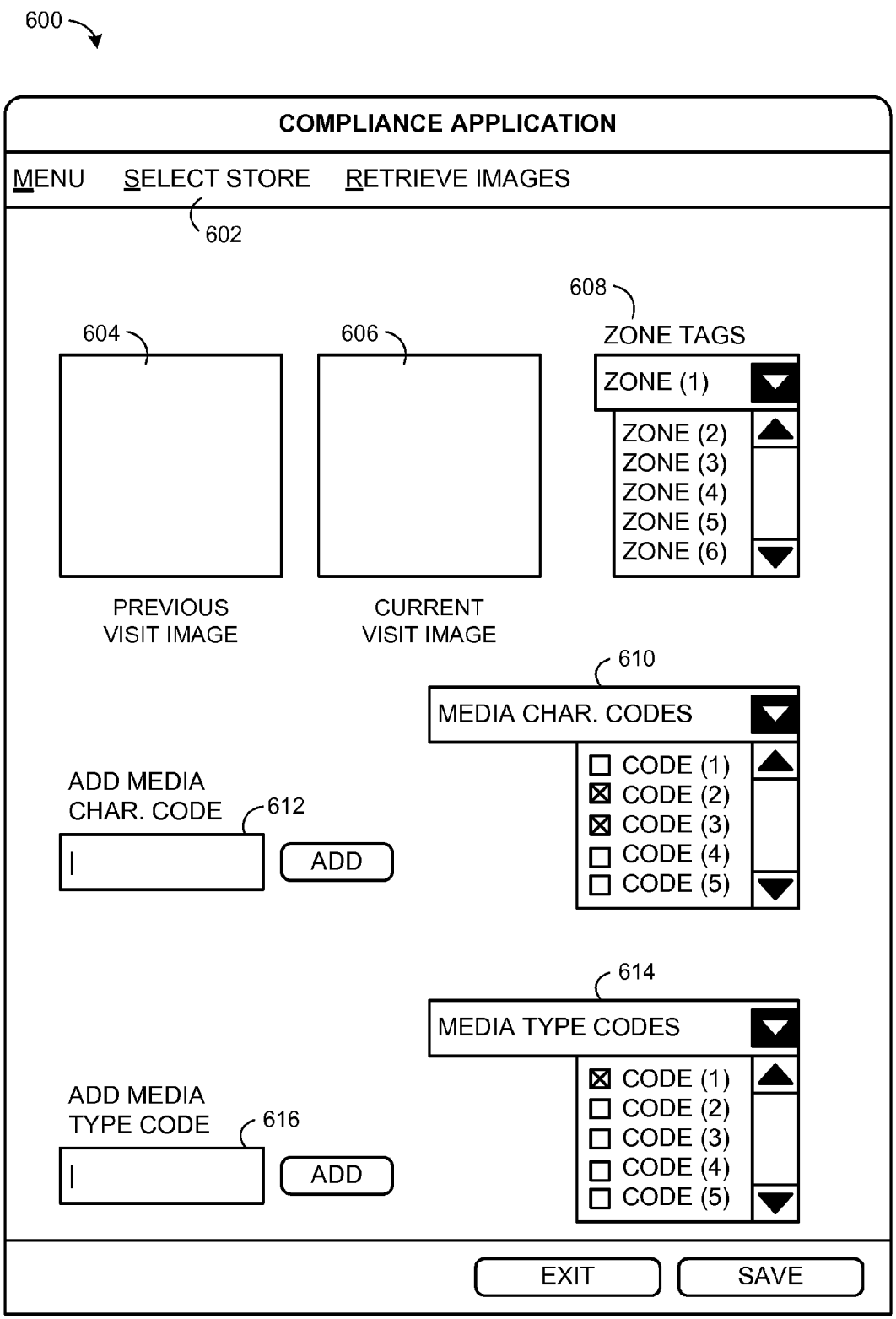
FIG. 6 illustrates a compliance application software program having a graphical user interface (GUI) to retrieve and navigate between photographic images captured in category zones of retail establishments.

Turning to FIG. 6, the example compliance application software program 600 has a graphical user interface (GUI) to retrieve and navigate between the various photographic images is used, in some example implementations, to perform a coding process on photographic images of in-store media. To retrieve photographic images for a particular store, the compliance application software program 600 is provided with a 'select store' menu 602 via which a person can select the retail establishment for which the person would like to analyze images.

To display and compare images taken from the same perspective (e.g., from the same one of the data collection points 406a-h of FIG. 4 and in the same direction) on different days, the example compliance application software program 600 is provided with a previous visit image view window 604 and a current visit image view window 606. For example, the previous image view window 604 can be used to display an image captured from a previous week and the image view window 606 can be used to display an image captured during the most recent compliance information collection visit. In this manner, a person may determine what product advertising or informational displays change from one week to another. In some example implementations, the compliance application software program 600 may be configured to display only one image (e.g., a current image or a previous image) to enable a person to associate zone identifier information and/or media coding information with that image.

To tag each image with a respective zone identifier, the compliance application software program 600 also includes a zone tags drop down list 608 that is populated with a plurality of zones created for the retail establishment associated with the retrieved images. A person can select a zone from the zone tags drop down list 608 corresponding to the image being displayed in the current visit image window 606 to associate the selected zone identifier with the displayed image in the in-store media server 530.

To associate media characteristic identifier codes indicative of the content and/or other characteristics (e.g., products, services, brands, manufacturers, advertising agencies, themes, etc.) of the advertising or informational media shown in the photographic image displayed in the current visit image window 606, the compliance application software program 600 is provided with a media characteristics codes selection control 610. A person may select the media characteristics codes associated with the advertising or information media shown in the photographic image displayed in the current visit image window 606 to associate the selected media characteristics codes with the displayed image and the zone selected in the zone tags drop down list 608 in the in-store media server 530.

To associate media type classification codes indicative of media types (e.g., different types of print media, audio-based media, video-based media, etc.) shown in the advertising or informational media shown in the photographic image displayed in the current visit image window 606, the compliance application software program 600 is provided with a media type classification codes selection control 614. A person may select the media type classification codes associated with the advertising or information media shown in the photographic image displayed in the current visit image window 606 to associate the selected media type classification codes with the displayed image, the media characteristics codes selected from the media characteristics codes selection control 610, and the zone selected in the zone tags drop down list 608 in the in-store media server 530.

To add new media characteristics codes, the compliance application software program 600 is provided with an add media characteristics code field 612, and to add new media type codes, the compliance application software program 600 is provided with an add media type classification code field 616. When a person sees a new advertising or informational medium for which a media characteristic code does not exist in the media characteristics codes selection control 610 and/or for which a media type classification code does not exist in the media type classification codes selection control 610, the person may add the media characteristic code for the new advertising or information medium in the add media characteristics code field 612 and/or the media type classification code in the add media type classification code field 616. The compliance application software program 600 can be configured to subsequently display the newly added media codes in the media characteristics codes selection control 610 and/or the media type classification codes selection control 612.

Figure 19:
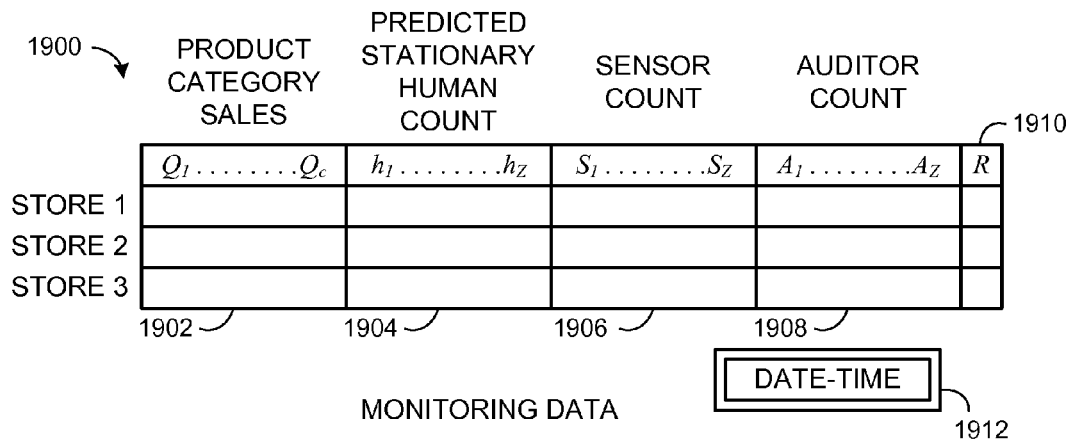
FIG. 19 is an example monitoring data structure that may be used to store shopper count information and product sales information collected during a monitoring phase of a retail establishment.
Figure 20:
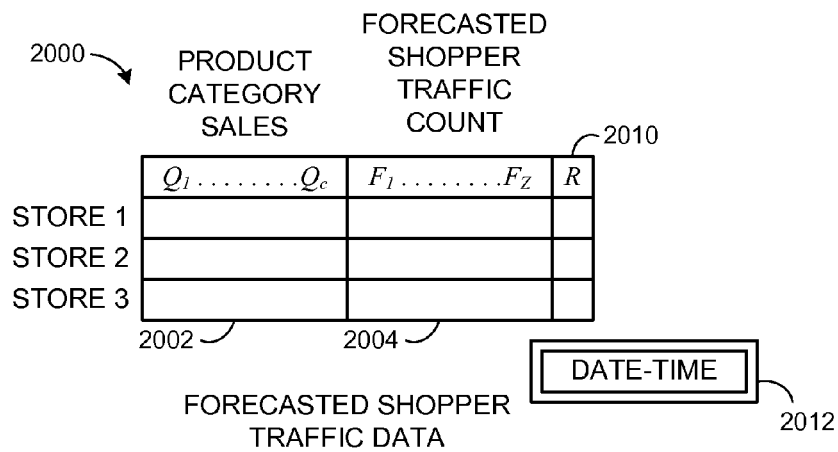
FIG. 20 is an example forecasted human count data structure that may be used to store forecasted shopper traffic count information.

FIG. 7 depicts an example system 700 configured to implement a syndicated retail establishment metering service for a plurality of retail establishments to generate, collect, and process in-store metering information and deliver analysis results (e.g., the forecasted (or estimated) shopper traffic $F_1 \ldots F_Z$ stored in a forecasted shopper traffic count column 2004 of FIG. 20, advertisement exposure results, advertisement compliance results, etc.) to clients of the metering service using the example methods and apparatus described herein. In the illustrated example of FIG. 7, a central data processing server 702 receives information (e.g., stationary human count data $H_1 \ldots H_Z$, sensor count data $S_1 \ldots S_Z$, auditor count data $A_1 \ldots A_Z$, product sales revenue data $Q_1 \ldots Q_C$, zone type information (Z), and store type data (R) of FIGS. 18-21, photographic images captured by auditors, shopper location tracker information, in-store media detection information, etc.) from a plurality of data sources and analyzes the information to generate metering data (e.g., in-store media compliance and exposure data, forecasted shopper traffic data, etc.) related to the retail establishment 100 and/or any other retail establishment to help marketing and media professionals better understand shoppers and how to reach and influence shoppers that buy goods in retail establishments. The central data processing server 702 receives and processes information associated with a plurality of retail establishments and is configured to implement a syndicated service that can centralize the processing of information from different retail establishments of retail chains across a geographic region in a substantially similar manner to enable owners and/or operators of the retail chains to retrieve analysis results related to the metering of their retail establishments from one location (i.e., the central data processing server 702). In the illustrated example, at least some operations of the central data processing server 702 can be implemented using Microsoft Dynamics Retail Management System (RMS), developed and sold by Microsoft Corporation of Redmond, Wash., United States of America.

To collect sensor-based shopper count data from the people detectors 106, 110, and 116*a-b* (FIG. 1B), the retail establishment 100 is provided with a detectors interface 704 configured to be communicatively coupled to each of the people detectors 106, 110, and 116*a-b* and the local server 114. The detectors interface 704 enables the people detectors 106, 110, and 116*a-b* to communicate shopper count information to the local server 114. In this manner, the local server 114 can store and track sensor-based shopper count values (e.g., the sensor-based shopper counts ($S_1 \ldots S_Z$) stored in columns 1806 and 1906 of FIGS. 18 and 19) in each of the zones 102*a-h* at different times of day or at different day-parts. In addition, the portable auditor device 404 described above in connection with FIG. 4 collects auditor-based shopper count values (e.g., the auditor counts ($A_1 \ldots A_Z$) stored in columns 1808 and 1908 of FIGS. 18 and 19) input by the auditor 402 during full store sweeps of the retail establishment 100.

The local server 114 is coupled to the metering entity data server 706, which configured to collect and organize or collate count data generated using the people detectors 106, 110, and 116*a-b* and shopper path of travel information generated by the shopper location tracker system described above in connection with FIG. 1B. Although not shown, the metering data server 706 is coupled to different in-store servers substantially similar or identical to the local server 114, each of which corresponds to and is located in or proximate to a respective retail establishment. The metering data server 706 collates sensor-based shopper count values for each retail establishment and organizes the count values per zone and per day-parts. The metering data server 706 is also configured to validate the sensor-based shopper count data for completeness by, for example, determining whether count data for any day-parts is missing. After the metering data server 706 collates, organizes, and validates the sensor-based shopper count data, the metering data server 706 communicates the count data to the central data processing server 702.

The portable auditor device 404 is configured to be coupled to an in-person traffic data server 708 and communicate the auditor count data ($A_1 \ldots A_Z$) provided by the auditor 402 (FIG. 4) to the in-person traffic data server 708. Although not shown, the in-person traffic data server 708 is coupled to different portable auditor devices substantially similar or identical to the portable auditor device 404, each of which may be used by a different auditor to provide shopper count values for one or more retail establishments. In addition, the in-person traffic data server 708 is configured to receive stationary human counts ($H_1 \ldots H_Z$) from the stationary human counters 408*a-e* of FIG. 4. For example, the stationary human counters 408*a-e* may provide their count data via portable electronic devices substantially similar or identical to the portable auditor device 404 and/or from another computer system. The in-person traffic data server 708 collates the auditor-provided shopper counts ($A_1 \ldots A_Z$) and the stationary human counts ($H_1 \ldots H_Z$) for each retail establishment and organizes the count values per zone and per day-parts. The in-person traffic data server 708 is also configured to validate the auditor-provided shopper count data for completeness by, for example, determining whether count data for any day-parts is missing. After the in-person traffic data server 708 collates, organizes, and validates the shopper count data, the in-person traffic data server 708 communicates the count data to the central data processing server 702.

To communicate advertisement and informational media compliance information to the central data processing server 702, the compliance server 530 described above is coupled to the server 702. The compliance server 530 is configured to communicate media codes (e.g., the media codes of the media characteristics codes selection control 610 of FIG. 6) in association with respective zone identifiers to indicate the zones in which advertisement and informational media were located on particular days.

To collect demographics data of at least some of the shoppers that shop at the retail establishment 100 or other monitored retail establishments, the central data processing server 702 is coupled to a server 710 of the Homescan® service provided by A. C. Nielsen. The Homescan® server 710 is coupled to a plurality of Homescan® home units (not shown) provided at panel member homes. The Homescan® server 710 sends surveys to the panel members via the panel members' Homescan® home units. The surveys are designed to collect demographic type information and other information describing shopping trips of the panel members. For example, an example survey question may ask a panel member to identify, from a pre-populated list, all of the retail establishments that the panel member has visited within the past seven days and the days and times of day during which the shopping trips were made. The surveys may also request the panel members to provide the purpose of their shopping trips and how many people participated in the trip. In addition, the surveys may request the panel members to provide their gender and age. The Homescan® server 710 is configured to collect the survey responses from the different Homescan® home units and to collate and organize the survey data. The Homescan® server 710 can also be configured to validate the data for completeness by, for example, determining if any survey questions were not answered. In the illustrated example, the Homescan® server 710 is configured to communicate the survey response information to the central data processing server 702. An example Homescan® survey 900 is depicted in FIG. 9.

To receive demographics data related to respective retail establishments, the central data processing server 702 is coupled to a retail establishment demographics server 712. The retail establishment demographics server 712 is provided with demographics information describing typical shoppers of respective monitored retail establishments and is configured to communicate the demographics information to the central data processing server 702.

Figure 18:
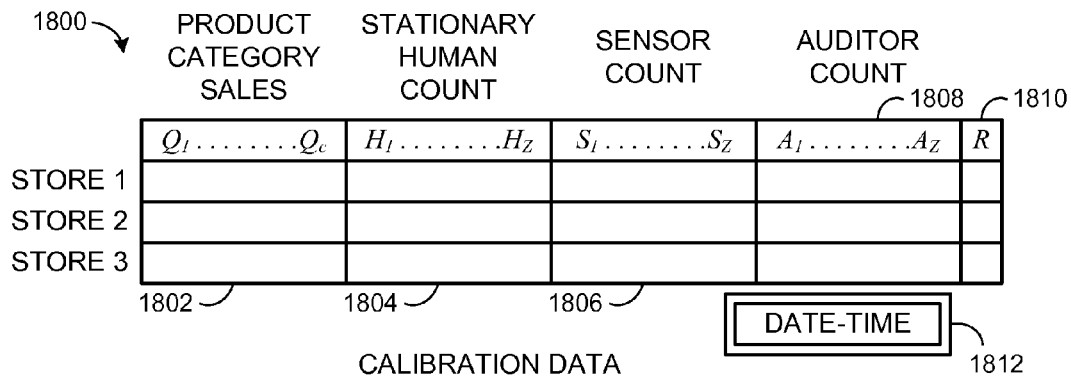
FIG. 18 is an example calibration data structure to store shopper count information in association with product sales information that may be used to calibrate a shopper traffic forecasting system.

The central data processing server 702 is configured to receive point-of-sale (POS) data (e.g., the product sales revenues $Q_1 \ldots Q_C$ of the data structures 1800, 1900, and 2000 of FIGS. 18-20) and product category information from a retailer 714 that is typically an owner and/or operator of the retail establishment 100. In the illustrated example implementations described herein, product category information is provided by retailers. The product category information could be defined in accordance with an industry standard such as, for example, an AC Nielsen standard or it could be custom-defined by retailers or clients (e.g., product manufacturers, advertisers, etc.) of a metering entity.

To communicate store characteristics to the central data processing server 702, the example system 700 is provided with a characteristics server 716 that stores store characteristics for each monitored retail establishment. Store characteristics may include store type, store ID, whether the store is part of a retail chain, chain ID, physical store dimensions, quantity and identity of category zones, store hours, address and/or other geographic location information, store layout type, etc.

Figure 21:
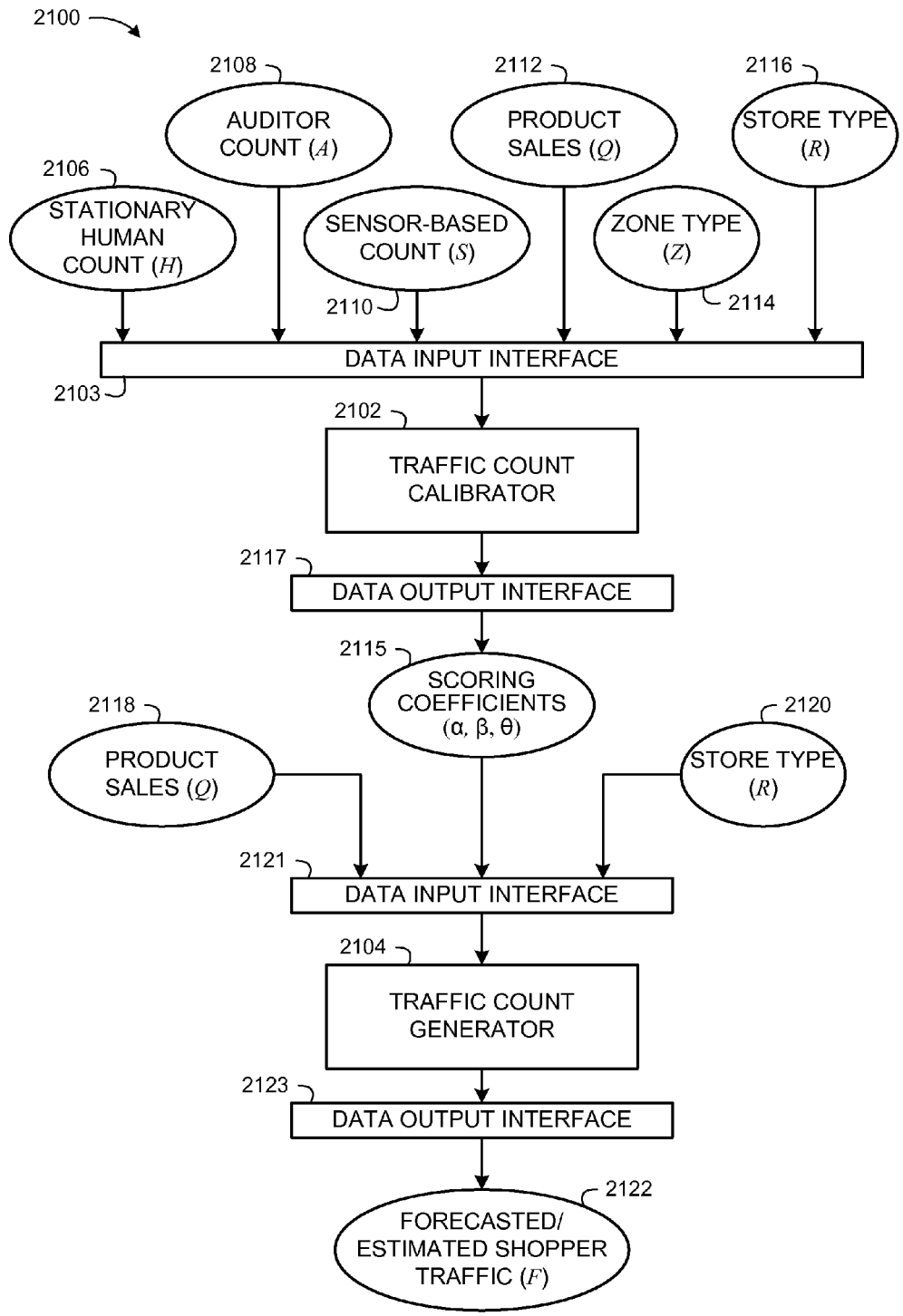
FIG. 21 is an example shopper traffic forecasting system.

To provide shopper traffic model coefficients (e.g., scoring coefficients ($\alpha$, $\beta$, $\theta$) of FIG. 21) used to determine and/or forecast quantities of shoppers and traffic flows through retail establishments based on information received by the central data processing server 702 from the data sources describe above, the example system 700 is provided with a traffic model coefficients server 718. The traffic model coefficients server 718 is configured to receive point-of-sale (POS) data (e.g., the POS data depicted in FIGS. 10-12) and reference data (e.g., the reference data depicted in FIGS. 13 and 14) from the central data processing server 702. In some example implementations, some or all of the POS data may be provided by the Homescan® server 710. The traffic model coefficients server 718 generates the scoring coefficients ($\alpha$, $\beta$, $\theta$) described below in connection with FIG. 21 based on the POS and reference data. In turn, the traffic model coefficients server 718 communicates the scoring coefficients ($\alpha$, $\beta$, $\theta$) to the central data processing server 702, and the server 702 can generate forecasted shopper traffic data.

In the illustrated example, the traffic model coefficients server 718 is configured to implement the traffic count calibrator 2102 described below in connection with FIG. 21 and the central data processing server 702 is configured to implement the traffic count generator 2104 of FIG. 21. However, in other example implementations, a server (e.g., the traffic model coefficients server 718) coupled to the central data processing server 702 can implement the traffic count calibrator 2102 and the traffic count generator 2104 to determine the forecasted shopper traffic data and communicate the forecasted shopper traffic data to the central processing server 702.

Figure 10:
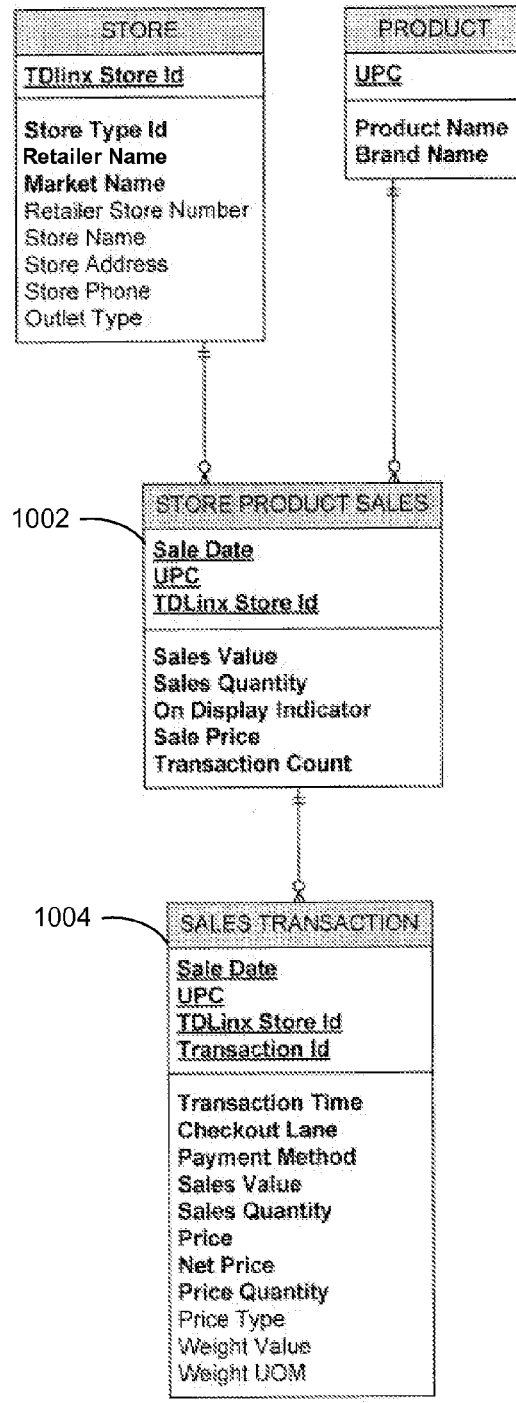
FIG. 10 depicts an example point-of-sale (POS) data plan showing an organizational view of POS data used by the example methods and apparatus described herein.

An example POS data plan 1000 showing an organizational view of POS data is shown in FIG. 10. The POS data plan 1000 includes store product sales data 1002 and sales transaction data 1004. The store product sales data 1002 specifies quantities sold, price, and other information for each type of product sold in a given time period (e.g., a day, a week, etc.). The retailer 714 (FIG. 7) can communicate their store product sales data to the central data processing server 702 (FIG. 7) on a daily basis or based on any other time interval agreed upon with a metering entity. The central data processing server 702 can use the store product sales data to generate and store the product sales revenue data ($Q_1 \ldots Q_C$) stored in the data structures 1800, 1900, and 2000 of FIGS. 18-20.

FIG. 11 shows an example store product sales data structure 1100 that may be used to store the store product sales data 1002 depicted in the POS data plan 1000 of FIG. 10. Unlike the store product sales data 1002, which is organized by sales of specific products, the sales transaction data 1004 (FIG. 10) specifies the product identifiers, transaction dates and times, shopper identifiers, and other information related to specific transactions of shoppers. That is, one sales transaction data log corresponds to the products purchased by one shopper during one shopping trip. The retailer 714 (FIG. 7) can communicate their sales transaction data to the central data processing server 702 (FIG. 7) on a daily basis or based on any other time interval agreed upon with a metering entity.

FIG. 12 shows an example sales transaction data structure 1200 (or a T-log data structure) that may be used to store the sales transaction data 1004 depicted in the POS data plan 1000 of FIG. 10. The retailer 714 and/or the metering entity can specify the format of the sales transaction data structure 1200 and communicate the format in advance to the metering data entity for use by the central data collection server 702 when parsing the sales transaction data.

Figure 13:
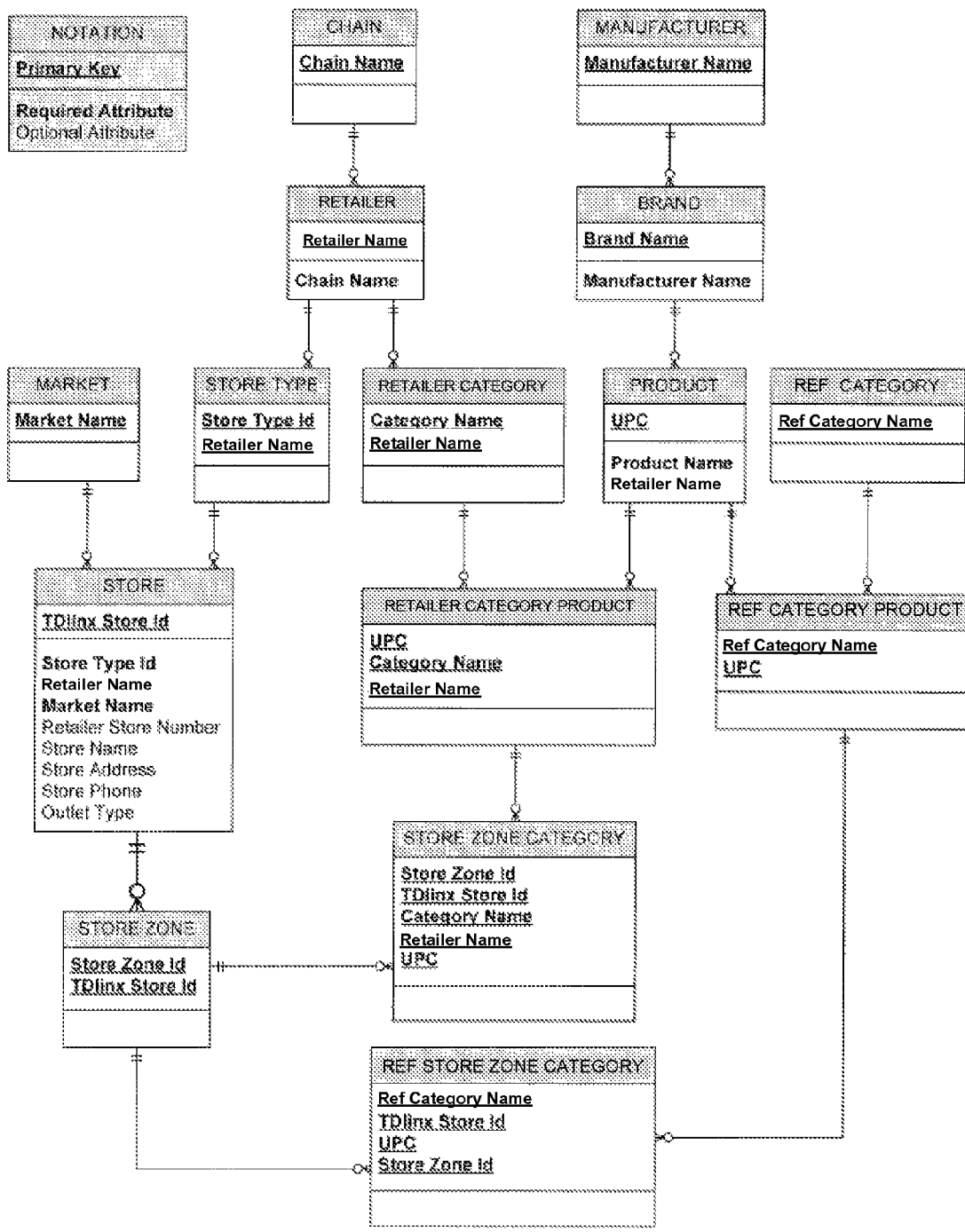
FIG. 13 depicts an example reference data plan showing an organizational view of reference data corresponding to retail establishments.

An example reference data plan 1300 showing an organizational view of reference data corresponding to retail establishments is shown in FIG. 13. The central data processing server 702 generates the reference data based on the store demographics and characteristics information received from the retail establishment demographics server 712 and the characteristics server 716 of FIG. 7. FIG. 14 depicts an example reference data structure 1400 that may be used to store the reference data of FIG. 13.

FIG. 15 depicts an example data structure 1500 that the central data processing server 702 may use to organize information collected from the data sources described above in connection with the example system 700 of FIG. 7.

Figure 16:
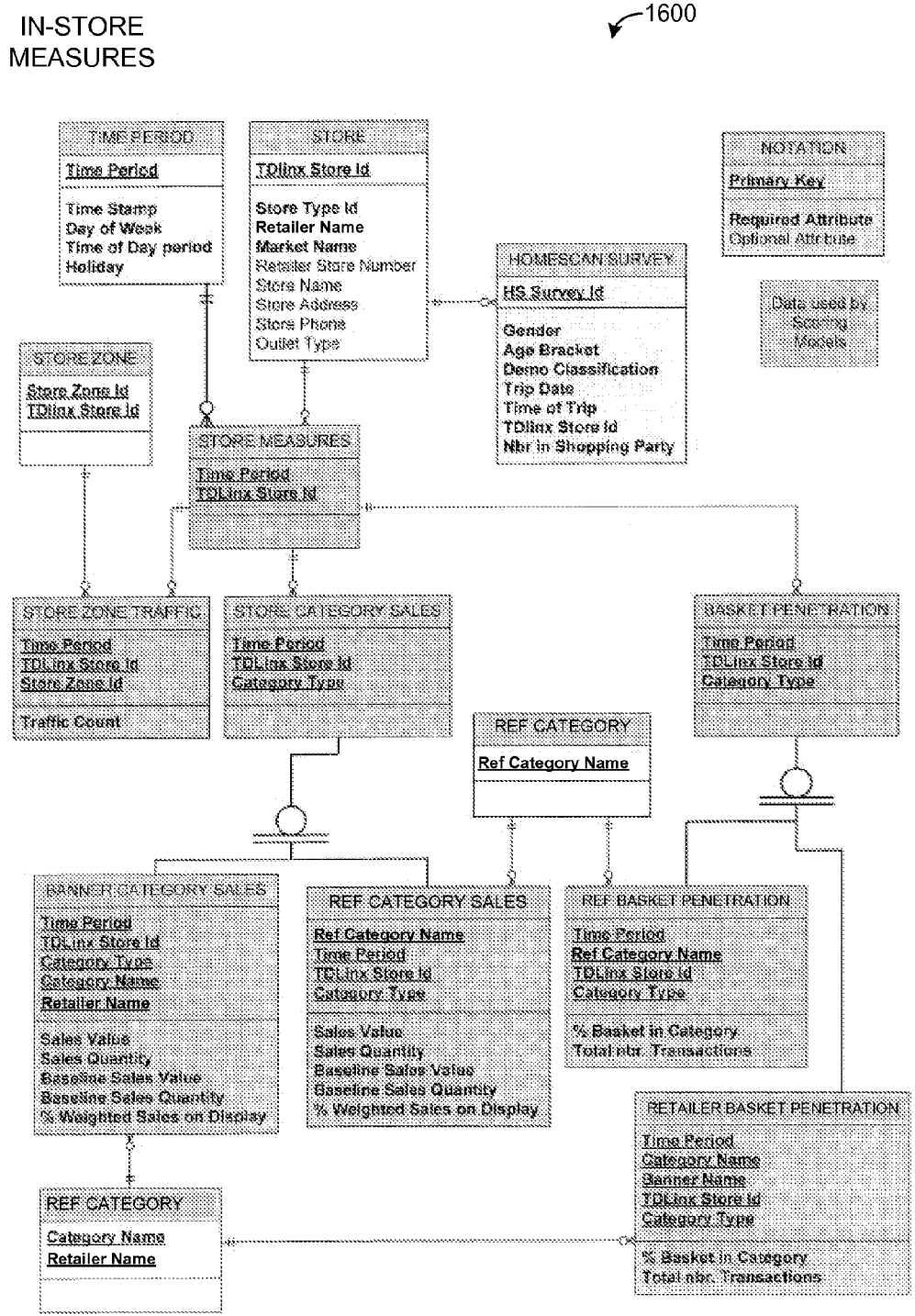
FIG. 16 depicts an example data plan showing various in-store measures that can be generated using the example methods and apparatus described herein.
Figure 17:
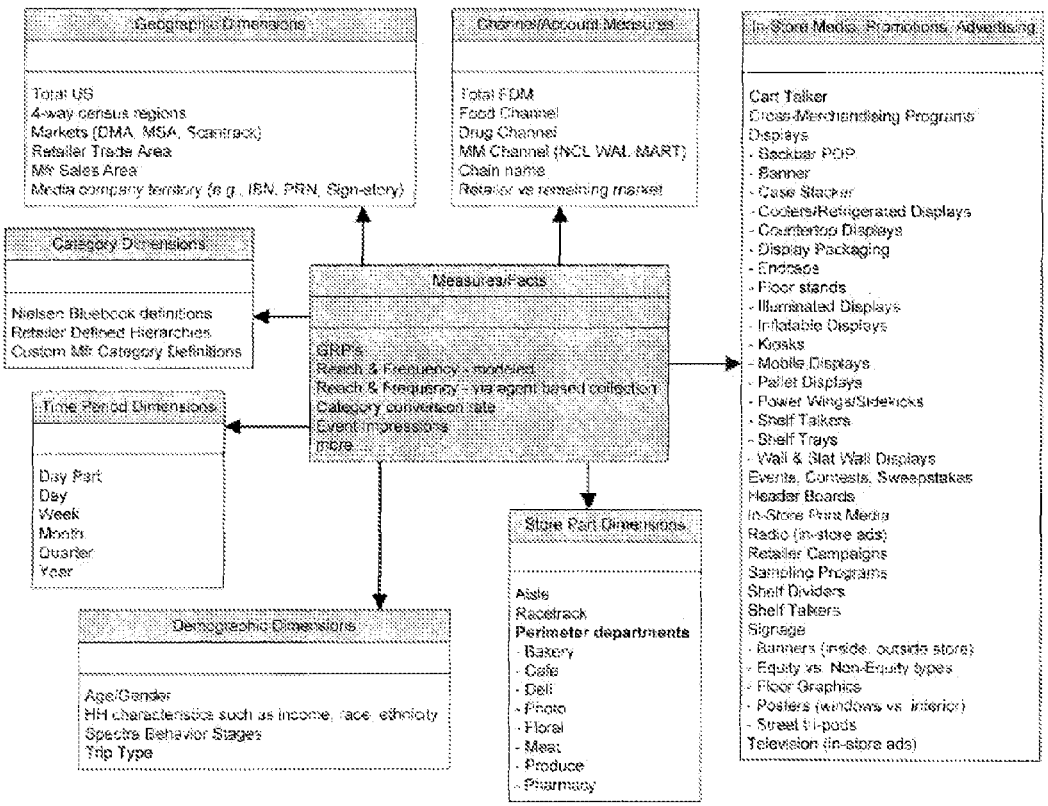
FIG. 17 depicts an example data plan showing various output measures that can be selected for viewing by a client of a metering entity having implemented the example methods and apparatus described herein.

Returning to FIG. 7, after the central data processing server 702 processes and analyzes the information received from the metering entity data server 706, the in-person traffic data server 708, the Homescan® server 710, the retail establishment demographics server 712, the retailer 714, the characteristics server 716, and the traffic model coefficients server 718, the central data processing server 702 communicates in-store related metering information (e.g., forecasted or estimated shopper traffic counts, sales, demographics data in-store media compliance data, in-store media exposure data, etc.) to a client server 720. The client server 720 is configured to provide client access to the in-store related metering information based on a service agreement between the clients and a metering entity. For example, FIG. 16 depicts an example in-store measures data plan 1600 showing various types of in-store measure data that can be generated by the central data processing server 702 and communicated to the client server 720, and FIG. 17 depicts various types of output measure data that can be generated by the central data processing server 702 and communicated to the client server 720. In the illustrated example, clients of the metering entity that implements some or all of the example methods and apparatus described herein may include media agencies, media companies, product manufacturers, and food service retailers. However, a metering entity may additionally or alternatively have other types of clients.

The example calibration data structure 1800 of FIG. 18 may be used to store shopper count information in association with product sales information. The example calibration data structure 1800 stores shopper count information for a plurality of retail establishments that may be used to calibrate the shopper traffic forecasting system 2100 of FIG. 21 to forecast shopper count data for those retail establishments. In the illustrated example, the calibration data structure 1800 includes a product category sales column 1802, a stationary human count column 1804, a sensor count column 1806, an auditor count column 1808, and a store type column 1810. The store type column 1810 stores store type information R that indicates the type of store or layout (e.g., grocery store, department store, specialty store, etc.) of the retail establishment 100. In addition, the information stored in the calibration data structure 1800 is associated with a date-time stamp 1812. The date-time stamp 1812 indicates a particular date and time of day (or day-part) during which the shopper count data was collected and the sales (indicated by the product category sales) were made.

In the illustrated example, the product category sales column 1802 and the shopper count columns 1804, 1806, and 1808 store data records for each store, and each data record stores an array of sales data or count data organized by product category and/or zone (e.g., per each of the zones 102a-h of FIG. 1A). For example, each record in the stationary human count column 1804 stores an array of shopper count values $(H_1 \ldots H_Z)$, in which $H_1$ is a shopper count value corresponding to a first zone (Z=1) (e.g., the zone (1) 102a of FIG. 1A) and $H_Z$ is a shopper count value corresponding to a last zone (Z) (e.g., the zone (8) 102(h) of FIG. 1A) of a retail establishment (e.g., the retail establishment 100 of FIGS. 1A, 1B, and 4). In the illustrated example, the shopper count value $H_1$ indicates the quantity of shoppers located in the zone (1) 102a (FIG. 1A) at the date and time specified by the date-time stamp 1812. The shopper count values stored in the stationary human count column 1804 can be collected by the stationary human counters 408a-e of FIG. 4, the shopper count values (i.e., sensor-based count values) stored in the sensor count column 1806 can be collected using the people detectors 106, 110, and 116a-b of FIG. 1A, and the shopper count values stored in the auditor count column 1808 can be collected by the auditor 402 of FIG. 4 using the full store sweep counting technique described above in connection with FIG. 4. In other example implementations, the shopper count values stored in the sensor count column 1806 may be collected using systems other than the system described above in connection with the people detectors 106, 110, and 116a-b of FIG. 1A.

To store sales data, each record in the product sales column 1802 stores an array of revenue values (e.g., currency amounts, dollar amounts) $(Q_1 \ldots Q_C)$, in which $Q_1$ is a revenue value corresponding to a first category (C=1) that may be located in a first zone (e.g., the zone (1) 102a of FIG. 1) and $Q_C$ is a revenue value corresponding to a last category (C) that may be located in a last zone (e.g., the zone (8) 102h of FIG. 1A) of a retail establishment (e.g., the retail establishment 100 of FIGS. 1A, 1B, and 4). Although revenue values are used in the illustrated example, other types of values such as profit values may alternatively be used. The example zone-category association table 800 of FIG. 8 may be used to determine the zones (e.g., the zones 102a-h) within which particular product/service categories (C) are located. In the illustrated example, the revenue value $Q_1$ indicates the generated revenue amount corresponding to the products located in the zone (1) 102a (FIG. 1A) at the date and time specified by the date-time stamp 1812. Organizing the sales data and the shopper counts by product category and/or zone facilitates determining relationships (e.g., causal relationships) between product sales revenues corresponding to products located in each of the zones 102a-h (FIG. 1A) and the quantities of shoppers located in those zones at a particular date and time indicated by the date-time stamp 1812. The product sales revenues information stored in the product sales column 1802 can be obtained from one or more data structures described above in connection with FIGS. 10-12. In some example implementations, instead of storing revenue values in the product sales column 1802, the product sales column 1802 can instead store item quantities sold per category and/or zone, and the relationship(s) (or causal relationship(s)) can be found between the item quantities sold per zone and the quantities of shoppers in each zone.

Although not shown, the calibration data structure 1800 may be configured to additionally or alternatively include other types of information to calibrate the shopper traffic forecasting system 2100 (FIG. 21) in addition to the store type information R stored in the store type column 1810. For example, the calibration data structure 1800 can store demographic information (e.g., age, household income, etc.) about shoppers, store geographic location information, climate/weather information, holiday/event/special day information indicative of whether the stored data was collected during a holiday, event, or other special day, special sales/promotional information indicative of whether the stored data was collected during a special sale or promotional event related to one or more products, store hours, store layout type, physical dimensions of store, or any other retail establishment characteristics. In this manner, the shopper traffic forecasting system 2100 can be configured to forecast shopper traffic based on one or more of the additional information.

FIG. 19 is an example monitoring data structure 1900 that may be used to store shopper count information and product sales information collected during a monitoring phase of the retail establishment 100 of FIGS. 1A, 1B, and 4. The count data stored in the monitoring data structure 1900 corresponds to zones and/or times for the retail establishment 100 or any other retail establishment for which stationary human count data $(H_1 \ldots H_Z)$ was not collected by, for example, the stationary human counters 408a-e (FIG. 4). However, as described below, a prediction model generated using the count data stored in the calibration data structure 1800 can be used to determine predicted stationary human count data $(h_1 \ldots h_Z)$ for the monitoring data structure 1900 based on the sensor and auditor count data stored in the monitoring data structure 1900.

The shopper traffic forecasting system 2100 can use the predicted stationary human count data $(h_1 \ldots h_Z)$ to find relationship(s) between product sales data and shopper count data collected while monitoring the retail establishment 100. In the illustrated example, the monitoring data structure 1900 includes a product category sales column 1902, a predicted stationary human count column 1904, a sensor count column 1906, an auditor count column 1908, and a store type column 1910. The product category sales column 1902 stores information indicative of sales (indicated by the product category sales) made at a particular date and time of day (or day-part) indicated by a date-time stamp 1912. The column 1904 stores the predicted stationary human counts $(h_1 \ldots h_Z)$ predicted by the shopper traffic forecasting system 2100 based on shopper count data stored in the columns 1906 and 1908 that was collected on the particular date and time of day (or day-part) indicated by the date-time stamp 1912.

FIG. 20 is an example forecasted shopper traffic data structure 2000 that may be used to store forecasted shopper traffic count information. The example forecasted shopper traffic data structure 2000 includes a product category sales column 2002, a forecasted shopper traffic count column 2004, and a store type column 2010. In the illustrated example, the product category sales column 2002 of FIG. 20 stores the same type of information stored in the product category sales column 1902 of FIG. 19 and the product category sales column 1802 of FIG. 18. The information stored in the forecasted shopper traffic count column 2004 is generated by the example shopper traffic forecasting system 2100 of FIG. 21 based on the product sales revenue information of the product category sales column 2002 and is indicative of the predicted or forecasted shopper traffic through zones of a retail establishment on a particular date and time of day (or day-part) indicated by a date-time stamp 2012 for which no stationary human count data ($H_1 \ldots H_Z$), sensor count data ($S_1 \ldots S_Z$), or auditor count data ($A_1 \ldots A_Z$) were collected. In this manner, shopper traffic count data may be predicted for retail establishments without having to employ shopper counting techniques at those retail establishments. In the illustrated example, because the shopper counts collected by the stationary human counters 408a-e of FIG. 4 are relatively more accurate than shopper counts collected using the other described techniques, the shopper traffic forecasting system 2100 is configured to forecast shopper traffic information that is comparable to the relatively high accuracy of the shopper counts collected by the stationary human counters 408a-e.

The forecasted shopper traffic count column 2004 stores records of forecasted shopper traffic for a plurality of stores. Each record stores an array of forecasted shopper traffic count values ($F_1 \ldots F_Z$), in which $F_1$ is a forecasted or estimated shopper traffic count value corresponding to a first zone (e.g., the zone (1) 102a of FIG. 1A) and $F_Z$ is a forecasted or estimated shopper traffic count value corresponding to a last zone (e.g., the zone (8) 102h of FIG. 1A) of a retail establishment (e.g., the retail establishment 100 of FIGS. 1A, 1B, and 4).

FIG. 21 is an example shopper traffic forecasting system 2100 having a traffic count calibrator 2102 and a traffic count generator 2104. The traffic count calibrator 2102 is coupled to a data input interface 2103 via which it receives stationary human count data 2106, auditor count data 2108, sensor count data 2110, product sales revenue data 2112, zone type information 2114, and store type information 2116 to create one or more scoring coefficients ($\alpha$, $\beta$, $\theta$) 2115 associated with prediction/estimation models that can be used subsequently to predict or estimate shopper counts in different zones of one or more retail establishments (e.g., the zones 102a-h of the retail establishment 100 as shown in FIG. 1A) based on product/service sales information (e.g., the product sales revenue information ($Q_1 \ldots Q_c$) stored in the product category sales column 2002 of the forecasted shopper traffic data structure 2000 of FIG. 20). In the illustrated example, the traffic count calibrator 2102 can use the data input interface 2103 to obtain the stationary human count data 2106, the auditor count data 2108, the sensor count data 2110, and the product sales revenue data 2112 from the calibration data structure 1800 described above in connection with FIG. 18. In the illustrated example, the data input interface 2103, the traffic count calibrator 2102, and a data output interface 2117 are implemented using the traffic model coefficients server 718 of FIG. 7. Also, the traffic count generator 2104, a data input interface 2121 communicatively coupled to the traffic count generator 2104, and a data output interface 2123 communicatively coupled to the traffic count generator 2104 are implemented using the central data processing server 702 of FIG. 7. In other example implementations, a single server, computer, or other apparatus may be used to implement the shopper traffic forecasting system 2100.

To generate the calibrated predication model, the traffic count calibrator 2102 uses a constrained non-linear regression function shown in equation 1 below based on stationary human counts obtained at a reference store using the stationary human counters 408a-e, auditor counts collected by the auditor 402 performing a full store sweep, and sensor counts. In this manner, the traffic forecasting system 2100 can be used to determine relatively accurate predictions or forecasts of shopper traffic in different zones of retail establishments that do not employ stationary human counters (e.g., the stationary human counters 408a-e) and/or other counting techniques (e.g., auditor counting techniques and sensor counting techniques). Thus, the traffic forecasting system 2100 is calibrated using data collected in one or more retail establishments using the stationary human counters 408a-e, the auditor 402, and the people detectors 106, 110, 116a-b to forecast shopper traffic based on the product sales revenue data 2112 of retail establishments for which no shopper count data is collected. In the illustrated example, the constrained non-linear regression function of equation 1 is configured to target generating predictions with the least amount of error relative to the stationary human shopper counts that would actually be observed by the stationary human counters 408a-e.

$$H_{tz} = f(A_{tz}; S_{t1}, S_{t2}, \ldots S_{tm}; Z) \quad \text{Equation 1}$$

In the illustrated example, the non-linear regression function ($f$) of equation 1 is used to determine a functional relationship between an auditor count value $A_{tz}$, sensor-based count values $S_{t1}, S_{t2}, \ldots S_{tm}$, and zone type information Z that corresponds to a stationary count value $H_{tz}$. The stationary human count value $H_{tz}$ is a shopper count observed or collected by one of the stationary human counters 408a-e in a zone z and at a time t. The auditor count value $A_{tz}$ is a shopper count collected by the auditor 402 of FIG. 4 in a zone z and at a time t using the full store sweep counting technique described above in connection with FIG. 4. The sensor-based count values $S_{t1}, S_{t2}, \ldots S_{tm}$ are sensor-based shopper counts collected by the people detectors 106, 110, and 116a-b at different locations throughout the retail establishment 100 at a time t. The sensor-based count values $S_{t1}, S_{t2}, \ldots S_{tm}$ can be counts stored at or generated by each of the people detectors 106, 110, and 116a-b and can be used by the regression function ($f$) of equation 1 to determine the quantity of shoppers in a particular one of the zones 102a-h (FIG. 1A) at the time t. For example, referring briefly to FIG. 1A, if the people detectors 116a-b have particular exit and entrance count values indicative of the number of shoppers that have entered the zone (2) 102b and the number of shoppers that have exited the zone (2) 102b, the regression function ($f$) of equation 1 can determine the quantity of shoppers in the zone (2) 102b at that particular time. In an alternative example implementation, the regression function ($f$) of equation 1 may use a predetermined sensor-based count value from the calibration data structure 1800 of FIG. 18 indicative of a shopper count in a particular zone instead of having to determine the shopper count in the zone based on all the sensor-based counts throughout the retail establishment 100. The zone type information variable Z is indicative of additional characteristic information of a particular one of the zones 102a-h. In some example implementations, the zone type information Z may be indicative of more than one zone type of characteristic. For example, the zone type information Z may be indicative of product categories, in-store locations (e.g., peripheral, linear aisle, race track, etc.), freezer locations, etc.

After determining the functional relationships between the auditor count value $A_{tz}$, the sensor count values $S_{t1}, S_{t2}, \ldots S_m$ and the zone type information Z corresponding to each of the stationary human count values $H_{tz}$ for each of the zones 102*a*-*h*, the traffic count calibrator 2102 determines functional relationships between product sales revenues in each of the zones $Q_{tc}$, store type information R, and predicted stationary human counts $h_{tz}$ (e.g., the predicted stationary human counts $h_1 \ldots h_Z$ of FIG. 19) using equation 2 below based on data collected in the retail establishment 100 of FIGS. 1A, 1B, and 4.

$$(h_{t1}, h_{t2}, \ldots, h_{tz}) = g(Q_{t1}, Q_{t2}, \ldots, Q_{tc}; R) \qquad \text{Equation 2}$$

The predicted stationary human counts $h_{t1}, h_{t2}, \ldots, h_{tz}$ of equation 2 above can be determined for times t and/or zones z (e.g., the zones 102*a*-*h*) for which stationary human counts ($H_1 \ldots H_Z$) were not collected. The predicted stationary human counts $h_{t1}, h_{t2}, \ldots, h_{tz}$ may be predicted using the functional relationships determined using equation 1 above by fitting the sensor counts ($S_1 \ldots S_Z$) and auditor counts ($A_1 \ldots A_Z$) stored in the monitoring data structure 1900 to functional relationship data generated based on the stationary human counts ($H_1 \ldots H_Z$), sensor-based counts ($S_1 \ldots S_Z$), and the auditor counts ($A_1 \ldots A_Z$). After determining the predicted stationary human counts $h_{t1}, h_{t2}, \ldots, h_{tz}$, equation 2 above can be used to determine functional relationships between the predicted stationary human counts $h_{t1}, h_{t2}, \ldots, h_{tz}$, the product sales revenues $Q_{t1}, Q_{t2}, \ldots, Q_{tc}$ and the store type information R. In the illustrated example, the product sales revenues $Q_{t1}, Q_{t2}, \ldots, Q_{tc}$ can be obtained from the product category sales column 1902 of the monitoring data structure 1900 (FIG. 19). The store type information R may be used to indicate the store type (e.g., grocery store, department store, specialty store, etc.) of the retail establishment corresponding to the estimated stationary human counts $h_{t1}, h_{t2}, \ldots, h_{tz}$ and the product sales revenues $Q_{t1}, Q_{t2}, \ldots, Q_{tc}$.

Although not shown, equation 2 may be configured to additionally or alternatively include other types of information to calibrate the shopper traffic forecasting system 2100 in addition to the store type information R. For example, equation 2 may be configured to include one or more of store demographic information (e.g., age, household income, etc.) about shoppers, store geographic location information, climate/weather, holiday/event/special day information indicative of whether the stored data was collected during a holiday, event, or other special day, special sales/promotional information indicative of whether the stored data was collected during a special sale or promotional event related to one or more products, store hours, store layout, physical dimensions of store, and/or any other retail establishment characteristics. In this manner, the shopper traffic forecasting system 2100 can be configured to forecast shopper traffic based on one or more of the additional information.

In the illustrated example, the traffic count calibrator 2102 uses equation 2 above to fit or determine the functional relationships between the estimated stationary human counts $h_{tz}$ and the product sales revenues $Q_{t1}, Q_{t2}, \ldots, Q_{tc}$ using a regression function (g) based on canonical correlates. Specifically, the traffic count calibrator 2102 is configured to determine k canonical variates $V_1, V_2 \ldots V_k$ based on the stationary human counts $h_{t1}, h_{t2}, \ldots, h_{tz}$ of equation 2 above and k canonical variates $W_1, W_2 \ldots W_k$ based on the product sales revenues $Q_{t1}, Q_{t2}, \ldots, Q_{tc}$ of equation 2 above. Treating the human counts $h_{t1}, h_{t2}, \ldots, h_{tz}$ as dependent variables and the product sales revenues $Q_{t1}, Q_{t2}, \ldots, Q_{tc}$ and the store layout information R as independent variables, the traffic count calibrator 2102 is configured to generate the results of a canonical correlation analysis of the canonical variates $V_1, V_2 \ldots V_k$ (associated with shopper traffic) and $W_1, W_2 \ldots W_k$ (associated with sales) in a matrix format represented by equations 3 and 4 below.

$$V = h\alpha \qquad \text{Equation 3}$$

$$W = (Q\|R)\beta \qquad \text{Equation 4}$$

In equation 3, a dependent canonical weight coefficient ($\alpha$) is used to transform the dependent stationary human counts $h_{t1}, h_{t2}, \ldots, h_{tz}$ and an independent canonical weight coefficient ($\beta$) is used to transform the independent product sales revenues $Q_{t1}, Q_{t2}, \ldots, Q_{tc}$ and the independent store type information R.

Using the matrices of equations 3 and 4, the traffic count calibrator 2102 runs regressions for each store type represented by the store type information R to derive regression coefficients ($\theta$). The regressions of the canonical variates $V_1, V_2 \ldots V_k$ from equation 3 above and $W_1, W_2 \ldots W_k$ from equation 4 above (i.e., $V_1 = \theta_{01} + \theta_{11}W_1 + \theta_{21}W_2 + \ldots + e_1$; $V_2 = \theta_{02} + \theta_{12}W_1 + \theta_{22}W_2 + \ldots + e_2; \ldots ; V_k = \theta_{0k} + \theta_{1k}W_1 + \theta_{2k}W_2 + \ldots + e_k$) can be expressed in matrix notation as shown in equation 5 below.

$$V = W\theta + e \qquad \text{Equation 5}$$

In equation 5 above, the regression coefficient ($\theta$) is determined so that an amount of error (e) is minimized to produce the substantially best-fit correlation between the shopper traffic variates (V) and the sales variate (W). In this manner, a shopper traffic model based on the coefficients ($\alpha, \beta, \theta$) 2115 (FIG. 21) can be used to determine forecasted or estimated shopper traffics with error that is as minimal as possible. In the illustrated example, the coefficients ($\alpha, \beta, \theta$) 2115 are scoring coefficients that the traffic count generator 2104 can use to estimate or forecast shopper traffic in other retail establishments in which shopper counts are not collected, but product sales revenues Q and store types R are known or are predicted.

After generating the scoring coefficients ($\alpha, \beta, \theta$) 2115, the traffic count calibrator 2102 communicates the coefficients ($\alpha, \beta, \theta$) 2115 via the data output interface 2117 to the traffic count generator 2104. The traffic count generator 2104 receives the coefficients ($\alpha, \beta, \theta$) 2115, product sales data (Q) 2118, and store type information (R) 2120 for a particular retail establishment via the data input interface 2121 and uses the scoring coefficients ($\alpha, \beta, \theta$) 2115, the product sales data (Q) 2118, and the store type information (R) 2120 to generate forecasted or estimated shopper traffic 2122 based on equation 4 and 5 above and equation 6 below. In particular, the traffic count generator 2104 uses equation 4 above in connection with known or predicted product sales data (Q) 2118 and known or predicted store type information (R) 2120 to determine a sales variate (W) for each time t and/or zone z based on the independent canonical weight coefficient ($\beta$). The traffic count generator 2104 then uses equation 5, omitting the error factor (e) (i.e., $V = W\theta$), to determine a traffic variate (V) for each time t and/or zone z based on the sales variate(s) (W) determined using equation 4 and the regression coefficient ($\theta$). After determining the traffic variate(s) (V), the traffic count generator 2104 uses equation 6 below to determine (e.g., estimate or forecast) stationary human count(s) (h) representative of the shopper traffic (F) 2122.

$$h = V\alpha^{-1} \qquad \text{Equation 6}$$

Equation 6 is an algebraic rearrangement of equation 3 above that the traffic count generator 2104 uses to estimate or forecast a stationary human count (h) for each time t and/or zone z by multiplying the traffic variate(s) (V) by the inverse value of the dependent canonical weight coefficient ($\alpha$). The estimated or forecasted stationary human count(s) (h) can be determined to be representative of the shopper traffic (F) 2122 in a retail establishment (e.g., the retail establishment 100 of FIG. 1A) and/or different zones (e.g., the zones 102a-h of FIG. 1) of the retail establishment.

In the illustrated example, the traffic count generator 2104 can use the data input interface 2121 to receive the product sales data (Q) 2118 from the product category sales column 2002 of the forecasted shopper traffic data structure 2000 of FIG. 20 (or a substantially similar or identical data structure) and can use the data output interface 2123 to store the forecasted or estimated shopper traffic data (F) 2122 in the forecasted shopper traffic count column 2004 of the forecasted shopper traffic data structure 2000.

In some example implementations, the traffic count generator 2104 can be used to determine the shopper traffic counts (F) 2122 based on different demographics of shoppers and/or stores. That is, the shopper traffic counts (F) 2122 can be decomposed or separated into separate shopper traffic counts corresponding to respective shoppers and/or respective stores associated with corresponding demographic data (e.g., personal demographic data and/or store demographic data). For example, the decomposition or separation may be performed by obtaining the estimated total shopper traffic (F) 2122 at a store/category/time level from the traffic count generator 2104 (e.g., an estimated traffic count for Acme Grocery Store on Monday morning corresponding to soft drink sales is equal to 200 total people); obtaining corresponding demographic composition estimates from survey responses from the Homescan® server 710 (FIG. 7) (e.g., the survey responses indicate that of all Homescan®-surveyed trips to Acme Grocery Store on Monday mornings that included soft drinks, 50% were adult females, 35% were adult males, 15% children); and using the demographic composition estimate percentages to separate or decompose the estimated total shopper traffic (F) 2122 into separate shopper traffic counts based on demographic categories (e.g. 100 adult females, 70 adult males, 30 children).

Figure 22:
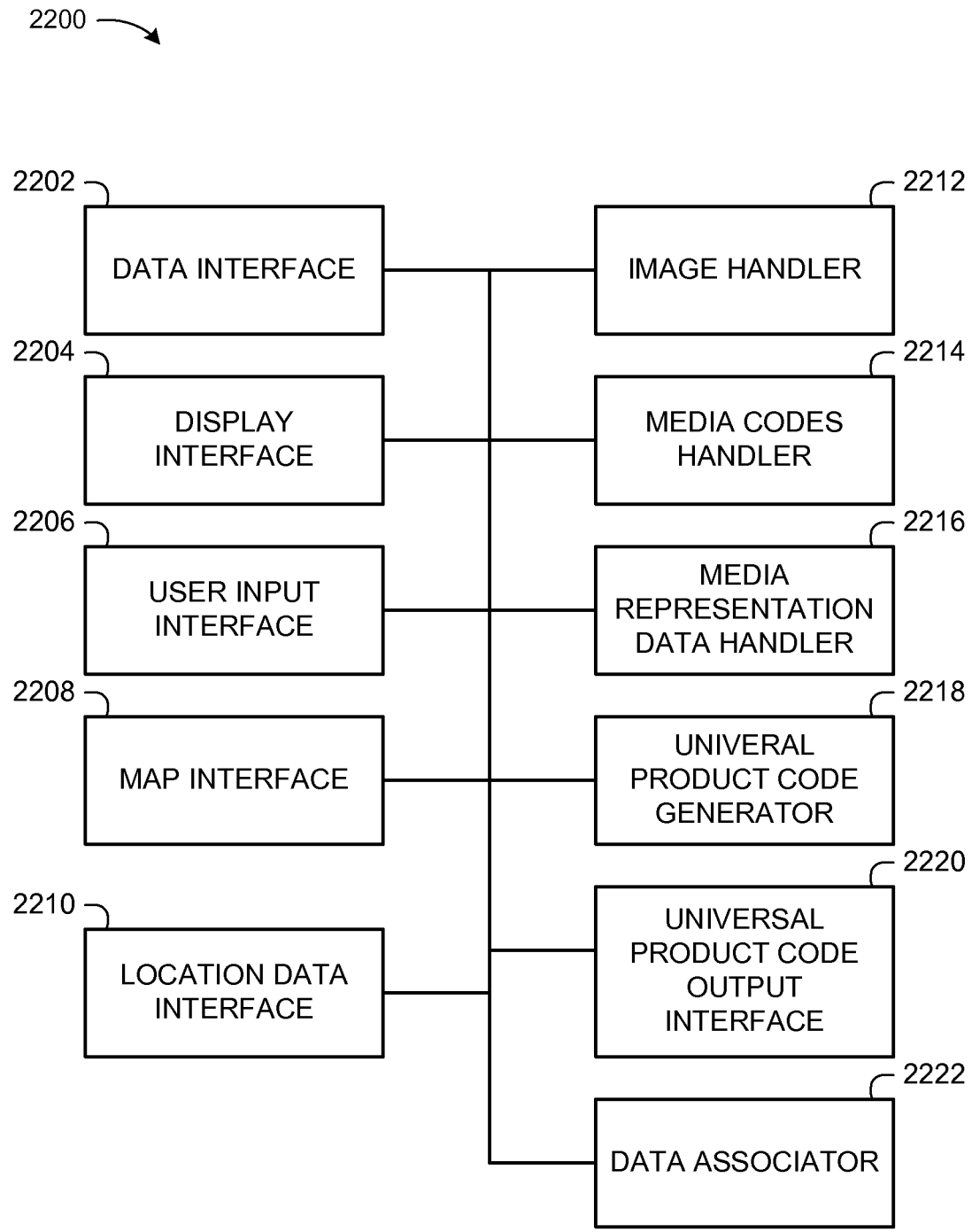
FIG. 22 is a block diagram of an example apparatus that may be used to analyze and code images of in-store advertisement and/or informational media, determine whether advertisement and/or informational media are presented in compliance with expected instructions and/or a contractual agreement, and determine when the media were exposed to shoppers in a retail establishment.
Figure 23:
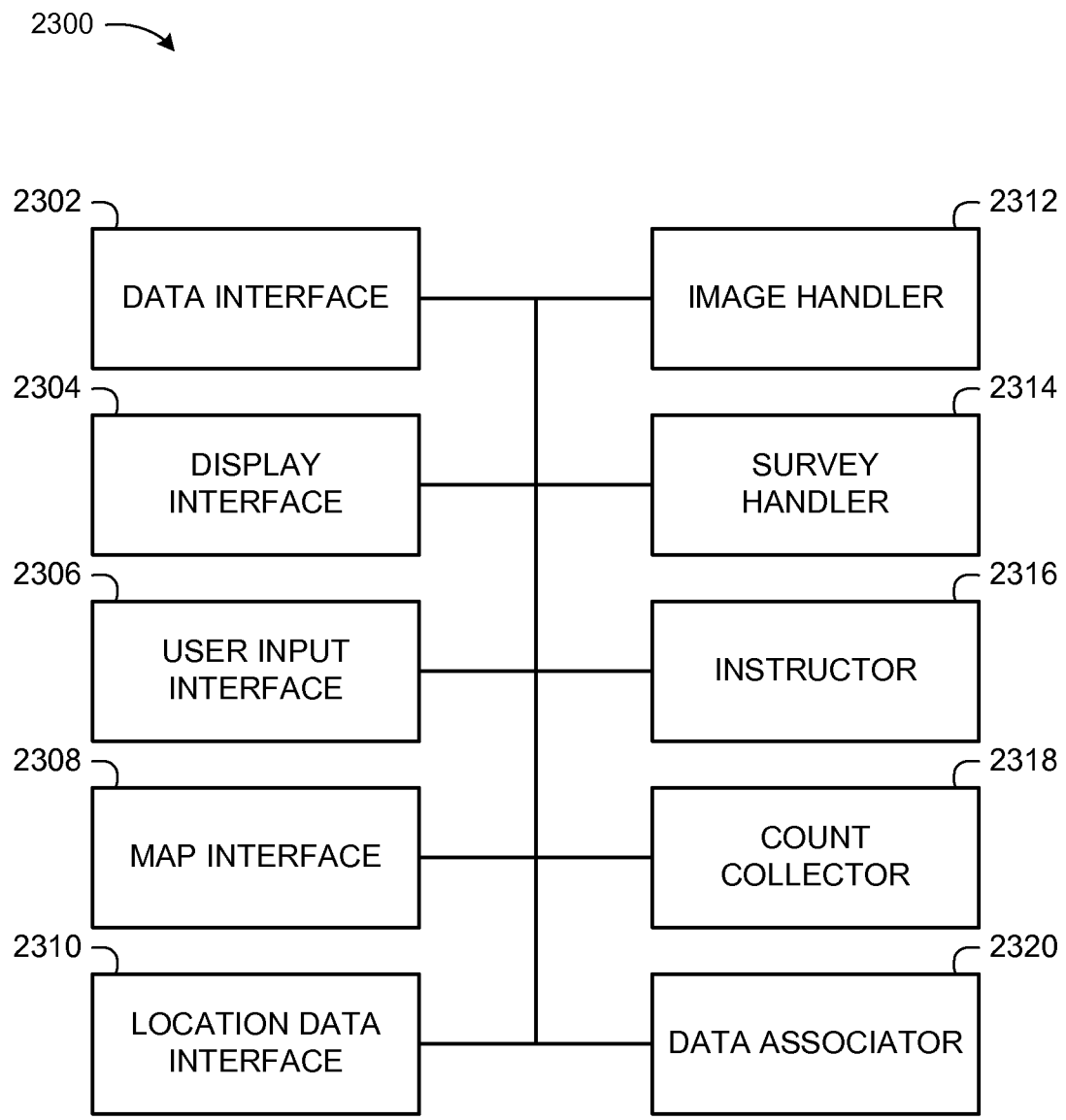
FIG. 23 is a block diagram of an example apparatus that may be used to instruct auditors to count shoppers in a retail establishment and/or collect photographic images and/or other related data of in-store advertisement/informational media.
Figure 24:
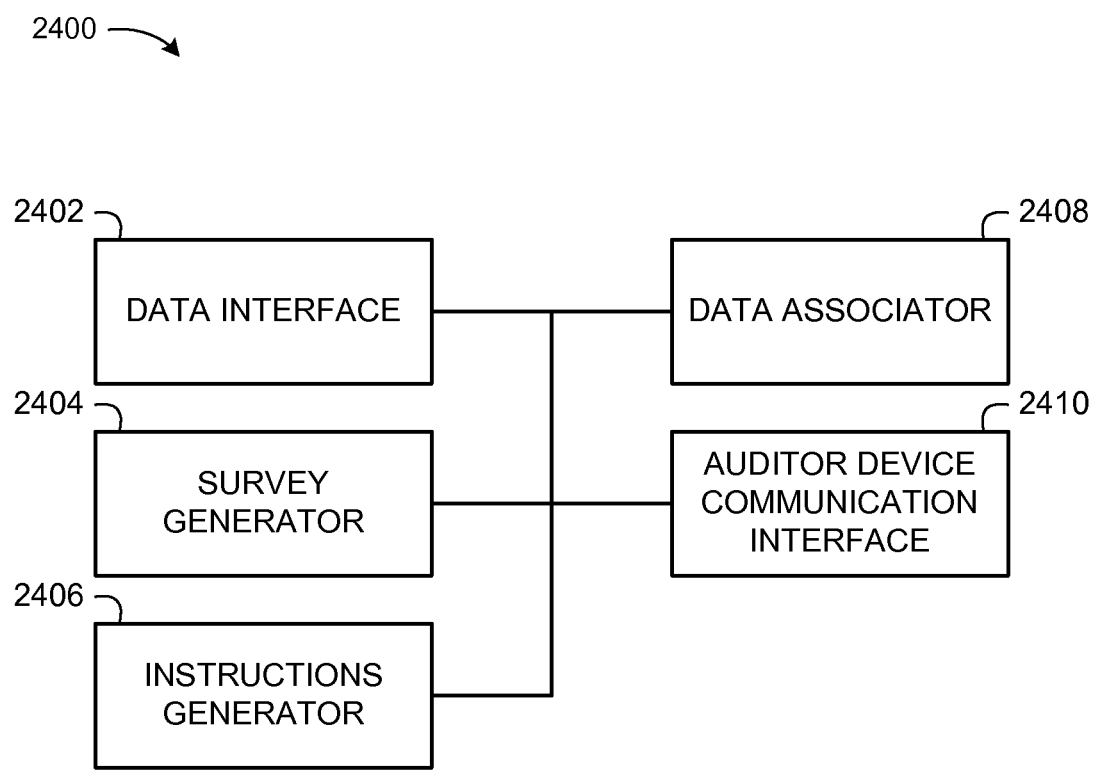
FIG. 24 is a block diagram of an example apparatus that may be used to generate auditor surveys and instructions to instruct auditors how to audit retail establishments to collect advertisement/informational media information and/or shopper counts.

FIG. 22 is a block diagram of an example apparatus 2200 that may be used to analyze and code images (e.g., digital photographic images) of advertisement and/or informational media, determine whether advertisement and/or informational media are presented in compliance with expected instructions and/or a contractual agreement, and determine when the media were exposed to shoppers in a retail establishment. FIG. 23 is a block diagram of an example apparatus 2300 that may be used to instruct auditors (e.g., the auditor 164 of FIG. 1B, the auditor 402 of FIG. 4, or any other auditors) to count shoppers in a retail establishment and/or collect photographic images and/or other related data of in-store advertisement/informational media. FIG. 24 is a block diagram of an example apparatus 2400 that may be used to generate auditor surveys and instructions to instruct auditors how to audit retail establishments to collect advertisement/informational media information and/or shopper counts. In the illustrated example of FIG. 22, the example apparatus 2200 includes a data interface 2202, a display interface 2204, a user input interface 2206, a map interface 2208, a location data interface 2210, an image handler 2212, a media codes handler 2214, a media representation data handler 2216, a universal product code generator 2218, a universal product code output interface 2220, and a data associator 2222. In the illustrated example of FIG. 23, the example apparatus 2300 includes a data interface 2302, a display interface 2304, a user input interface 2306, a map interface 2308, a location data interface 2310, an image handler 2312, a survey handler 2314, an instructor 2316, a count collector 2318, and a data associator 2320. In the illustrated example of FIG. 24, the example apparatus 2100 is provided with a data interface 2402, a survey generator 2404, an instructions generator 2406, a data associator 2408, and an auditor device communication interface 2410.

The example apparatus 2200, 2300, and 2400 may be implemented using any desired combination of hardware, firmware, and/or software. For example, one or more integrated circuits, discrete semiconductor components, and/or passive electronic components may be used. Thus, for example, any of the data interface 2202, the display interface 2204, the user input interface 2206, the map interface 2208, the location data interface 2210, the image handler 2212, the media codes handler 2214, the media representation data handler 2216, the universal product code generator 2218, the universal product code output interface 2220, the data associator 2222, the data interface 2302, the display interface 2304, the user input interface 2306, the map interface 2308, the location data interface 2310, the image handler 2312, the survey handler 2314, the instructor 2316, the count collector 2318, the data associator 2320, the data interface 2402, the survey generator 2404, the instructions generator 2406, the data associator 2408, and/or the auditor device communication interface 2410, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc.

Figure 45:
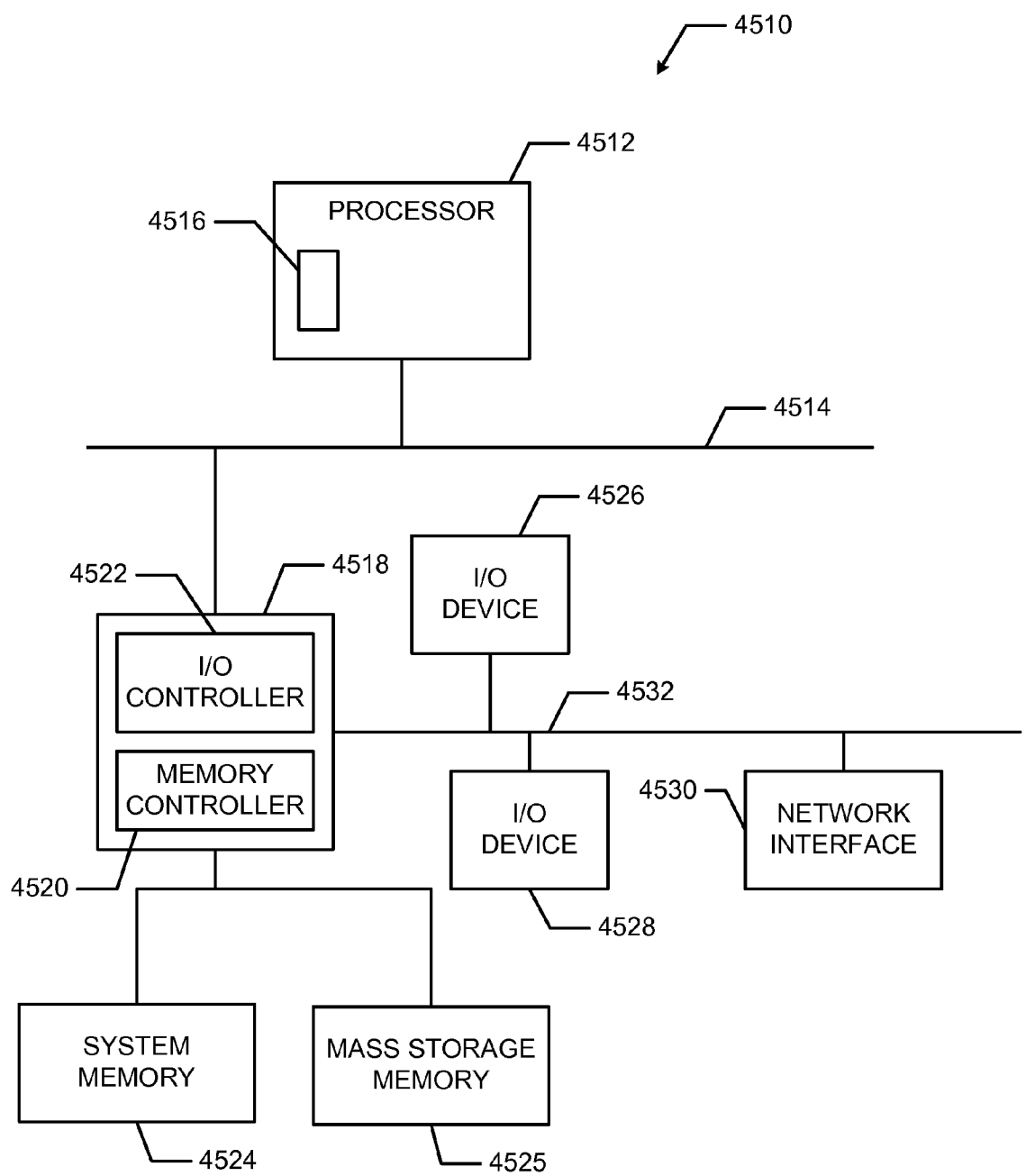
FIG. 45 is a block diagram of an example processor system that may be used to implement some or all of the example methods and apparatus described herein.

Some or all of the data interface 2202, the display interface 2204, the user input interface 2206, the map interface 2208, the location data interface 2210, the image handler 2212, the media codes handler 2214, the media representation data handler 2216, the universal product code generator 2218, the universal product code output interface 2220, the data associator 2222, the data interface 2302, the display interface 2304, the user input interface 2306, the map interface 2308, the location data interface 2310, the image handler 2312, the survey handler 2314, the instructor 2316, the count collector 2318, the data associator 2320, the data interface 2402, the survey generator 2404, the instructions generator 2406, the data associator 2408, and/or the auditor device communication interface 2410, or parts thereof, may be implemented using instructions, code, and/or other software and/or firmware, etc. stored on a machine accessible medium and executable by, for example, a processor system (e.g., the example processor system 4510 of FIG. 45). When any of the appended claims are read to cover a purely software and/or firmware implementation, at least one of the data interface 2202, the display interface 2204, the user input interface 2206, the map interface 2208, the location data interface 2210, the image handler 2212, the media codes handler 2214, the media representation data handler 2216, the universal product code generator 2218, the universal product code output interface 2220, the data associator 2222, the data interface 2302, the display interface 2304, the user input interface 2306, the map interface 2308, the location data interface 2310, the image handler 2312, the survey handler 2314, the instructor 2316, the count collector 2318, the data associator 2320, the data interface 2402, the survey generator 2404, the instructions generator 2406, the data associator 2408, and/or the auditor device communication interface 2410 is hereby expressly defined to include a tangible medium such as a memory, DVD, CD, etc. storing the software and/or firmware.

Turning in detail to FIG. 22, the example apparatus 2200 may be implemented using a portable auditor device (e.g., the handheld computer 170 of FIG. 1B, a portable data input device 404 of FIG. 4, or any other suitable portable device) or any other processor system (e.g., a desktop computer, a laptop, etc.) via which a person can analyze and code images (e.g., digital photographic images) of advertisement and/or informational media, determine whether advertisement and/or informational media are displayed in compliance with expected instructions and/or a contractual agreement, and/or to determine when the media were exposed to shoppers in a retail establishment. In the illustrated example, the example apparatus 2200 is provided with the data interface 2202 to retrieve data from and store data to one or more memories. The display interface 2204 is configured to display information via a display to a user including, for example, store layout maps, user interface controls, advertisement/informational media images, media coding information, product code information, advertisement/informational media images, etc. The user input interface 2206 is configured to receive user input via, for example, buttons, a keypad, a touchscreen, a barcode scanner, an RFID scanner, and/or any other user interface hardware and/or software.

The map interface 2208 is configured to retrieve floor layout maps of retail establishments, product/service categorical information, and zone information via the data interface 2202 and cause the display interface 2204 to display the maps, categorical information, and zone information to a user. For example, after a user selects a retail establishment via the user input interface 2206, the map interface 2208 may generate a request to retrieve corresponding map, category, and zone information. The map interface 2208 can then cause the display interface 2204 to display the floor layout map and overlay the category information and zone information on the floor layout map so that a user may reference the displayed information while auditing media in a store.

The location data interface 2210 is configured to detect, identify, or determine locations of a retail establishment based on selections made by a user via a displayed map or any other user interface control. For example, a user may select a particular location of a retail establishment for which to code advertisement/informational media in that location. In some instance, the location information may be zone identifiers (e.g., identifiers for the zones 102a-h of FIGS. 1A and 4). In other instances, the location information can be more granular and based on, for example, a local coordinate system of the retail establishment.

In some example implementations, the location data interface 2210 can also be configured to retrieve location information collected in association with shoppers as the shoppers moved throughout a retail establishment. Such shopper location information can define a shopper path of travel that can be used to determine when a corresponding shopper was exposed to advertisement/informational media throughout a retail establishment. For example, the location data interface 2210 can compare the shopper location information with location information stored in association with in-store media profiles to identify when media exposures occurred.

The image handler 2212 is configured to retrieve images (e.g., digital photographic images) of advertisement/informational media (e.g., the media 152a-h of FIG. 1B) in a retail establishment via the data interface 2202 and cause the display interface 2204 to display the images to a user. For example, the image handler 2212 can retrieve images based on location information from the location data interface 2210 representative of a location in a retail establishment selected by a user. That is, images may be stored in a memory in association with location information indicative of the locations in a retail establishment at which the images were captured.

The media codes handler 2214 is configured to retrieve zone tag codes (e.g., the zone tag codes of the zone tags drop down list 608 of FIG. 6), media characteristics codes (e.g., the media characteristics codes of the media characteristics codes selection control 610 of FIG. 6), and media type classification codes (e.g., the media type classification codes of the media type classification codes selection control 614 of FIG. 6) via the data interface 2202. In addition, the media codes handler 2214 causes the display interface 2204 to display the media codes to a user to enable the user to make code selections.

The media representation handler 2216 is configured to retrieve audio codes and/or audio signatures representative of audio-based and/or video-based media (e.g., the audio advertisement media 152g and video advertisement media 152h of FIG. 1B) in a retail establishment via the data interface 2202. For example, the media representation handler 2216 can retrieve audio codes and/or signatures based on location information from the location data interface 2210 representative of a location in a retail establishment selected by a user. That is, audio codes and/or signatures may be stored in a memory in association with location information indicative of the locations in a retail establishment at which the audio codes and/or signatures were collected.

The universal product code generator 2218 is configured to generate a universal product code for each advertisement/informational medium that is coded with associated zone information and media codes (e.g., media characteristics codes and/or media type classification codes). Each universal product code is to uniquely identify a corresponding advertisement/informational medium. The universal product code output interface 2220 is configured to print or encode the universal product codes onto respective labels, RFID's, or any other medium that can be used to adhere or otherwise place the universal product codes onto respective media. In this manner, auditors performing subsequent media audits can scan the universal product codes to collect information indicative of which media are displayed in different retail establishments.

A data associator 2222 is configured to associated zone information, media coding information, and universal product codes with respective images of advertisement/informational media. In addition, the data associator 2222 can be configured to store exposure credits in association with respective images and/or identifiers of advertisement/informational media to indicate when shoppers were determined to have been exposed to those media. The data associator 2222 can store the data in association with one another in a memory via the data interface 2202.

The data associator 2222 can also be configured to associate compliance information with advertisement/informational media to indicate whether those media were presented or displayed as expected in accordance with instructions and/or a contractual agreement. In addition, when an advertisement/informational medium is expected to be presented on a particular date, the data associator 2222 is configured to store an in-compliance indicator if the advertisement/informational medium is presented as expected based on a schedule or a non-compliance indicator if the advertisement/informational medium is not presented as expected based on the schedule. For example, if an image of a particular zone (e.g., one of the zones 102a-h of FIGS. 1A and 4) captured on a first date is displayed in the previous visit image view window 604

(FIG. 6) and another image of the same zone captured on a second date and displayed in the current visit image view window 606 (FIG. 6) are expected to show that the same advertisement/informational medium is being presented in that zone on both dates based on a schedule for that medium, the data associator 2222 stores in-compliance information associated with the advertisement/informational medium if the medium is represented in the first image and the second image. However, if the advertisement/informational medium is not represented in the first image and the second image, the data associator 2222 stores non-compliance information associated with the medium.

Turning now to FIG. 23, the example apparatus 2300 may be implemented using a portable auditor device (e.g., the handheld computer 170 of FIG. 1B, a portable data input device 404 of FIG. 4, or any other suitable portable device) or any other suitable processor system via which an auditor (e.g., the auditor 164 of FIG. 1B, the auditor 402 of FIG. 4, or any other auditor) can collect shopper traffic count data. In the illustrated example, the example apparatus 2300 is provided with the data interface 2302 to retrieve data from and store data to one or more memories. The display interface 2304 is configured to display information via a display to a user including, for example, store layout maps, user interface controls, survey information, shopper count data, advertisement/informational media images, etc. The user input interface 2306 is configured to receive user input via, for example, buttons, a keypad, a touchscreen, a barcode scanner, an RFID scanner, and/or any other user interface hardware and/or software.

The map interface 2308 is configured to retrieve floor layout maps, product/service categorical information, and zone information of retail establishments via the data interface 2302 and cause the display interface 2304 to display the maps, categorical information, and zone information to a user. For example, after a user selects a retail establishment via the user input interface 2306, the map interface 2308 may generate a request to retrieve corresponding map, category, and zone information. The map interface 2308 can then cause the display interface 2304 to display the floor layout map and overlay the category information and zone information on the floor layout map so that a user may reference the displayed information while collecting shopper counts in a store.

The location data interface 2310 is configured to detect, identify, or determine locations of a retail establishment and/or associated with a displayed map. For example, a user may select a particular location of a retail establishment for which to collect shopper counts. In some example implementations, the location data interface 2310 may receive detected location information from a location detection device such as, for example, receiver device 154 and/or the portable location device 168 of FIG. 1B. Alternatively, a shopper count auditing application executed by a portable auditor device and/or the example apparatus 2300 may automatically specify a location of the retail establishment for which an auditor is to collect shopper counts. In some instance, the location information may be zone identifiers (e.g., identifiers for the zones 102a-h of FIGS. 1A and 4). In other instances, the location information can be more granular and based on, for example, a local coordinate system of the retail establishment.

The image handler 2312 is configured to retrieve images (e.g., digital photographic images) (e.g., the example zone photographs 502a-h of FIG. 5) of zones (e.g., the zones 102a-h of FIGS. 1A and 4) in a retail establishment via the data interface 2302 and cause the display interface 2304 to display the images to a user. For example, the image handler 2312 can retrieve images based on location information from the location data interface 2310 representative of a location in a retail establishment selected by a user. That is, images may be stored in a memory in association with location information indicative of the locations in a retail establishment at which the images were captured.

The survey handler 2314 is configured to retrieve auditor surveys via the data interface 2302 and cause the display interface 2304 to display the auditor surveys to an auditor as the auditor performs full store sweeps of a retail establishment. The auditor survey can be a list of questions to gather information from the auditor during a full store sweep about the surrounding conditions in the retail establishment, the auditor's ability to obtain accurate count information, and any other information that may be used to judge the accuracy or completeness of the auditor's shopper count data when the count data is uploaded to the in-person traffic data server 708 of FIG. 7. The auditor survey can be displayed via the display interface 2304 prior to, during, or after the auditor performs a full store sweep, and the auditor can provide responses via the user input interface 2306.

The instructor 2316 is configured to retrieve instructions for conducting a shopper count audit and cause the display interface 2304 to display the instructions to an auditor during a full store sweep as the auditor collects shopper counts. The instructions instruct the auditor how to perform a full store sweep and collect the shopper counts. For example, the instructions may instruct an auditor to move along a particular path (e.g., the walk-through path 400 of FIG. 4) throughout a retail establishment while collecting counts. In some example implementations, the display interface 2304 can be configured to display the instructions together with the survey information from the survey handler 2314.

The count collector 2318 is configured to collect shopper counts provided by a user via the user input interface 2306 and tally count data for respective zones (e.g., the zones 102a-h of FIGS. 1A and 4). The count collector 2318 can then store the count data in a memory via the data interface 2302. The data associator 2320 is configured to operate in combination with the count collector 2318 to associate shopper counts with respective zone identifiers (e.g., identifiers of the zones 102a-h) and respective retail establishment identifiers and store respective information in association with one another in a memory via the data interface 2302.

Turning now to FIG. 24, the data interface 2402 is configured to retrieve data from and store data to one or more memories. The survey generator 2404 is configured to generate auditor surveys for use by auditors during a full store sweep process to collect advertisement/informational media information and/or shopper counts. The auditor surveys may be designed to obtain information about the surrounding conditions in a retail establishment, an auditor's ability to obtain accurate media information and/or count information, and/or any other information that may be used to judge the accuracy or completeness of collected data. In the illustrated example, the survey generator 2404 is configured to generate auditor surveys based on user input and/or pre-defined, stored survey questions.

The instructions generator 2406 is configured to create auditing instructions to instruct an auditor how to audit a retail establishment to collect advertisement/informational media information and/or shopper counts. For example, the instructions generator 2406 may generate instructions that instruct an auditor to move along a particular path (e.g., the walk-through path 400 of FIG. 4) throughout a retail establishment while collecting advertisement/informational media information and/or shopper counts.

The data associator 2320 is configured to associate auditing instructions and auditor surveys with respective retail establishments and store the instructions and surveys in association with respective retail establishment identifiers via the data interface 2302. In some example implementations, the data associator 2320 may also be configured to associate different auditing instruction steps and different auditor survey questions in association with respective retail establishment zones (e.g., identifiers of the zones 102*a-h*) so that as an auditor is instructed to move to different areas of a retail establishment, the instructions and auditor survey questions will be presented in an order relevant to the auditor's location within the retail establishment.

The auditor device communication interface 2410 is configured to communicate or synchronize auditor surveys, auditor instructions, store layout maps, product/service category information, zone information, and/or zone photographic images (e.g., the example zone photographs 502*a-h* of FIG. 5) to auditor devices to enable auditors to audit retail establishments.

Although certain functionality and operations of each of the components of the example apparatus 2200, 2300, and 2400 are described above, further functionality and operations of the example apparatus 2200, 2300, and 2400 and components thereof are further described below in connection with the example processes of FIGS. 25-40.

FIGS. 25-40 are flow diagrams of example processes and methods that may be used to implement the example methods and apparatus described herein. In some example implementations, one or more of the example processes and methods of FIGS. 25-40 may be implemented using machine readable instructions comprising one or more programs for execution by a processor (e.g., the processor 4512 shown in the example processor system 4510 of FIG. 45). The program(s) may be embodied in software stored on one or more tangible media such as CD-ROM's, a floppy disks, hard drives, digital versatile disks (DVD's), or memories associated with a processor system (e.g., the processor system 4510 of FIG. 45) and/or embodied in firmware and/or dedicated hardware in a well-known manner. Further, although the example processes and methods are described with reference to the flow diagrams illustrated in FIGS. 25-40, persons of ordinary skill in the art will readily appreciate that many other methods of implementing the example processes and methods may alternatively be used. For example, the order of execution of blocks or operations may be changed, and/or some of the blocks or operations described may be changed, eliminated, or combined.

Figure 25:
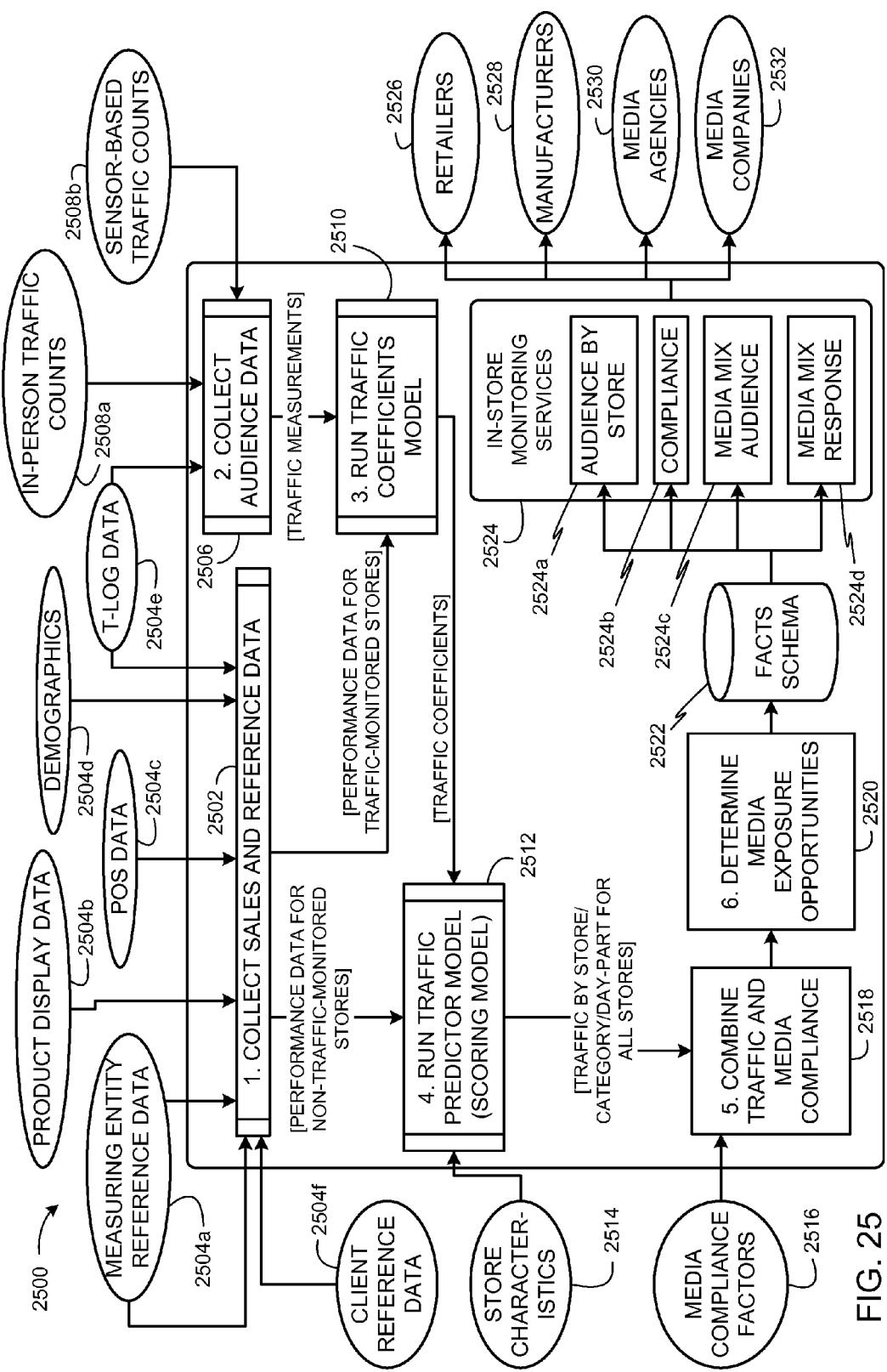
FIG. 25 is a flow diagram depicting example methods that can be used to collect and process in-store metering information.

FIG. 25 is a flow diagram depicting example processes 2500 that can be used to collect and process in-store metering information. Initially, the central data processing server 702 (FIG. 7) collects sales and reference data (block 2502). In the illustrated example, the sales and reference data includes measuring entity reference data 2504*a*, product display data 2504*b*, POS data 2504*c*, demographics data 2504*d*, transaction log (T-Log) data 2504*e*, and client reference data 2504*f*. In the illustrated example, the measuring entity reference data 2504*a* is the reference data shown in FIGS. 13 and 14 including product categories and identification data, the POS data 2504*c* is the POS data shown in FIGS. 10-12, and the transaction log data 2504*e* is sample transaction data of FIG. 12. The product display data 2504*c* indicates which items or products were on display for purchase during any specific week (or other analysis time period). The demographic data 2504*d* indicates demographics of different shoppers corresponding to different shopping trips. In the illustrated example, the demographic data 2504*d* is obtained from the Homescan® server 710 of FIG. 7. In the illustrated example, the client reference data 2504*f* indicates a product hierarchy as specified by a client (e.g., a retail establishment chain) for which analyses are being performed. An example process that can be used to implement the sales and reference data collection process of block 2502 is described below in connection with FIG. 26.

The audience data is also collected (block 2506). In the illustrated example, the audience data includes the transaction logs data 2504*e*, in-person traffic count data 2508*a* and sensor-based traffic count data 2508*b*. Example processes that can be used to implement the audience data collection process of block 2700 are discussed below in connection with FIGS. 27 and 28.

A traffic coefficients model is executed (block 2510) based on performance data for traffic-monitored stores obtained from the sales and reference data collection process of block 2502 and traffic measurements obtained from the audience data collection process of block 2506. An example process that can be used to execute the traffic coefficients model of block 2510 is described below in connection with FIG. 29. In the illustrated example, the performance data for traffic-monitored stores obtained from the sales and reference data collection process of block 2502 includes the product category sales data (e.g., product sales revenue data $Q_1 \ldots Q_C$) stored in the product category sales column 1802 of FIG. 18.

The central data processing server 702 (FIG. 7) executes a traffic predictor model (block 2512) based on performance data for non-traffic-monitored stores obtained from the sales and reference data collection process of block 2502, traffic coefficients (e.g., the traffic coefficients ($\alpha$, $\beta$, $\theta$) of FIG. 21) obtained from the traffic coefficient model process of block 2510, and store characteristics data 2514. An example process that can be used to execute the traffic predictor model of block 2512 is described below in connection with FIG. 34. In the illustrated example, the performance data for non-traffic-monitored stores obtained from the sales and reference data collection process of block 2502 includes the product category sales data (e.g., product sales revenue data $Q_1 \ldots Q_C$) stored in the product category sales column 2002 of FIG. 20, and the store characteristics data 2514 includes the store type information R stored in the store type column 2010 of FIG. 20.

The central data processing server 702 combines traffic data and corresponding media compliance factors 2516 (block 2518) based on traffic data by store, category (e.g., zone), and day-part for all stores received from the traffic predictor model process of block 2512 and the media compliance factors data 2516. In the illustrated example, the media compliance factors data 2516 indicates which advertisement media was on display at particular stores, in particular category zones, for particular dates and/or day-parts. The media compliance factors data 2516 may be obtained from one or more of the example processes described below in connection with FIGS. 35, 36, 37A, 37B, 38, and 39.

The central data processing server 702 determines media exposure opportunities (block 2520) based on the traffic and media compliance data obtained from the traffic and media compliance combining process of block 2518. For the example retail establishment 100 of FIGS. 1A and 1B, the media exposure opportunities can be determined by identifying the amount of traffic in each one of the zones 102*a-h* and the advertisement/informational media (e.g., the media 152*a-h* of FIG. 1B) located in those zones 102*a-h*. For example, if the produce zone 102*h* of FIGS. 1A and 1B had 50 shoppers, the audio advertisement 152*g* would account for 50 media exposure opportunities.

In the illustrated example, a facts schema database 2522 is provided to store the media exposure opportunities, the traffic data, and the media compliance factors data. The information stored in the facts schema database 2522 can then be used to provide output data to one or more clients of in-store monitoring services 2524. Example clients may be retailers 2526, manufacturers 2528, media agencies 2530, and media companies 2532. However, other types of entities may also be clients. In the illustrated example, the in-store monitoring services 2524 provide audience by store data 2524a, compliance data 2524b, media mix audience data 2524c, and media mix response data 2524d. In the illustrated example, the audience by store data 2524a includes shopper traffic counts and, in some instances, may include shopper demographic information. The compliance data 2524b includes information indicating whether advertisement/informational media (e.g., the media 152a-h of FIG. 1B) was displayed in accordance with times and locations specified via instructions from marketing agencies, product manufacturers, etc. or via contractual agreements. The compliance data 2524b may be determined based on the media compliance factors data 2516 and media display instructions or contractual agreements.

The media mix audience data 2524c includes information that represents instances of audience exposures or opportunities for audience exposures to different advertisements and/or different media types located throughout a store. The media mix response data 2524d includes information representative of causal relationships between the media mix audience data 2524c and activities (e.g., sales, traffic, etc.) that occurred in a retail establishment and can be determined by correlating, for example, media exposure data or trends, sales data or trends, and shopper traffic data or trends to one another. In this manner, the influential effects of audience exposure to media, marketing campaigns, media placements, etc. on sales and shopper traffic can be determined. In some instances, such analyses can be made on a per zone basis (e.g., per each of the zones 102a-h of FIGS. 1A and 4), on a per day-part basis, on a per day basis, or based on any other location-based or time-based criteria (e.g., store location, day of the week, season, etc.). In some example implementations, the media mix response data 2524d may be generated by the in-store monitoring services 2524 to identify different responses in particular activities based on different media mix audience data 2524c (e.g., real media mix audience data or simulated (e.g., hypothetical, predicted, forecasted, etc.) media mix audience data).

The media mix response data 2524d may be generated to indicate which stores, zones, and/or day-parts will deliver the greatest total shopper exposures to media (e.g., reach and/or frequency of media exposures) for a particular in-store media campaign. The media mix response data 2524d may be generated to indicate what stores, zones, and/or day-parts deliver the demographic or shopper target exposures that best achieve a particular marketing goal. The media mix response data 2524d may be generated to indicate what chains and stores offer television, digital signage, and/or other particular in-store vehicles. The media mix response data 2524d may be generated to indicate what mix of retailers and zones delivers an optimal reach and/or frequency of media exposures. The media mix response data 2524d may be generated to indicate which combination(s) of advertisements and/or media types delivers the maximum reach of a particular target audience. The media mix response data 2524d may be generated to confirm whether a particular client's plan was executed as expected. The media mix response data 2524d may also be generated to determine the amount of profitability that can be attributed to a particular marketing campaign and incremental sales that can be attributed to incrementally higher levels of reach and/or frequency of media exposures. The media mix response data 2524d may also be generated to show how one retailer's performance compares to the performances of other retailers in a particular market or channel. The media mix response data 2524d may also be generated to show shopper trends over time during, for example, key selling periods and/or holidays. The media mix response data 2524d may be generated to indicate which media types are contributing most to category sales growths. The media mix response data 2524d may be generated to show shopper traffic by product category and/or zone relative to competing retailers. The media mix response data 2524d may be generated to show which zones shoppers frequent most.

Clients may use the media mix audience data 2524c and response data 2524d to determine what store/media configuration changes can be made to improve traffic flow. In addition, clients may use the data 2524c and 2524d to determine how to improve product order/reorder practices to reduce or eliminate out-of-stock statuses. Also, clients can use the data 2524c and 2524d to plan labor requirements in a store or particular zones of a store.

Figure 26:
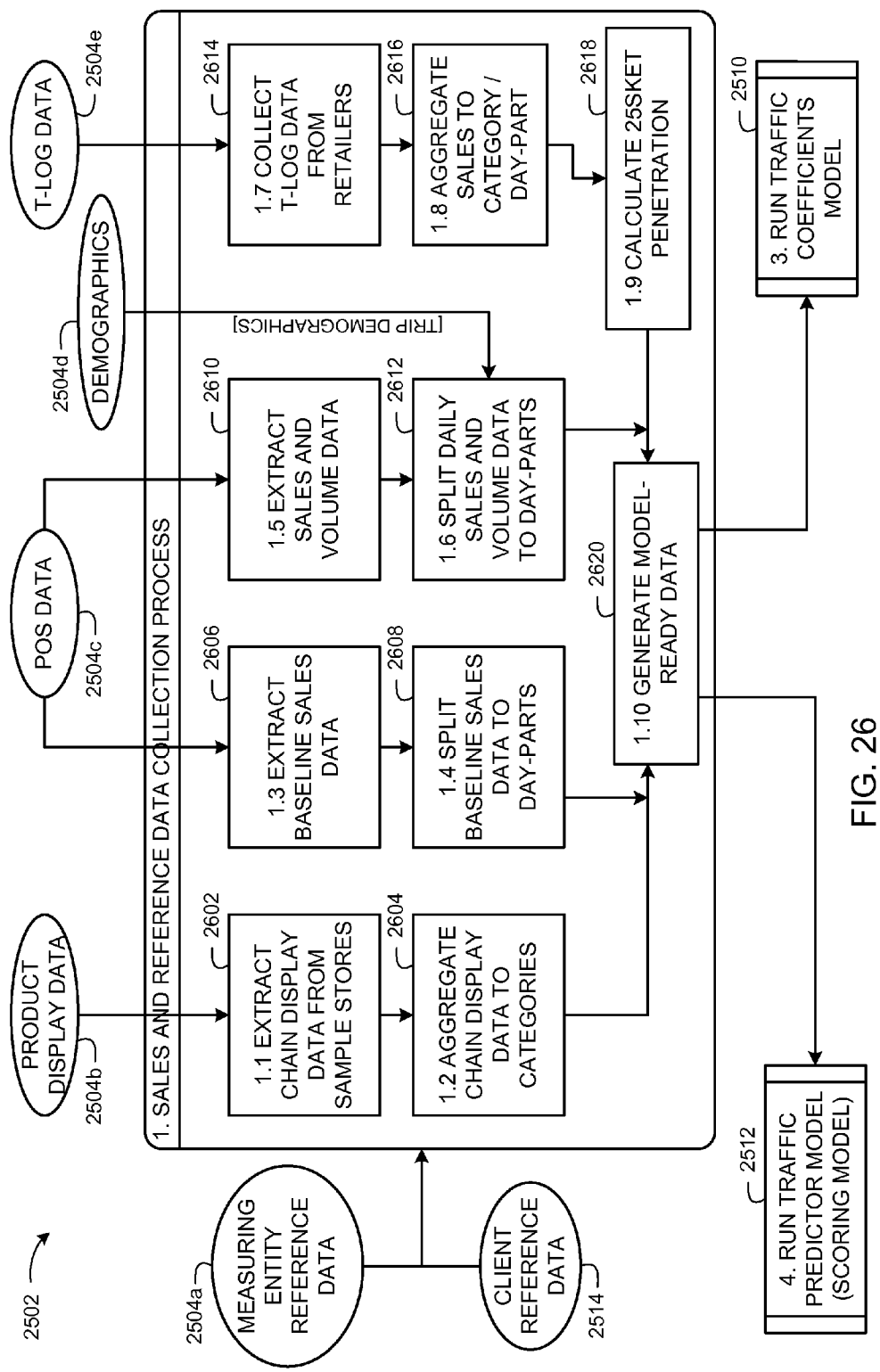
FIG. 26 is an example flow diagram depicting the example sales and reference data collection method of FIG. 25.

Turning to FIG. 26, an illustrated example flow diagram depicts the example sales and reference data collection process 2502 of FIG. 25. As shown in FIG. 26, retailer chain media display data corresponding to sample stores (i.e., stores on which initial models are based for use in monitoring other stores) is extracted from the product display data 2504b (block 2602). The retailer chain media display data is then aggregated to product categories (block 2604). For example, the retailer chain media display data may be aggregated to product categories corresponding to ones of the zones 102a-h of FIG. 1A. Baseline sales data is extracted from the POS data 2504c (block 2606), and the baseline sales data is split or partitioned into respective day-parts (block 2608). Also, sales and volume data is extracted from the POS data 2504c (block 2610), and daily sales and volume data is split or partitioned into respective day-parts (block 2612). At the operation of block 2612, trip demographics from the demographics data 2504d may also be combined with or associated with respective day-parts of the sales and volume data.

The transaction log (T-LOG) data is collected from the retailers involved in a particular study (block 2614), and sales from the transaction log data is aggregated to respective categories and day-parts (block 2616). The category and day-parts sales data is then used to calculate basket penetration (block 2618). In the illustrated example, basket penetration represents the percentages of product sales corresponding to each product category.

Model-ready data is then generated (block 2620) based on the retailer chain media display data aggregated to product categories received from block 2604, day-parts baseline sales data received from block 2608, day-parts daily sales and volume data (and demographics data) received from block 2612, and basket penetration data received from block 2618. In the illustrated example, the model-ready data is used to execute the traffic coefficients model of block 2510 and the traffic predictor model of block 2512.

Figure 27:
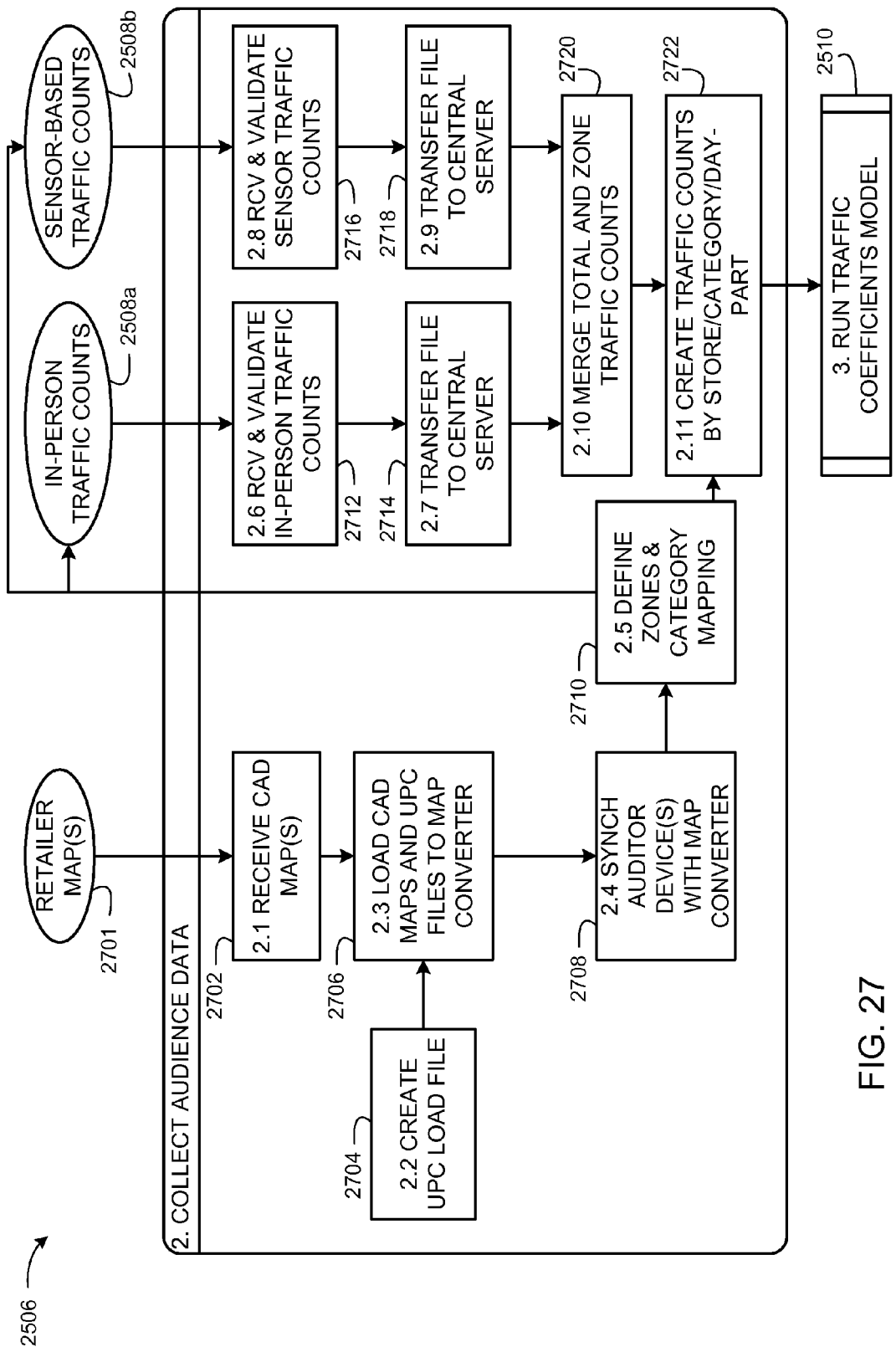
FIG. 27 is an example flow diagram depicting the example audience data collection method of FIG. 25.

Turning to FIG. 27, an illustrated example flow diagram depicts the example audience data collection process 2506 of FIG. 25. As shown in FIG. 27, one or more retailer CAD maps 2701 are received (block 2702). In the illustrated example, the one or more CAD maps 2701 are floor layout maps of one or more retail establishments of a client for whom in-store monitoring is being performed. One or more universal product code (UPC) load file(s) are then created (block 2704). Each of the product codes in the UPC load file(s) corresponds to a different product offered via one or more of the retail establishments being monitored. The map converter 206 (FIG. 7) then loads the CAD map(s) and the UPC file(s) (block 2706), at which point the map converter 206 can convert the CAD map(s) into layout maps (e.g., the maps 200 and 300 of FIGS. 2 and 3).

The converted maps are then synchronized from the map converter 206 onto one or more auditor device(s) (block 2708). The one or more auditor devices may be the portable auditor device 404 of FIG. 4, the portable computer 170 of FIG. 1B, and/or other similar or identical devices. Zones and category mapping are then defined (block 2710). In the illustrated example, the zones 102a-h of FIG. 1A are example zones and category mappings and are used to overlay product category zones onto the converted maps generated by the map converter 206.

The shopper count data is then processed by the in-person traffic data server 708 and the metering entity data server 706 of FIG. 7. In particular, the in-person traffic data server 708 receives and validates the in-person traffic counts 2508a (block 2712) and transfers an in-person traffic count file to the central data processing server 702 of FIG. 7 (block 2714). Also, the metering entity data server 706 receives and validates the sensor-based traffic counts 2508b (block 2716) and transfers a sensor-based traffic count file to the central data processing server 702. The receiving and validation processes of blocks 2712 and 2716 are described in detail below in connection with FIG. 28. In the illustrated example, the in-person traffic counts 2508a correspond to shopper traffic counts corresponding to individual zones (e.g., individual ones of the zones 102a-h of FIG. 1A), and the sensor-based traffic counts 2508b correspond to total store daily shopper traffic counts for each store being measured.

The central data processing server 702 then merges the total store traffic counts (sensor-based traffic counts) and the zone traffic counts (in-person traffic counts) (block 2720). In addition, the central data processing server 702 creates traffic counts by store, category zone, and day-part (block 2722) based on the merged traffic counts generated at block 2720. As shown, store traffic counts, category zone traffic counts, and day-part traffic counts are communicated to the traffic coefficients model process of block 2510.

Figure 28:
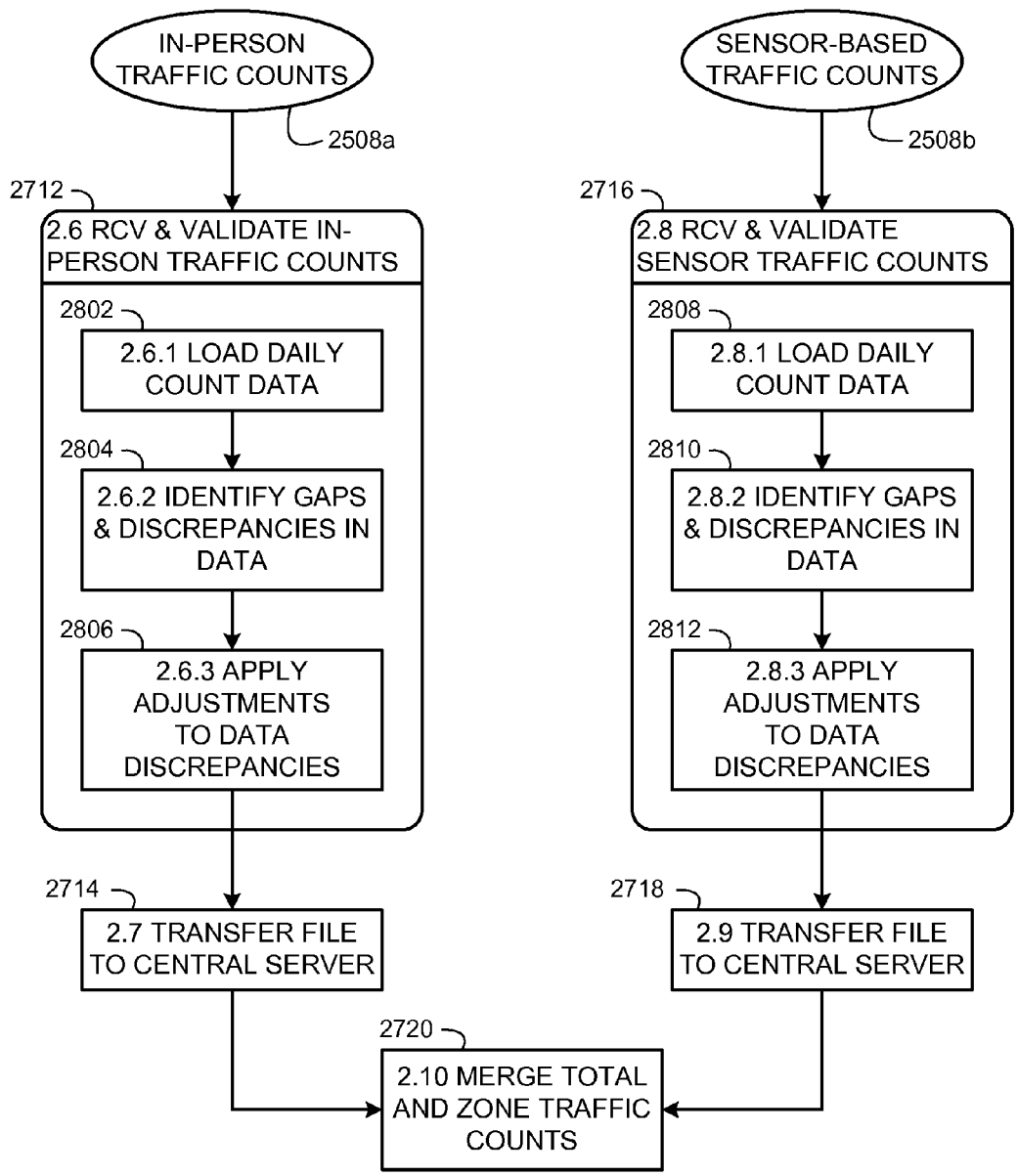
FIG. 28 depicts example flow diagrams of example shopper count data validation methods that can be implemented in connection with the example audience data collection method of FIG. 27.

Turning to FIG. 28, illustrated example flow diagrams depict the example shopper count data receipt and validation processes of 2712 and 2716 of FIG. 27. As shown, the in-person traffic data server 708 loads the daily in-person traffic count data for a store (block 2802), identifies gaps and discrepancies the in-person traffic count data (block 2804), and applies adjustments to any discrepancies in the in-person traffic count data (block 2806). Similarly, the metering entity data server 706 loads the daily sensor-based traffic count data for a store (block 2808), identifies gaps and discrepancies the sensor-based traffic count data (block 2810), and applies adjustments to any discrepancies in the sensor-based traffic count data (block 2812). The adjustments of blocks 2806 and 2812 can performed by, for example, reducing counts corresponding to vendors or employees of a retail establishment where it was know that such vendors or employees were present and counted or likely to have been counted. Additionally or alternatively, the adjustments may be made where counts for a particular day-part on a particular day are significantly different from the counts on the same day-part of a different day. In such an instance, the day-part count showing a discrepancy can be adjusted up or down to coincide with counts from the same day-part on other days. Other similar count comparisons and adjustments can be made, for example, across different stores and/or different zones to detect discrepancies and apply adjustments thereto.

The in-person traffic data server 708 and the metering entity data server 706 can repeat the receipt and validation operations 2712 and 2716 until the traffic counts for all of the stores being monitored are processed. The servers 706 and 708 can then transfer respective traffic count files to the central data processing server 702 (blocks 2714 and 2718), and the central data processing server 702 can merge the total store traffic counts (sensor-based traffic counts) and the zone traffic counts (in-person traffic counts) (block 2720).

Although the processes of block 2712 and 2714 are shown as the in-person traffic data server 708 and the metering entity data server 706 receiving and validating respective traffic count data, in other example implementations, the in-person traffic data server 708 and the metering entity data server 706 may be configured to receive the traffic count data without validating the data. In such example implementations, after the total and zone traffic counts are merged (block 2720) and separated by store, category zone, and/or day-part (block 2722) (FIG. 27), validation operations may alternatively be performed at the central data processing server 702 based on the separated traffic counts. Such an example implementation is shown in the flow diagram of FIG. 29.

Figure 29:
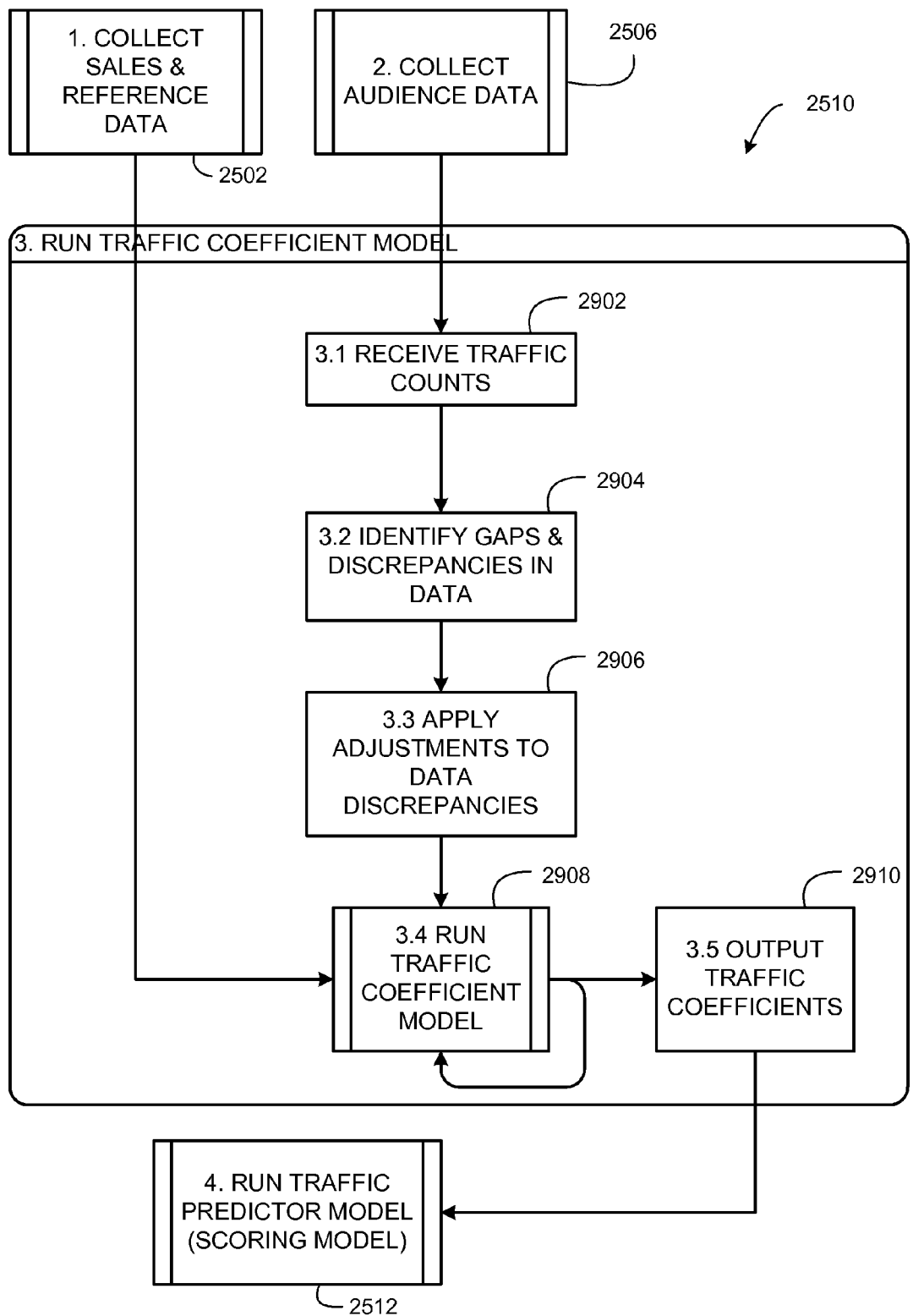
FIG. 29 is an example flow diagram depicting the example traffic coefficient model method of FIG. 25.

Turning now to FIG. 29, an example flow diagram depicts the example traffic coefficient model process 2510 of FIG. 25 in which the alternative traffic count validation process is performed prior to executing a traffic coefficient model. As shown, the central data processing server 702 receives the merged traffic counts (block 2902) from the audience data collection process of block 2506, identifies gaps and discrepancies the in-person traffic count data (block 2904), and applies adjustments to any discrepancies in the in-person traffic count data (block 2906).

The traffic model coefficients server 718 (FIG. 7) then executes a traffic coefficient model (block 2908) to determine traffic coefficients (e.g., the scoring coefficients ($\alpha$, $\beta$, $\theta$) described above in connection with FIG. 21) that can be used to estimate or forecast subsequent traffic counts. In the illustrated example, the traffic coefficient model can be executed a plurality of times at block 2908 until it is determined that the traffic or scoring coefficients ($\alpha$, $\beta$, $\theta$) can be used to predict or estimate shopper traffic with an acceptable accuracy. An example process that can be used to implement the traffic coefficient model of block 2908 is described below in connection with FIG. 33. The traffic model coefficients server 718 then outputs the traffic coefficients to the central data processing server 702 (block 2910). In this manner, the central data processing server 702 can use the traffic coefficients to execute a traffic predictor model (block 2512) to estimate and/or forecast subsequent traffic counts. An example process that can be used to implement the traffic predictor model is described below in connection with FIG. 34.

Figure 30:
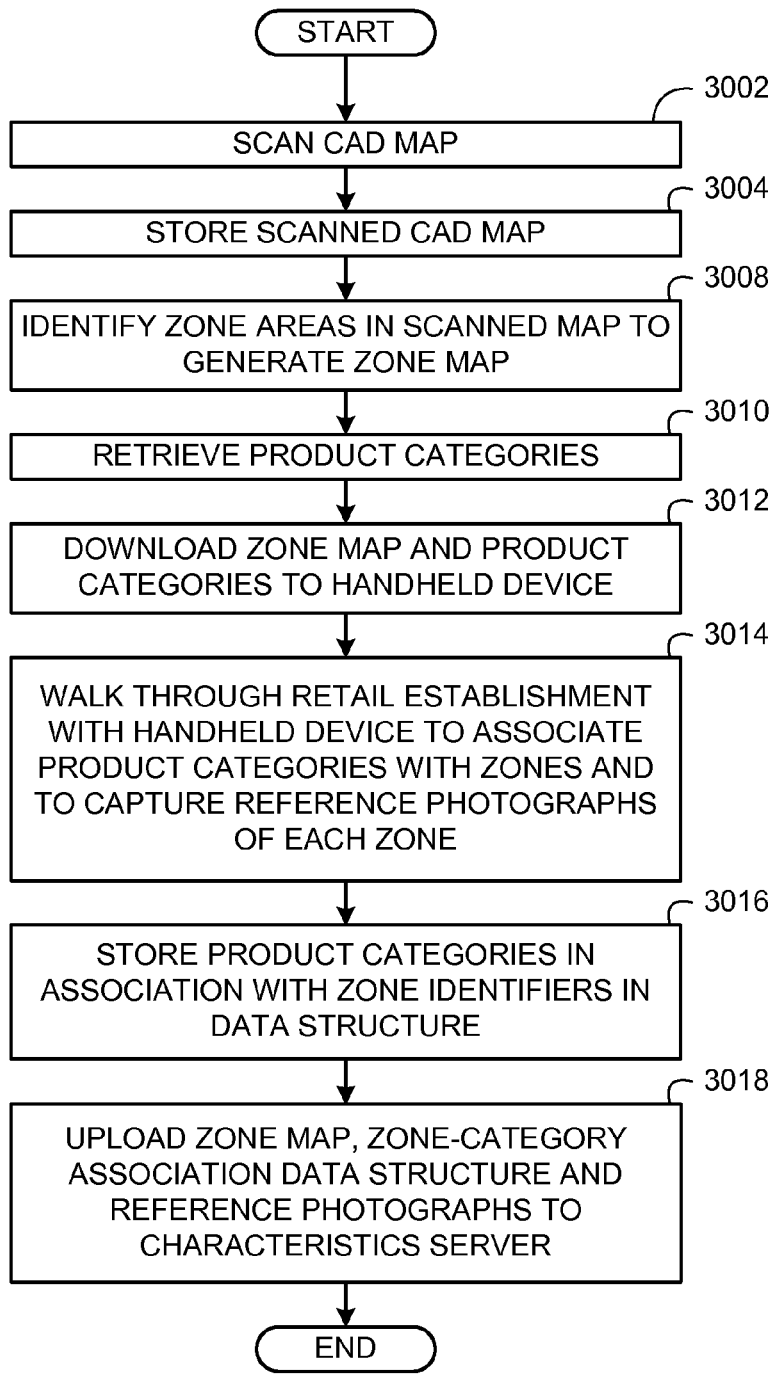
FIG. 30 is a flow diagram of an example method that may be used to generate category zone maps.

FIG. 30 is a flow diagram of an example method that may be used to generate a category zone map such as, for example, a category zone map of the retail establishment 100 of FIG. 1A. Initially, the CAD map converter 206 (FIG. 7) scans a CAD map of the retail establishment 100 (block 3002) and stores the scanned CAD map in a memory (block 3004). The CAD map converter 206 then identifies category zone areas in the scanned CAD map to generate a zone map (block 3008) of the retail establishment 100 by, for example, using image recognition techniques to identify areas in the scanned CAD map that can form zones. The CAD map converter 206 retrieves product categories (block 3010) corresponding to the retail establishment 100. For example, the CAD map converter 206 can retrieve the product categories from store characteristics information received from the retailer 714 (FIG. 7).

The CAD map converter 206 then downloads the zone map and the product categories to a handheld device (block 3012). The handheld device (e.g., a personal digital assistant or tablet computer substantially similar or identical to the portable auditor device 404 of FIG. 4) can be used during a set-up process of an in-store metering service to walk through the retail establishment 100 and to identify which zones in the zone map correspond to which product categories based on product stocking throughout the retail establishment 100. A set-up technician of a metering entity then walks through the retail establishment 100 with the handheld device to associate each of the product categories retrieved at block 3010 with their corresponding zones and to capture reference photographs (e.g. the reference photographs 502a-502h of FIG. 5) of each of the zones 102a-h (block 3014).

The handheld device then stores the product categories in association with zone identifiers in a data structure (block 3016) such as, for example, the zone-category association data structure 800 of FIG. 8. The handheld device then uploads the zone map, the zone-category association data structure 800, and the reference photographs to the characteristics server 716 (FIG. 7) (block 3018) and the process of FIG. 30 ends.

Figure 31:
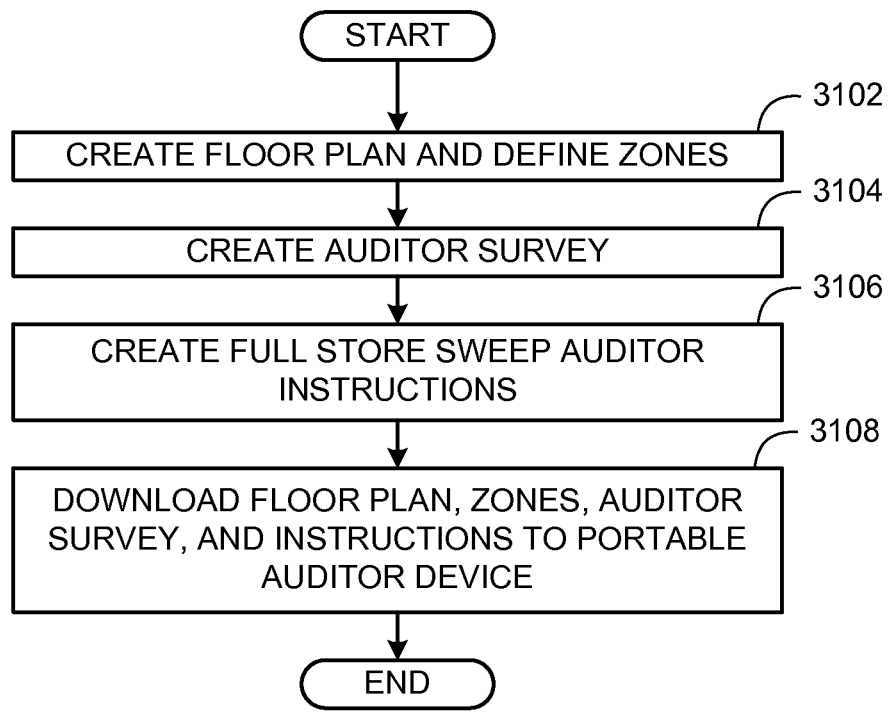
FIG. 31 is a flow diagram of an example method that may be used to configure a portable auditor device to be used to perform full store sweep audits of retail establishments.

FIG. 31 is a flow diagram of an example method that may be used to configure the example portable auditor device 404 (FIG. 4) to be used to perform full store sweep audits of retail establishments (e.g., the retail establishment 100 of FIG. 1A). Initially, the floor plan diagrams are created using the CAD map converter 206 (FIG. 7) and zones are defined (block 3102) using, for example, the method described above in connection with FIG. 30. The survey generator 2404 (FIG. 24) then creates an auditor survey (block 3104) for use by the auditor 402 as the auditor 402 performs full store sweeps of the retail establishment 100. The auditor survey can be a list of questions to gather information from the auditor 402 during a full store sweep about the surrounding conditions in the retail establishment 100, the auditor's ability to obtain accurate count information, and any other information that may be used to judge the accuracy or completeness of the auditor's shopper count data when the count data is uploaded to the in-person traffic data server 708. The auditor survey can be displayed by the portable auditor device 404 prior to, during, or after the auditor 402 performs a full store sweep, and the auditor 402 can provide responses via the portable auditor device 404. Alternatively, the auditor survey can be paper-based.

The instructions generator 2406 (FIG. 24) creates full store sweep instructions (block 3106). The portable auditor device 404 can display the instructions to the auditor 402 to instruct the auditor 402 how to perform a full store sweep. The portable auditor device 404 can be configured to display the instructions together with the survey generated at block 3104. The auditor device communication interface 2410 (FIG. 24) communicates one or more floor plan maps, zones, auditor surveys, and auditor instructions to the portable auditor device 404 (block 3108) to enable the auditor 402 to refer to the floor plan maps, zones, auditor survey, and instructions while performing full store sweeps. Although not shown, the photographic references 502a-h of FIG. 5 may also be downloaded to the portable auditor device 404 or may be printed to paper for the auditor's reference. The process of FIG. 31 then ends.

Figure 32:
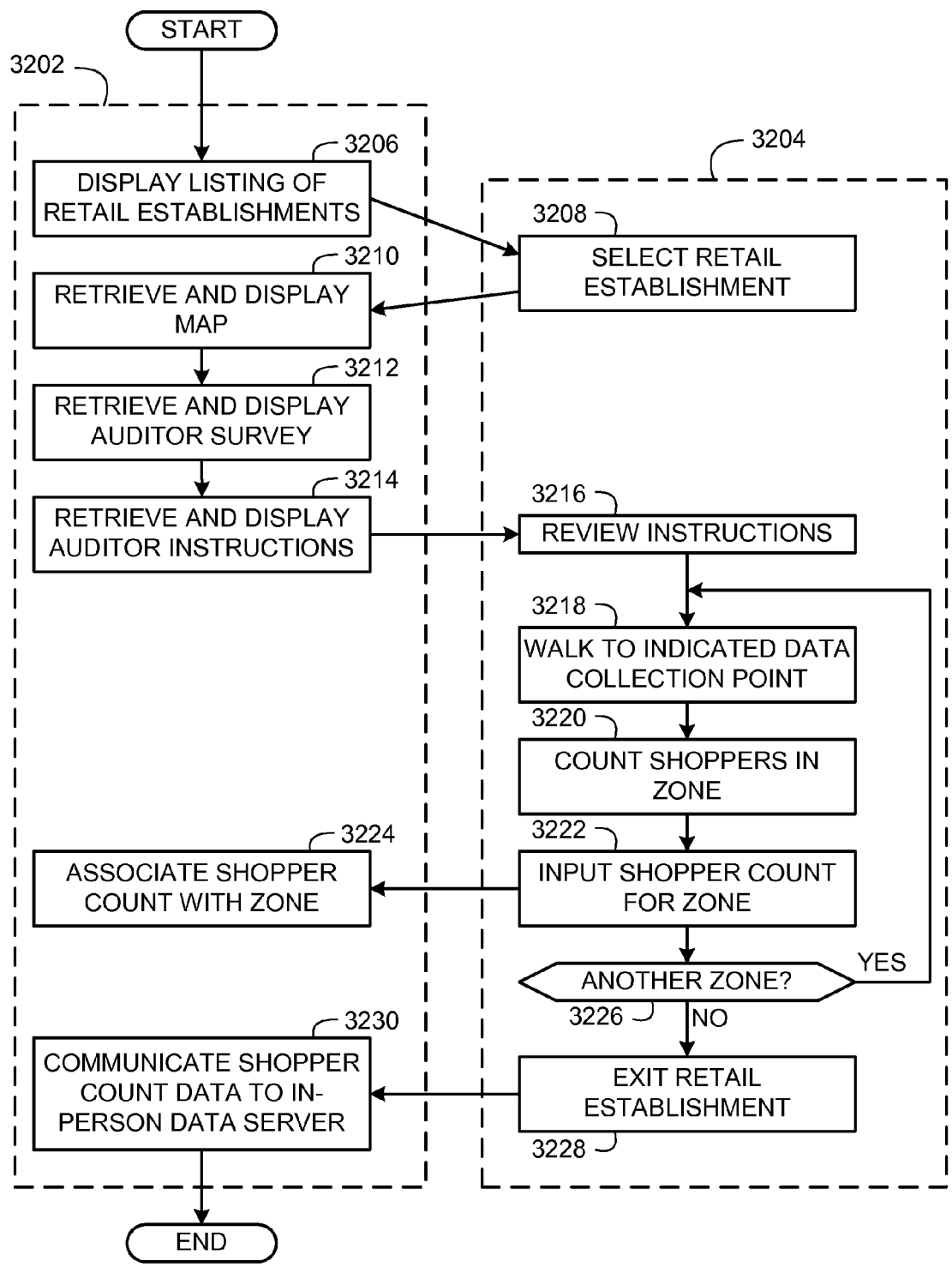
FIG. 32 is a flow diagram of an example method that may be used to perform a full store sweep audit of a retail establishment.

FIG. 32 is a flow diagram of an example method that may be used to perform a full store sweep audit of a retail establishment (e.g., the retail establishment 100 of FIG. 1A). The example method is described in connection with the auditor 402, the portable auditor device 404, and the example apparatus 2300 of FIG. 23. In the illustrated example, the example apparatus 2300 is implemented using the auditor device 404. As shown in FIG. 32, the example method includes an auditor device process 3202 including operations implemented using the example apparatus 2300 and an auditor process 3204 representative of operations performed by the auditor 402.

Initially, the display interface 2304 (FIG. 23) displays a listing of retail establishments (block 3206). The auditor 402 selects a retail establishment identifier of a retail establishment (block 3202) (e.g., the retail establishment 100) in which the auditor will perform the full store sweep. For example, the portable auditor device 404 may execute a full store sweep instructions application that can display various retail establishment identifications corresponding to respective retail establishments, and when the auditor 402 selects one of the retail establishment identifications, the portable auditor device 404, in turn, displays the full store sweep instructions for the selected retail establishment.

After the example apparatus 2300 receives the retail establishment selection via the user input interface 2306 (FIG. 23), the map interface 2308 (FIG. 23) retrieves and displays a corresponding floor layout map (block 3210), the survey handler 2314 (FIG. 23) retrieves and displays an auditor survey (block 3212), and the instructor 2316 (FIG. 23) retrieves and displays full store sweep auditor instructions (block 3214).

The auditor 402 then reviews the full store sweep instructions (block 3216) and walks to an indicated data collection point (block 3218) such as, for example, the data collection point 406a of FIG. 4. For example, the instructions may inform the auditor 402 of the first zone (1) 102a corresponding to the location of the data collection point 406a and/or may display the reference photograph 502a (FIG. 5) of the data collection point 406a or instruct the auditor 402 to refer to a printed reference card having the reference photograph 502a. In this manner, the auditor 402 can count shoppers in the first zone (1) 102a (FIG. 1A) from the same reference point each time the auditor 402 performs a full store sweep of the retail establishment 100.

The auditor 402 then counts the shoppers in the first zone (1) 102a (block 3220) and inputs the shopper count for the first zone (1) 102a (block 3222) in the portable auditor device 404 via the user input interface 2306 (FIG. 23). The data associator 2320 (FIG. 23) then associates the shopper count with a respective one of the zones 102a-h (block 3224) corresponding to the location at which the shopper count was collected. The auditor 402 then determines whether another zone remains to be counted (block 3226). For example, if the auditor 402 has not counted every zone in the retail establishment 100, the auditor 402 determines that a next zone should be counted (block 3226) and returns to the operation of block 3218 to walk to the next indicated data collection point (e.g., the data collection point 406b of FIG. 4) (block 3218).

If the auditor 402 determines that no other zone remains to be counted (block 3226), the auditor 402 exits the retail establishment 100 (block 3228) and causes the portable auditor device 404 to communicate the shopper count data to the in-person traffic data server 708 (block 3230) via, for example, the data interface 2302 or any other suitable communication interface (e.g., an Internet interface, a radio frequency communication interface, a dial-up connection, a memory card, etc.). The example process of FIG. 32 then ends.

Figure 33:
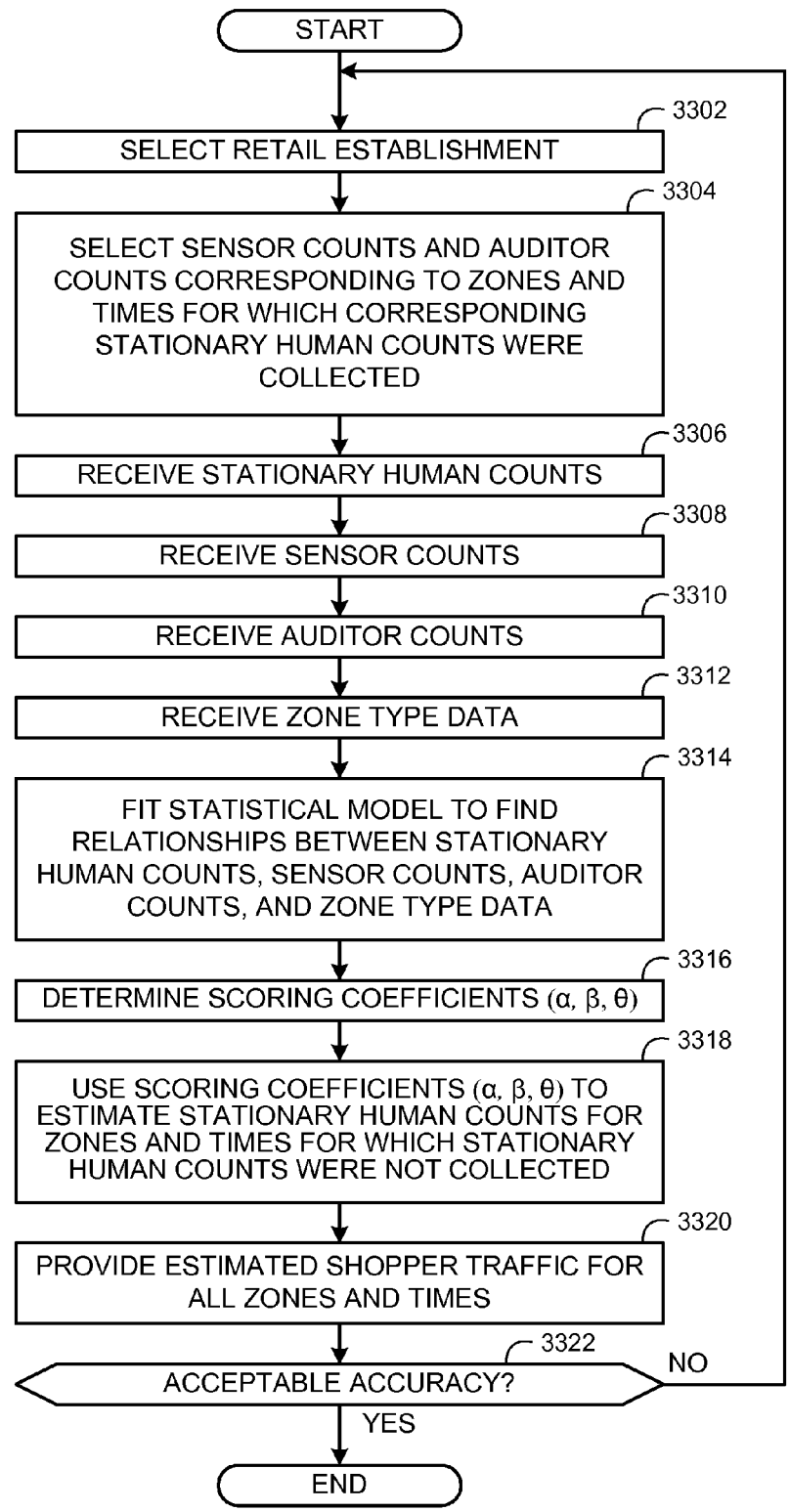
FIG. 33 is a flow diagram of an example method that may be used to calibrate the example shopper traffic forecasting system of FIG. 21 during a calibration phase.

Turning to FIG. 33, the illustrated flow diagram is representative of an example method that may be performed to implement the example traffic count calibrator 2102 of FIG. 21 during a calibration phase to calibrate the example shopper traffic forecasting system 2100. Initially, the traffic count calibrator 2102 selects a retail establishment (block 3302) (e.g., the retail establishment 100 of FIGS. 1A, 1B, and 4) to use for performing a calibration. The traffic count calibrator 2102 then selects sensor counts ($S_1 \ldots S_Z$) and auditor counts ($A_1 \ldots A_Z$) corresponding to zones (e.g., the zones 102a-h of FIG. 1A) and times (e.g., the date-time stamp 1812 of FIG. 18) for which corresponding stationary human counts ($H_1 \ldots H_Z$) were collected (block 3304). For example, the traffic count calibrator 2102 and/or the central data processing server 702 of FIG. 7 may search through a data structure substantially similar or identical to the calibration data structure 1800 of FIG. 18 to find sensor counts ($S_1 \ldots S_Z$) and auditor counts ($A_1 \ldots A_Z$) for which corresponding stationary human counts ($H_1 \ldots H_Z$) were collected.

The traffic count calibrator 2102 then receives the stationary human counts ($H_1 \ldots H_Z$) (block 3304), the sensor counts ($S_1 \ldots S_Z$) (block 3308), and the auditor counts ($A_1 \ldots A_Z$) (block 3310) selected at block 3302. In addition, the traffic count calibrator 2102 also receives the zone type data Z (block 3310) corresponding to the retail establishment selected at block 3302. For example, the received data may be stored in a data structure substantially similar or identical to the calibration data structure 1800 of FIG. 18 and may be received from the central data processing server 702 of FIG. 7.

The traffic count calibrator 2102 fits a statistical model to the received data to find a functional relationship between the stationary human counts ($H_1 \ldots H_Z$), the sensor counts ($S_1 \ldots S_Z$), the auditor counts ($A_1 \ldots A_Z$), and the zone type data Z (block 3314). For example, the traffic count calibrator 2102 can use equation 1 described above to generate a statistical model indicative of the functional relationship. The traffic count calibrator 2102 then determines the scoring coefficients ($\alpha$, $\beta$, $\theta$) (block 3316) using, for example, a regression analysis in connection with equations 3, 4 and 5 above.

The traffic count calibrator 2102 then uses the scoring coefficients ($\alpha$, $\beta$, $\theta$) to determine estimated stationary human counts ($h_1 \ldots h_Z$) for zones and times for which stationary human counts ($H_1 \ldots H_Z$) were not collected (block 3318). For example, the traffic count calibrator 2102 may determine the estimated stationary human counts ($h_1 \ldots h_Z$) based on sensor counts ($S_1 \ldots S_Z$) and auditor counts ($A_1 \ldots A_Z$) stored in the monitoring data structure 1900 of FIG. 19 by fitting the sensor counts ($S_1 \ldots S_Z$) and the auditor counts ($A_1 \ldots A_Z$) to the functional relationship data generated based on the stationary human counts ($H_1 \ldots H_Z$), sensor counts ($S_1 \ldots S_Z$), and the auditor counts ($A_1 \ldots A_Z$) determined at block 3314. The traffic count calibrator 2102 then provides estimated or forecasted shopper traffic ($F_1 \ldots F_Z$) for all zones and times (block 3320) by, for example, repeating the operation of block 3318 one or more times. In the illustrated example, the estimated or forecasted shopper traffic ($F_1 \ldots F_Z$) can be use to assess the sufficiency of the accuracy that can be achieved based on the scoring coefficients ($\alpha$, $\beta$, $\theta$) determined at block 3316 (block 3322). If it is determined that the accuracy is not acceptable (block 3322), control can be passed back to block 3302 to repeat the example process of FIG. 33. In some example implementations, the sufficiency or acceptability of the traffic count accuracy can be determined by comparing the estimated or forecasted shopper traffic ($F_1 \ldots F_Z$) to stationary human counts ($H_1 \ldots H_Z$) of other zones. Recursive execution of the example process of FIG. 33 may be repeated until it is determined that the estimated or forecasted traffic count accuracy achieved using particular scoring coefficients ($\alpha$, $\beta$, $\theta$) is acceptable. The process of FIG. 33 is then ended.

Figure 34:
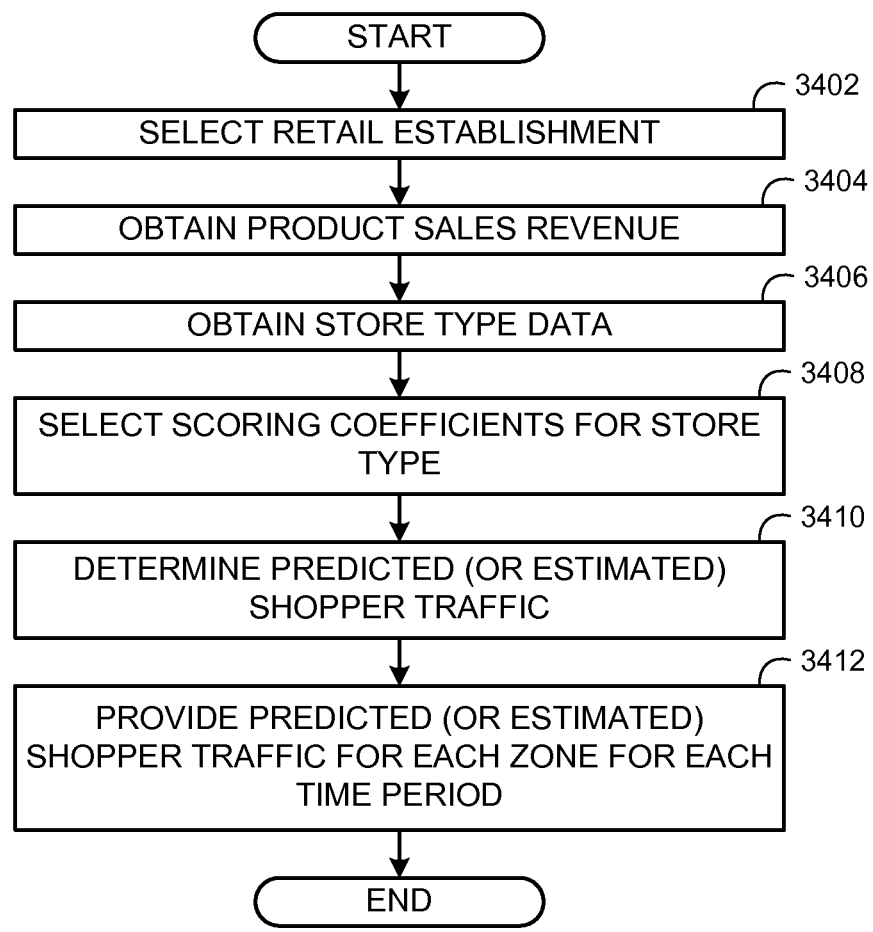
FIG. 34 is a flow diagram of an example method that may be used to implement the example shopper traffic forecasting system of FIG. 21 to forecast shopper traffic in a retail establishment.

Turning to FIG. 34, the illustrated flow diagram is representative of an example method that may be performed to implement the example traffic count generator 2104 of FIG. 21 to forecast shopper traffic in a retail establishment (e.g., the example retail establishment 100 of FIGS. 1A, 1B, and 4). Initially, the traffic count generator 2104 selects a retail establishment (block 3402) (e.g., the retail establishment 100) for which to forecast shopper traffic. The traffic count generator 2104 then obtains product sales revenue information ($Q_1 \ldots Q_C$) (block 3404) and store type data R (block 3406) corresponding to the retail establishment selected at block 3402. For example, the product sales revenue information ($Q_1 \ldots Q_C$) and the store type data R may be stored in a data structure substantially similar or identical to the forecasted shopper traffic data structure 2000 of FIG. 20 and may be received from the central data processing server 702 of FIG. 7.

The traffic count generator 2104 then selects scoring coefficients ($\alpha$, $\beta$, $\theta$) corresponding to the store type R (block 3408) and determines predicted (or estimated) shopper traffic (block 3410) based on the selected scoring coefficients ($\alpha$, $\beta$, $\theta$), the product sales revenue information ($Q_1 \ldots Q_C$), and the store type R. For example, the traffic count generator 2104 can assemble the product sales revenue information ($Q_1 \ldots Q_C$) and the store type R into store/time formats. The traffic count generator 2104 then uses the canonical weight coefficient ($\beta$) to convert the product sales revenue information ($Q_1 \ldots Q_C$) and the store type R into the canonical independent variates $W=(Q\|R)\beta$ (equation 4 above) and the regression coefficients ($\theta$) to compute predicted canonical dependent variates $V=W\theta+e$ (equation 5 above). In addition, the traffic count generator 2104 can use the canonical weight coefficient ($\alpha$) to convert the predictions into traffic counts $h=V\alpha^{-1}$. The traffic count generator 2104 then provides predicted (or estimated) shopper traffic ($F_1 \ldots F_Z$) for all zones and times (block 3412) by, for example, repeating the operation of block 3410 one or more times. The process of FIG. 34 is then ended.

Figure 35:
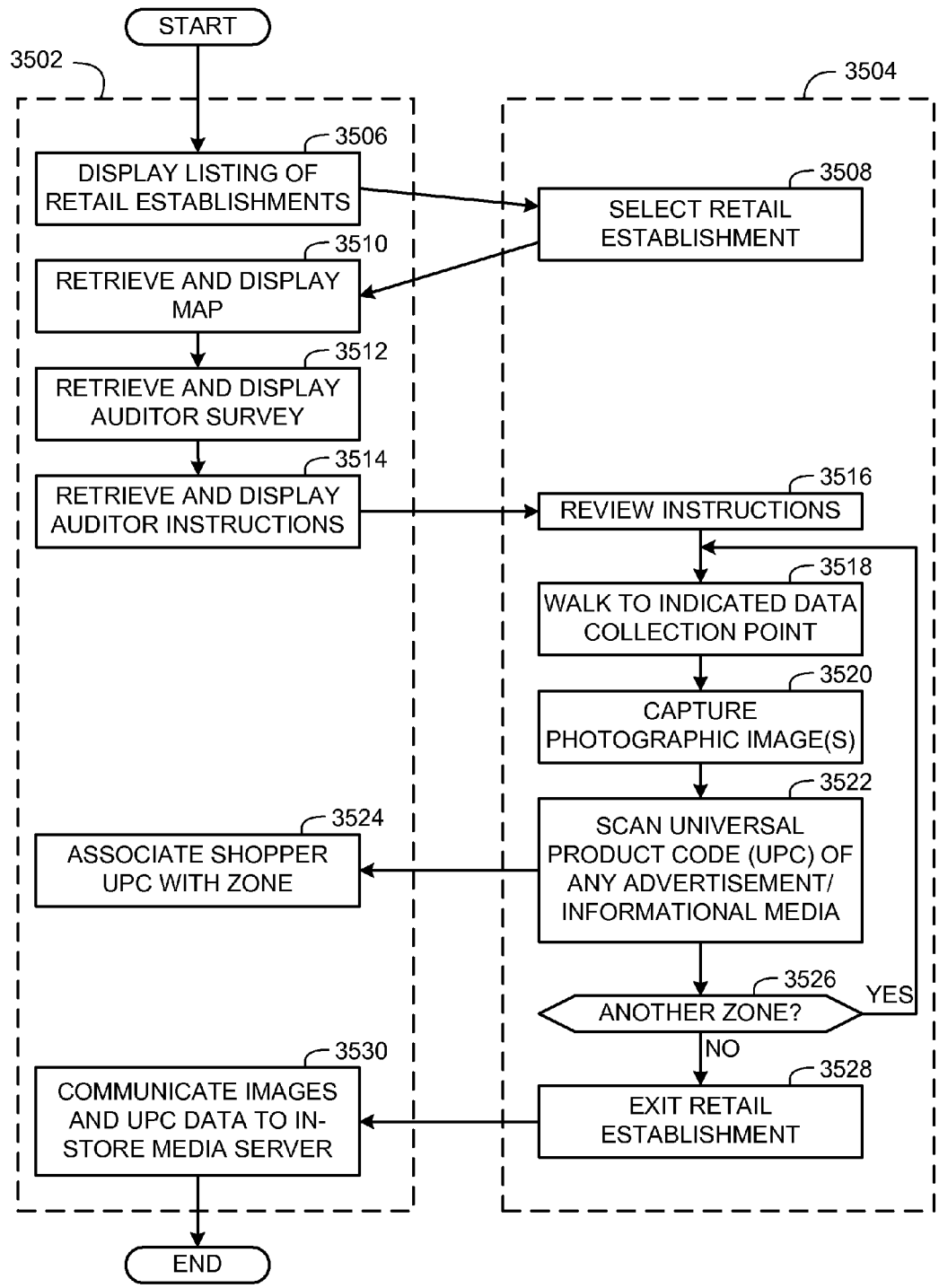
FIG. 35 is a flow diagram of an example method that may be used to collect advertising/information media compliance information.

FIG. 35 is a flow diagram of an example method that may be used to collect advertising/informational media compliance data. The example method is described in connection with the auditor 164 (FIG. 1B), the portable auditor device 170 (FIG. 1B), and the example apparatus 2300 of FIG. 23. In the illustrated example, the example apparatus 2300 is implemented using the auditor device 170. In the illustrated example, the auditor 164 collects the advertising/informational media compliance data of the retail establishment 100 by capturing photographic images of the various zones 102a-h and collecting universal product code information associated with advertisement/informational media. As shown in FIG. 35, the example method includes an auditor device process 3502 including operations implemented using the example apparatus 2300 and an auditor process 3504 representative of operations performed by the auditor 164.

Initially, the display interface 2304 (FIG. 23) displays a listing of retail establishments (block 3506). The auditor 164 then selects a retail establishment identifier of a retail establishment (block 3508) (e.g., the retail establishment 100) in which the auditor 164 will collect the advertising/informational media compliance data. For example, the portable auditor device 170 may execute a compliance data collection instructions application that can display various retail establishment identifications corresponding to respective retail establishments, and when the auditor 164 selects one of the retail establishment identifications, the portable auditor device 170, in turn, displays the instructions for capturing photographic images at the selected retail establishment.

After the example apparatus 2300 receives the retail establishment selection via the user input interface 2306 (FIG. 23), the map interface 2308 (FIG. 23) retrieves and displays a corresponding floor layout map (block 3510), the survey handler 2314 (FIG. 23) retrieves and displays an auditor survey (block 3512), and the instructor 2316 (FIG. 23) retrieves and displays full store sweep auditor instructions (block 3514).

The auditor 164 then reviews the instructions (block 3516) and walks to an indicated data collection point (block 3518) such as, for example, the data collection point 406a of FIG. 4. For example, the instructions may inform the auditor 164 of the location of the data collection point 406a and/or may display the reference photograph 502a (FIG. 5) of the first zone (1) 102a corresponding to the data collection point 406a or instruct the auditor 164 to refer to a printed reference card having the reference photograph 502a. In this manner, the auditor 164 can capture photographs of advertising/informational media in the first zone (1) 102a (FIG. 1A) from the same reference point each time the auditor 164 collects compliance data of the retail establishment 100.

The auditor 164 then captures photographic images of advertising/informational media in the first zone (1) 102a (block 3520) and scans universal product codes (UPC's) of any advertisement/informational media in the first zone (1) 102a (block 3522). In some instances, the advertisement/informational media may be promotions displayed in proximity of corresponding products, while in other instances the advertisement/informational media may be displayed at other locations separate from their corresponding products. To collect the universal product codes, the portable auditor device 170 may include a UPC scanner communicatively coupled to the user input interface 2306 of FIG. 23 or the auditor 164 may be provided with a separate UPC scanner to scan the product UPC's. The data associator 2320 (FIG. 23) then associates the universal product codes with a respective one of the zones 102a-h (block 3524) corresponding to the location at which the universal product codes were scanned.

The auditor 164 then determines whether compliance data needs to be collected in another zone (block 3526). For example, if the auditor 164 has not collected compliance data in every zone in the retail establishment 100, the auditor 164 determines that compliance data needs to be collected in a next zone (block 3526) and returns to the operation of block 3518 to walk to the next indicated data collection point (e.g., the data collection point 406b of FIG. 4) (block 3518). The zones of a retail establishment can be located in an interior portion of the retail establishment such as the zones 102a-h of the retail establishment 100 of FIG. 1A. In some example implementations, a retail establishment may also have exterior zones from which the auditor 164 needs to collect compliance data to analyze any advertising/informational media located outside or exposed to the outside (e.g., posters displayed through a window) of the retail establishment.

If the auditor 164 determines that compliance data has been collected for every zone (block 3526), the auditor 164 exits the retail establishment 100 (block 3528) and causes the portable auditor device 170 to communicate the photographic images and the UPC data to the in-store media server 530 (block 3530). For example, the auditor 164 can send a memory card storing the digital photographic images and UPC data to a metering entity, which then transfers the images and UPC data to the in-store media server 530. Alternatively, the auditor 164 can communicate the digital images and the UPC data to the in-store media server 530 via, for example, the data interface 2302 or any other suitable communication interface (e.g., an Internet interface, a radio frequency communication interface, a dial-up connection, etc.). The example process of FIG. 35 then ends.

Figure 36:
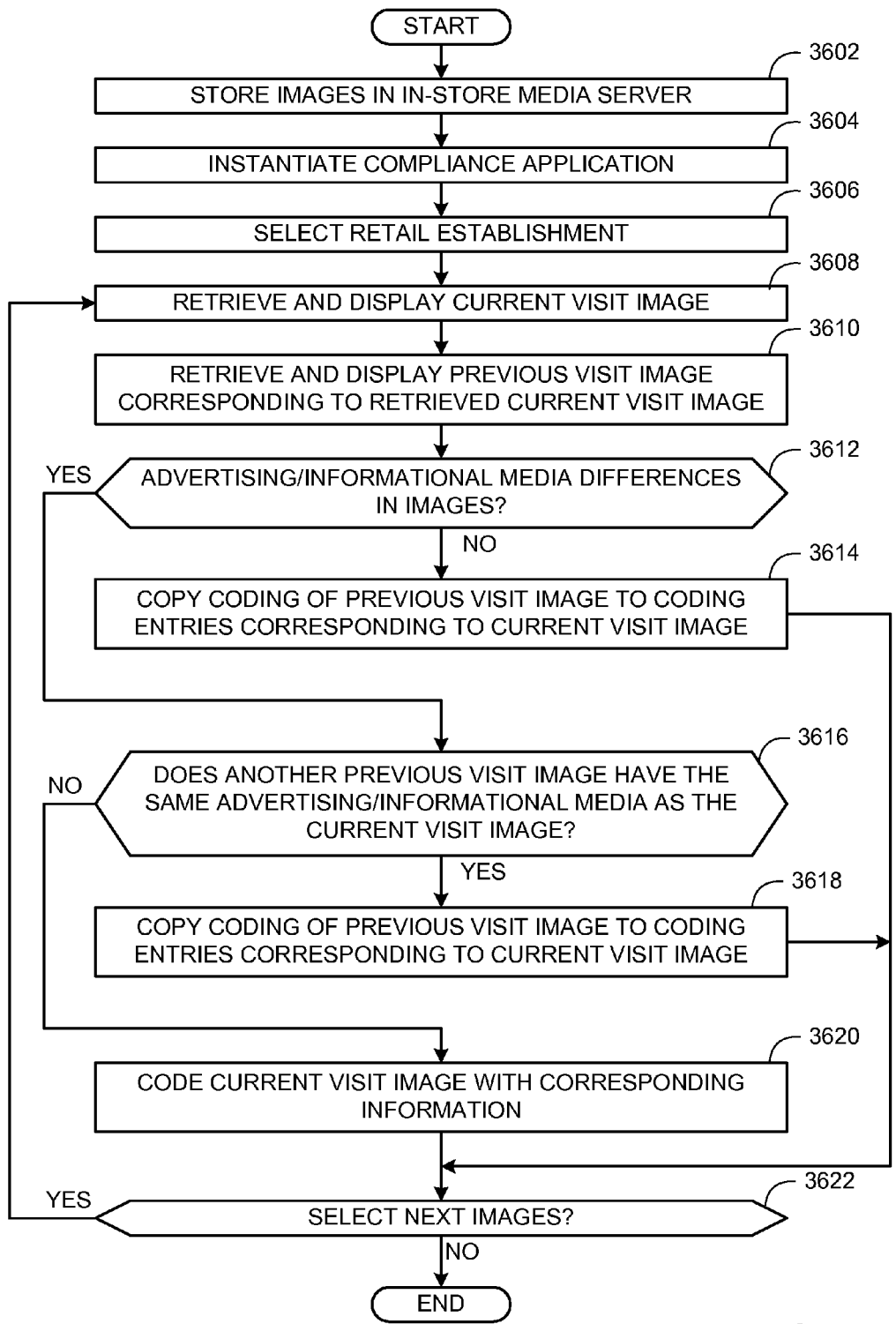
FIG. 36 is a flow diagram of an example method that may be used to code digital photographic images captured in connection with collecting advertising/informational media compliance information.

FIG. 36 is a flow diagram of an example method that may be used to code digital photographic images captured in connection with collecting advertising/information media compliance information. The example method may be used to code photographic images collected using the example method of FIG. 35 and is described in connection with the example apparatus 2200 of FIG. 22. Initially, the photographic images are stored in the in-store media server 530 (FIG. 7) (block 3602). For example, the photographic images communicated to the in-store media server 530 at block 3516 of FIG. 35 can be stored in the in-store media server 530 to be coded as described below. A person performing the coding process then uses a computer coupled to the in-store media server 530 to instantiate the compliance application software program 600 (FIG. 6) (block 3604), and the person selects a retail establishment (block 3606) via, for example, the user input interface 2206 (FIG. 22) using the 'select store' menu 602 (FIG. 6). For example, if the person is going to code photographic images of the retail establishment 100, the person selects an identifier corresponding to the retail establishment 100 via the 'select store' menu 602.

The image handler 2212 (FIG. 12) then retrieves and displays a current visit image (block 3608) in the current visit image window 606 of FIG. 6. The image handler 2212 then retrieves a previous visit image corresponding to the retrieved current visit image and displays the previous visit image (block 3610) in the previous visit image window 604 of FIG. 6. The person then determines whether there are any advertising/informational media differences between the current visit image and the previous visit image (block 3612). For example, the person can analyze and compare the images to find whether any differences exist between the advertising/informational media in the current visit image and the advertising/informational media in the previous visit image such as, for example, fewer, more, or different advertising/informational media. In some example implementations, the compliance application software program 600 may be provided with image recognition operations and the compliance application software program 600 can use the image recognition operations to compare the images. The compliance application software program 600 can then present detected differences in advertising/informational media between the images and the person can elect to ignore or confirm the differences.

If there are no differences in advertising/informational media between the current visit and previous visit images (block 3612), the data associator 2222 (FIG. 22) copies coding (e.g., zone ID, advertising/informational media codes, etc.) from the previous visit image to coding entries corresponding to the current visit image (block 3614). However, if differences are detected in the advertising/informational media between the current visit and previous visit images, the person or the compliance application software program 600 searches through other previous visit images to determine whether any other previous visit image has the same advertising/informational media the current visit image displayed in the current visit image window 606 (block 3616). For example, the previous visit image retrieved at block 3610 may be blurred or may have been captured from a different perspective than the current visit image retrieved at block 3608 so that the advertising/informational media in the current visit image may not be detectable in the previous visit image even though the zone (e.g., one of the zones 102a-h) had the same advertising/informational media from one week to the next. The operation of block 3616 can be performed to determine whether another previous visit image is more suited for comparison with the current visit image.

If another previous visit image is found to have the same advertising/informational media as the current visit image (block 3616), the data associator 2222 (FIG. 22) copies coding (e.g., zone ID, advertising/informational media codes, etc.) from the previous visit image to coding entries corresponding to the current visit image (block 3618). Otherwise, if no other previous visit image is found to have the same advertising/informational media as the current visit image (block 3616), the person codes the current visit image with corresponding zone and advertising/informational media code information (block 3620) via the user input interface 2206 (FIG. 22). For example, the person may select a zone ID from the zone tags drop down list 608 (FIG. 6) and one or more advertising/informational media codes from the media characteristics codes selection control 610. The person or the compliance application software program 600 then determines whether to select another set of images (block 3622). For example, if all of the images for the current visit to the retail establishment 100 have not been coded, then the person or the compliance application software program 600 determines that another set of images should be selected and control returns to block 3608. Otherwise, the example process of FIG. 36 ends.

Figure 37A:
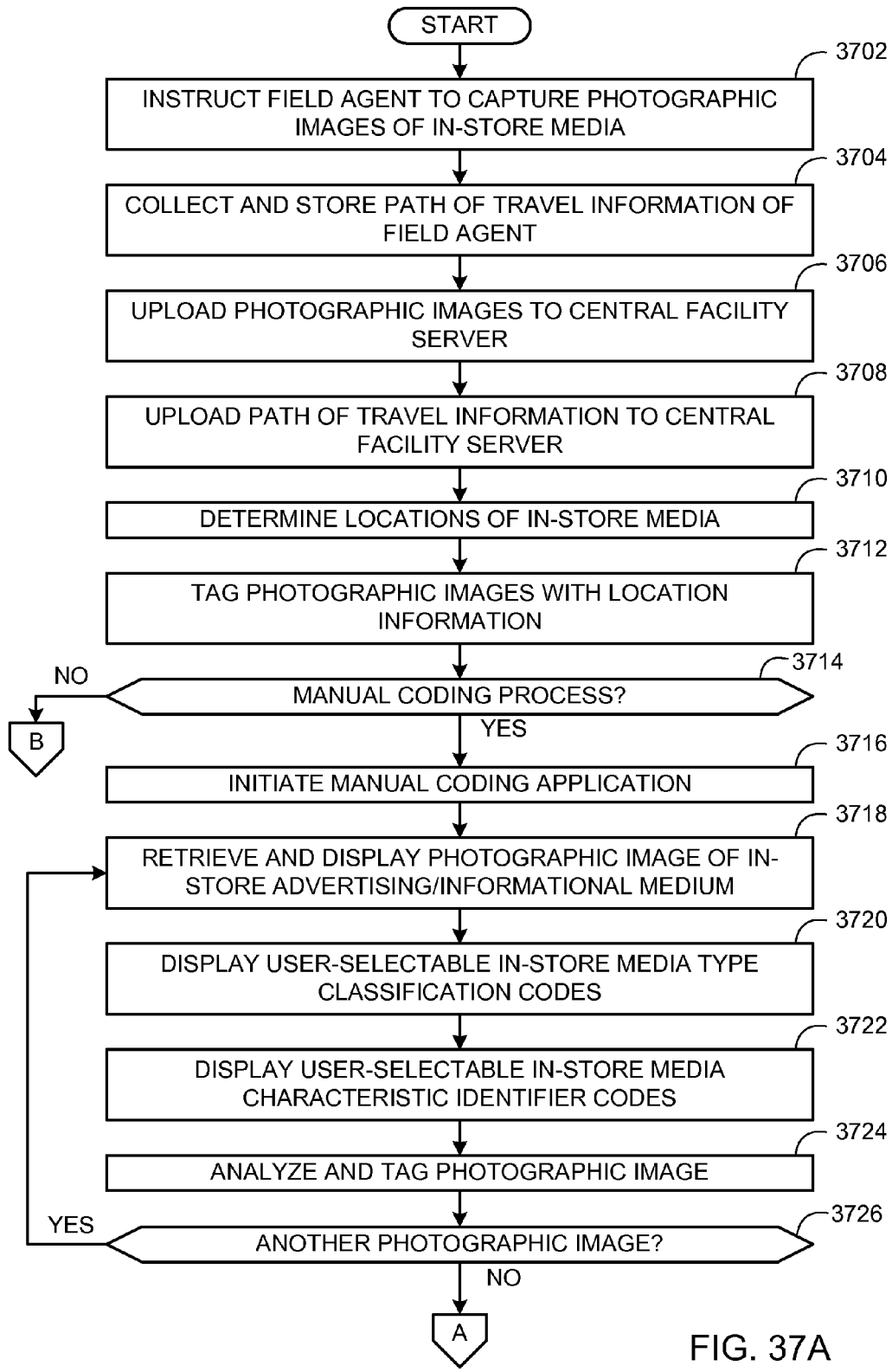
FIGS. 37A and 37B depict a flow diagram of another example method that may be used to survey the retail establishment of FIGS. 1A, 1B, and 4 and code in-store media located therein.

Turning to FIG. 37A, a flow diagram depicts another example method to survey the in-store media 152a-h (FIG. 1B) of the retail establishment 100. The example process of FIG. 37A is used to collect path of travel information associated with the agent 164 to identify locations of in-store media photographed by the agent 164 is described in connection with the example apparatus 2200 of FIG. 22. Initially, a measurement entity instructs the agent 164 to walk through the retail establishment 100 and capture photographic images of the in-store media 152a-h using the digital camera 166 (block 3702). In some example implementations, the measurement entity may instruct the agent 164 to capture all of the photographic images in a consistent manner by, for example, always holding the camera at a certain angle, standing the same distance from each photographed object, etc. to ensure image angle, illumination, and other photographic characteristics are consistent among all of the images to facilitate automated image and/or text recognition of the in-store media 152a-h. The camera 166 can be configured to store timestamp information for each of the digital photographs.

As the agent 164 walks throughout the retail establishment 100, the portable location device 168 works cooperatively with stationary location devices (e.g., the transmitters 158 of FIG. 1) to collect and store path of travel information of the agent 164 (block 3704). The portable location device 168 may be substantially similar or identical to the portable receiver device 154 described above. The portable location device 168 may be configured to work cooperatively with stationary location devices (e.g., the transmitters 158) located throughout the store to collect path of travel information of the agent 164 as the agent 164 walks throughout the retail establishment 100. To generate the path of travel information, the portable location device 168 can be configured to store location points and respective timestamps for each location point.

The agent 164 then uploads the photographic images to the in-store media server 530 (block 3706), and the portable location device 168 or the local server 114 uploads the path of travel information to the in-store media server 530 (block 3708). Location tagging software (executed by, for example, the in-store media server 530) then determines the locations of the in-store media 152a-h (block 3710) by, for example, finding matches between timestamps of the path of travel information and timestamps of the photographic images. The location tagging software then tags the photographic images or a profile associated therewith location information (block 3712) (e.g., location coordinates, location codes, etc.) corresponding to timestamps that matched the timestamps of the photographic images.

If the measurement entity is employing a manual process to identify in-store media in the photographic images (block 3714), a user initiates a manual coding application (block 3716) such as, for example, the compliance application software program 600 of FIG. 6, which may be implemented using the example apparatus 2200 of FIG. 22. The image handler 2212 (FIG. 22) retrieves and displays a photographic image corresponding to one of the in-store media 152a-h (block 3718). The media codes handler 2214 (FIG. 22) displays a listing of user-selectable in-store media type classification codes (block 3720) and a listing of user-selectable in-store media characteristic identifier codes (block 3722). In the illustrated example, the media type classification codes can be presented via, for example, the media characteristics codes selection control 610 (FIG. 6) and are indicative of media type classifications such as, for example, the print media classification and the audio-based media classification described above. In addition, the characteristic identifier codes can be presented via, for example, the media types classification codes selection control 614 (FIG. 6) and are codes used to identify the content of the in-store media and/or other specific characteristics or properties of the media including, for example, advertising agencies, product manufacturers, themes, brands, etc. A single in-store advertisement may be tagged with one or more characteristic identifier codes. For example, an in-store advertisement may be associated with a particular advertising agency identifier code, a particular product manufacturer identifier code, and a particular brand code.

The user then visually analyzes the displayed photographic image and tags the image with an in-store media type classification code and one or more in-store media characteristic identifier codes corresponding to the in-store media represented in the photographic image (block 3724). In the illustrated example, the user can provide selections of zone tag and media coding information via the user input interface 2206 (FIG. 22) and the data associator 2222 (FIG. 22) can associate the user-provided information with the displayed photographic image. If another photographic image remains to be coded (block 3726), control returns to block 3718 and the manual coding application retrieves and displays the next image. Otherwise, the example process of FIGS. 37A and 37B ends.

Figure 37B:
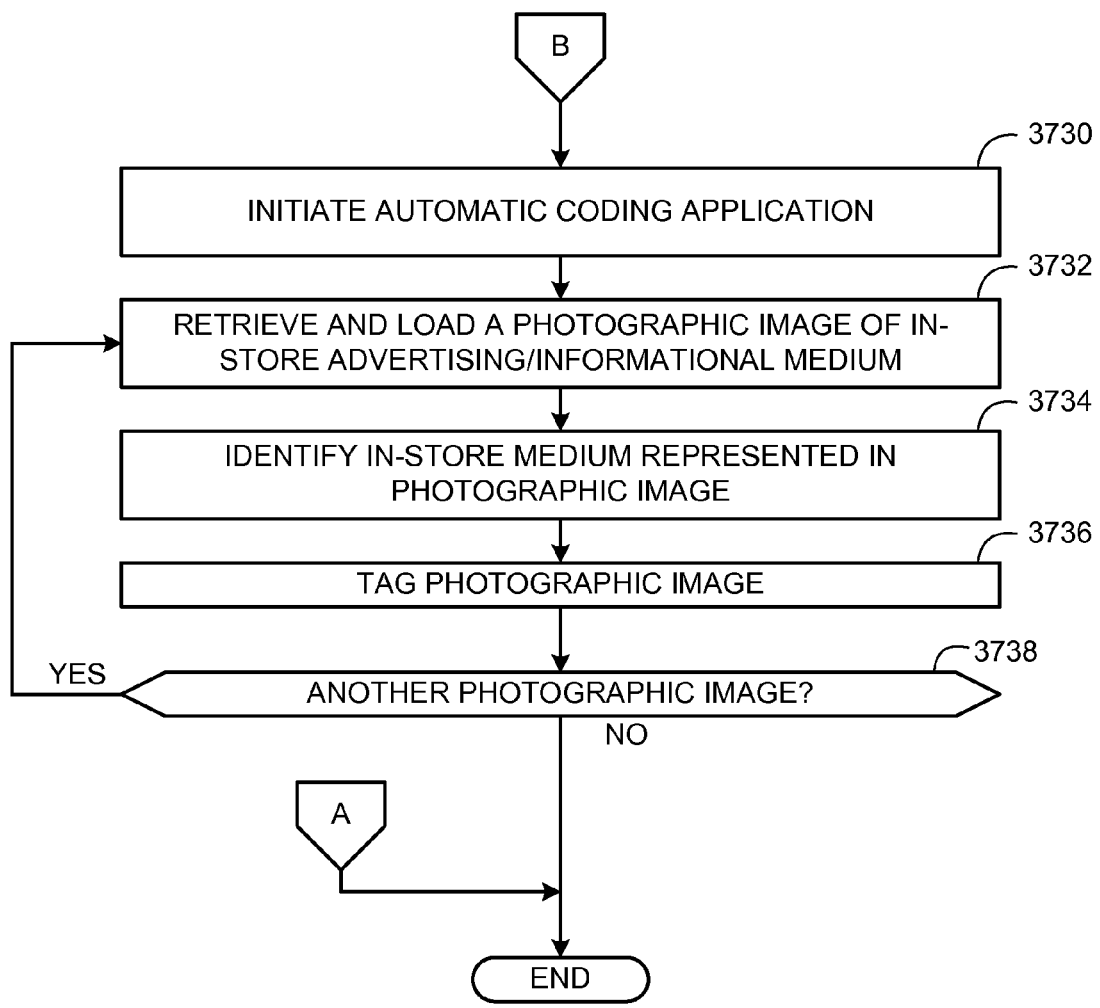

Returning to block 3714, if the in-store media server 530 employs an automated image coding process (block 3714), an automatic coding application is initiated (block 3730) (FIG. 37B). The automatic coding application may be configured to use image and/or text recognition operations to recognize in-store media represented in the photographic images and to code the images with corresponding in-store media type classification codes and in-store media identifier codes. The automatic application retrieves and loads a photographic image (block 3732) and analyzes the photographic image to identify the in-store media represented therein (block 3734) using image recognition and/or text recognition techniques. The automatic coding application then tags the photographic image using the data associator 2222 (FIG. 22) with an in-store media type classification code and one or more in-store media characteristic identifier codes corresponding to the in-store media represented in the photographic image (block 3736). If another photographic image remains to be coded (block 3738), control returns to block 3732 and the automatic coding software application retrieves and displays the next image. Otherwise, the example process of FIG. 37 ends.

Figure 38:
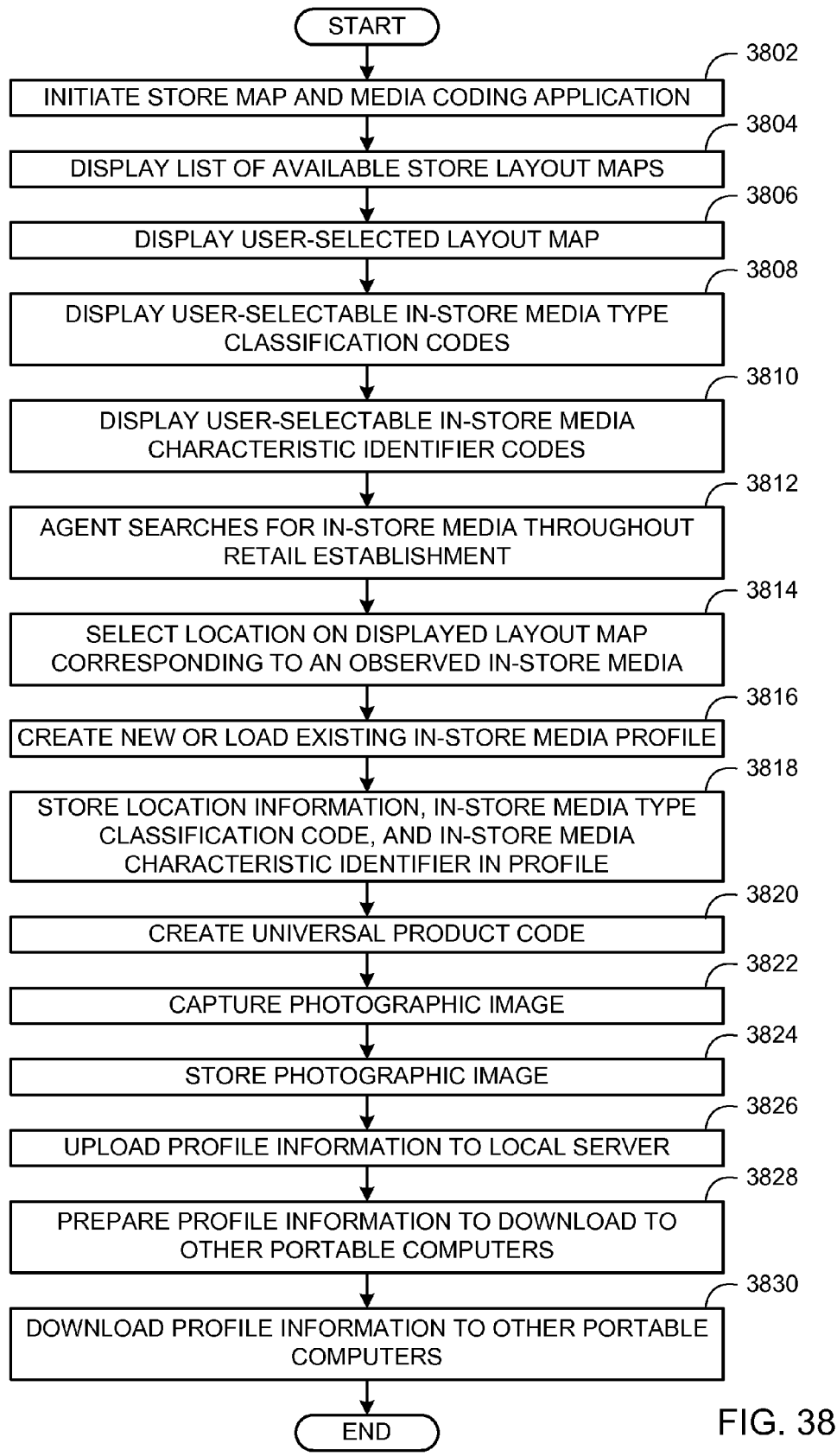
FIG. 38 depicts a flow diagram of another example method that may be used to survey the retail establishment of FIGS. 1A, 1B, and 4 and code in-store media located therein.

Turning to FIG. 38, another example method to survey the in-store media 152*a-h* in the retail establishment 100 is described in connection with the example apparatus 2200 of FIG. 22, which may be implemented using the handheld computer 170 of FIG. 1B. Initially, the agent 164 initiates a store map and media coding application on the handheld computer 170 (block 3802). The map interface 2208 (FIG. 22) then displays a listing of available store layout maps (block 3804) and displays one of the store maps selected by the agent 164 (block 3806). For example, the agent 164 can select a map via the user input interface 2206 (FIG. 22) corresponding to the retail establishment 100. The media codes handler 2214 (FIG. 22) displays a listing of user-selectable in-store media type classification codes (block 3808) and a listing of user-selectable in-store media characteristic identifier codes (block 3810).

The agent 164 then walks through the retail establishment 100 in search of the in-store media 152*a-h* (block 3812). When the agent 164 sees or hears one of the in-store media 152*a-h*, the agent 164 selects a location on the store layout map displayed by the map interface 2208 (block 3814). The selected location is representative of the location of a particular one of the in-store media 152*a-h* within the retail establishment 100. The data associator 2222 (FIG. 22) then creates a new in-store media profile or loads an existing in-store media profile (block 3816) and stores the location information, an in-store media type classification code, and one or more in-store media characteristic identifier codes in the profile (block 3818) corresponding to the in-store medium identified by the agent 164. For example, the agent 164 may select the in-store media type classification code and the in-store media characteristic identifier codes via the user input interface 2206 based on the judgment of the agent 164 when the agent 164 observes or hears the in-store medium.

The universal product code generator 2218 (FIG. 22) then creates a universal product code (UPC) for the profile of the identified in-store medium (block 3820) that can subsequently be printed or encoded onto an identification medium (e.g., a label, an RFID tag, etc.) using the universal product code output interface 2220 (FIG. 22) and placed on (e.g., adhered to) the in-store medium or proximate the in-store medium and that can subsequently be used to identify the in-store medium as described above in connection with the operation of block 3510 of FIG. 35. In the illustrated example, the universal product code can be encoded as a barcode and printed on a barcode label. In other example implementations, the universal product code can be encoded in an RFID label or on any other type of label that can be adhered on or proximate to an in-store medium.

In the illustrated example, the agent 164 captures a photographic image of the identified in-store medium (block 3822). The photographic images captured by the agent 164 can subsequently be used to verify whether the agent 164 correctly classified and identified the in-store media 152*a-h*. In the illustrated example, the data associator 2222 can receive the captured image and store the image in the medium profile of the in-store medium (block 3824). In some example implementations, photographic images of in-store media may be stored separate from media profiles, while in other example implementations photographic images need not be captured. In some example implementations in which the in-store medium is an audio-based medium as described below in connection with FIG. 39, the agent 164 may capture an audio code or an audio signature using the audio detection device 172 at block 3822 and the audio code or signature may be stored in the in-store medium profile by the map and coding software application or by some other application at, for example, the in-store media server 530.

One or more of the operations described above can be repeated one or more times so that the agent 164 can continue to identify and code all of the in-store media 152*a-h* as described above. When the agent 164 finishes identifying and coding all of the in-store media 152*a-h*, the handheld computer 170 uploads the profile information for the in-store media 152*a-h* to the local server 114 (FIG. 1B) (block 3826) via, for example, the data interface 2202 (FIG. 22) or any other suitable communication interface (e.g., an Internet interface, a radio frequency communication interface, a dial-up connection, a memory card, etc.). The local server 114 can subsequently communicate the information to the in-store media server 530 of the measurement entity, and the in-store media server 530 can organize and prepare the profile information to be downloaded to other handheld computers (block 3828). The in-store media server 530 then downloads the profile information to the other handheld computers (block 3830), which are substantially similar or identical to the handheld computer 170 and which can be used by other measurement entity agents to code in-store media in other retail establishments. For example, the measurement entity can employ a fleet of agents having responsibilities similar to those of the agent 164 to classify and code in-store media in various monitored retail establishments. As the agents create profiles for in-store media, those profiles can subsequently be used as quick picks or pre-prepared profiles when agents identify an in-store advertisement similar or identical to another in-store advertisement for which a profile was already created. In this manner, agents can survey retail establishments in less time as more profiles become available. Any one or more of the operations described above in connection with the example process of FIG. 38 can be repeated one or more times before ending the example process.

Figure 39:
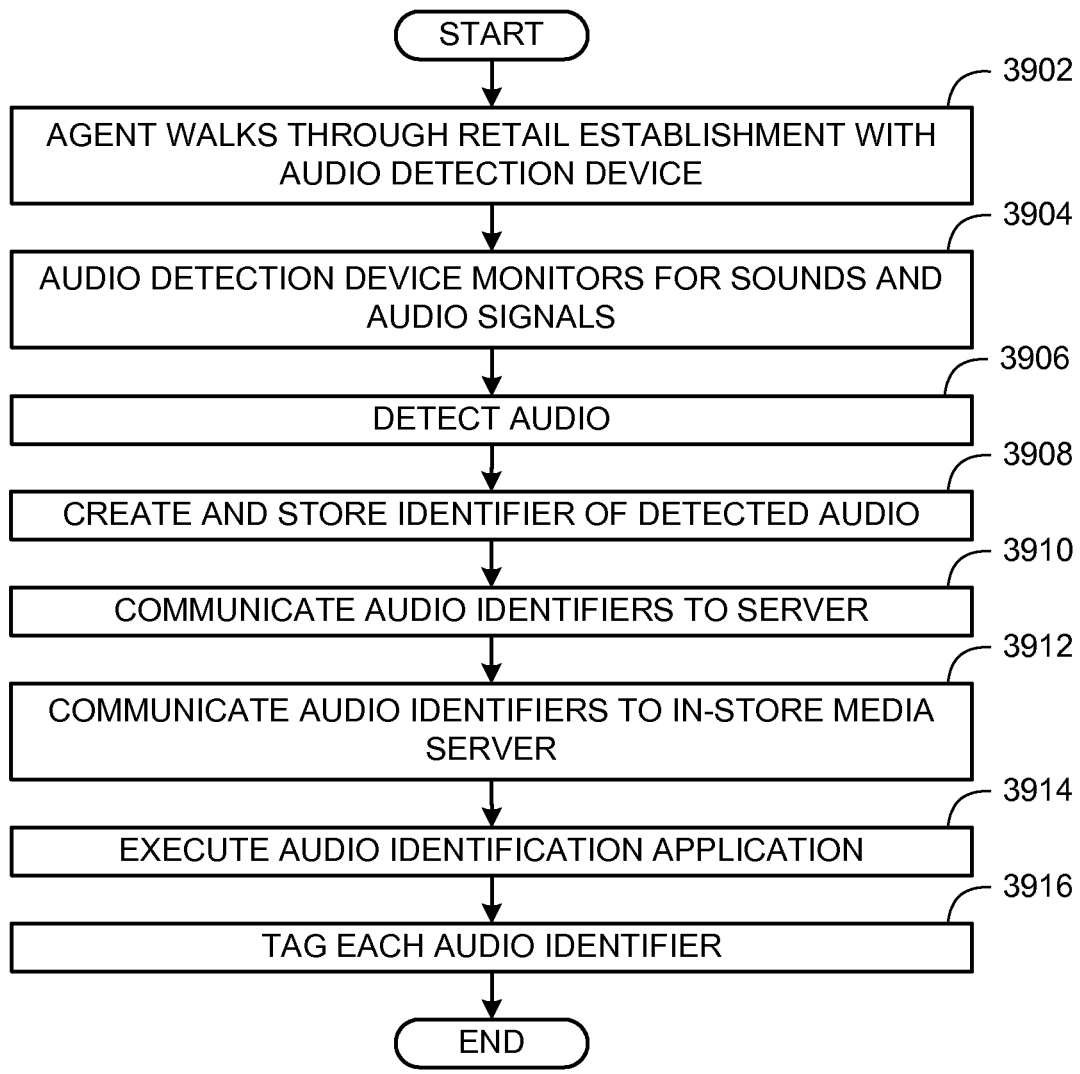
FIG. 39 depicts a flow diagram of an example method that may be used to code audio-based in-store media located in the retail establishment of FIGS. 1A, 1B, and 4.

The flow chart of FIG. 39 depicts an example method that may be used to classify and code audio-based in-store media and may be implemented in combination with the example method of FIG. 37 and/or the example method of FIG. 38. As shown in FIG. 39, the agent 164 walks through the retail establishment 100 with the audio detection device 172 of FIG. 1B (block 3902), and the audio detection device 172 monitors for sounds or audio signals (block 3904). When the audio detection device 172 detects a sound or an audio signal (block 3906), the audio detection device 172 creates and stores an identifier of the detected audio (block 3908). For example, if the detected audio includes ancillary audio codes, the audio detection device 172 can extract and store the audio codes. Otherwise, the audio detection device 172 creates and stores one or more signatures of the detected audio.

When the agent 164 is finished walking through the retail establishment 100, the audio detection device 172 communicates the audio codes and/or signatures to the local server 114 (block 3910), and the local server 114 subsequently communicates the audio codes and/or signatures to the in-store media server 530 (block 3912). The in-store media server 530 can execute an audio identification application that analyzes each audio code and/or signature (block 3914) by, for example, comparing the codes and/or signatures with reference codes and/or reference signatures of known audio-based in-store media. The audio identification application then tags each of the audio codes and/or signatures or a profile associated therewith a corresponding media-type classification code and one or more in-store media characteristic identification codes (block 3916). For example, if the audio identification application is implemented using the example apparatus 2200 of FIG. 22, media representation handler 2216 can analyze the audio code and/or signature at block 3914 and the data associator 2222 can tag each of the audio codes and/or signatures or a profile associated therewith at block 3916). One or more of the operations described above can be repeated one or more times to code the audio codes and/or signatures received at the in-store media server 530 before ending the example process of FIG. 39.

Figure 40:
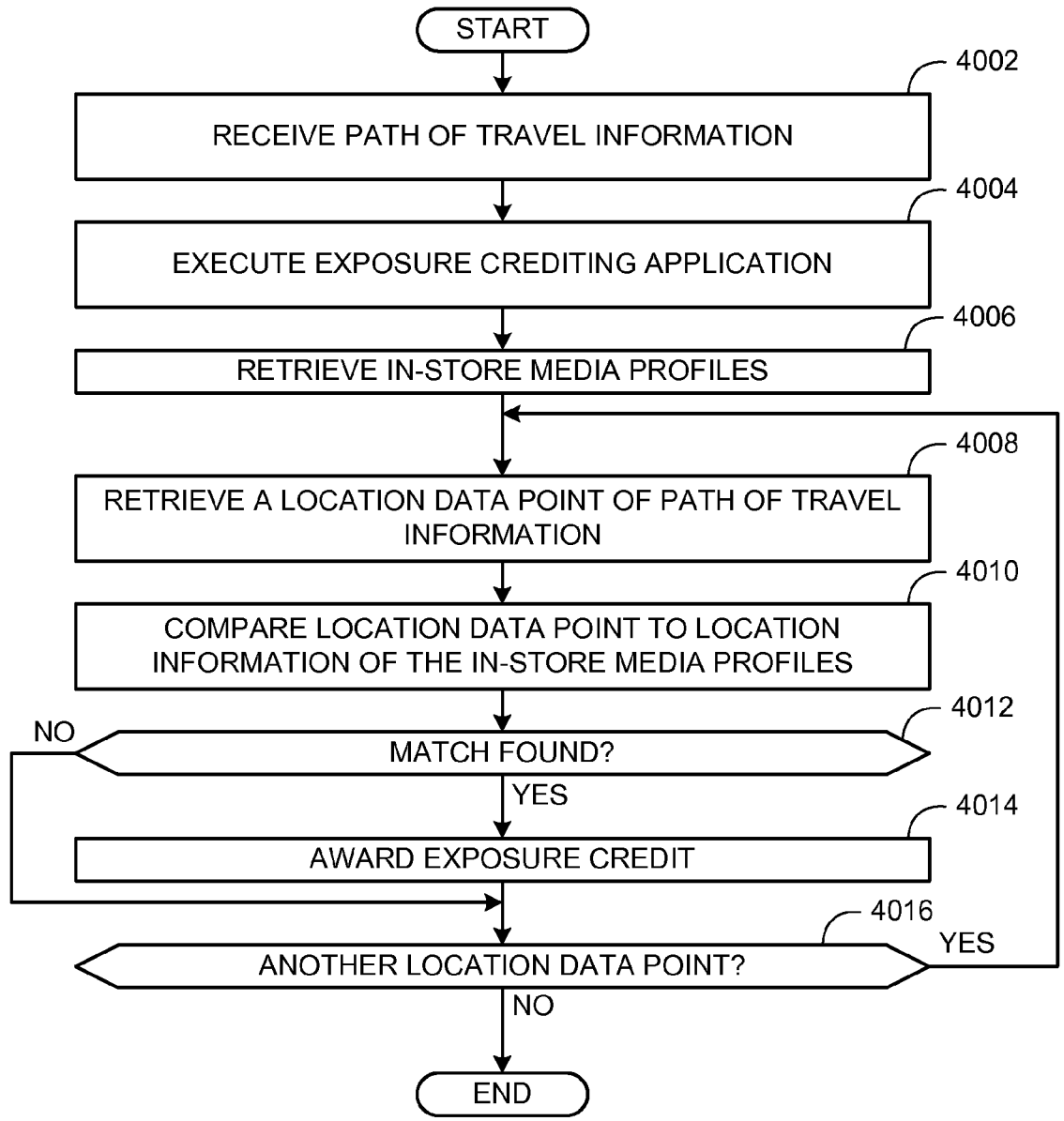
FIG. 40 depicts a flow diagram of an example method that may be used to give exposure credit to in-store media based on path of travel information associated with shoppers that move through the retail establishment of FIGS. 1A, 1B, and 4.

FIG. 40 depicts an example method that can be used to award exposure credit to in-store media based on path of travel information associated with shoppers that move through the retail establishment 100. Initially, the central server 702 (FIG. 7) receives path of travel information from the metering entity data server 706 corresponding to the shopper 156 of FIG. 1B (block 4002). For example, if the central server 702 is used to implement the example apparatus 2200 of FIG. 22, the location data interface 2210 can receive the path of travel information. The server 702 then executes an exposure crediting application (block 4004) configured to award exposure credit to different in-store media when the path of travel information indicates that the shopper 156 was likely exposed to the in-store media. The exposure crediting application then retrieves in-store media profiles (block 4006) corresponding to the retail establishment 100 using, for example, the data interface 2202 of FIG. 22. In the illustrated example, the in-store media profiles are created as described above in connection with the example methods of FIGS. 37-40 and can be stored in, for example, the in-store media server 530 and/or the characteristics server 716 of FIG. 7.

Using the location data interface 2210 (FIG. 22), the exposure crediting application retrieves a location data point from the path of travel information (block 4008) and compares the location data point to location information of the in-store media profiles (block 4010). If a match (or a substantial match within a predetermined distance) is found between the location data point of the path of travel information and location information in one of the in-store media profiles (block 4012), the exposure crediting application awards exposure credit to the in-store medium having the matching location information (block 4014) using the data associator 2222. After the exposure crediting application awards the exposure credit (block 4014) or if none of the profiles have location information that match the selected location data point of the path of travel information (block 4012), the exposure crediting application determines if another location data point of the path of travel information is to be analyzed (block 4016). If another location data point of the path of travel information is to be analyzed, control is passed back to block 4008. Otherwise, the example process of FIG. 40 ends.

Figure 41:
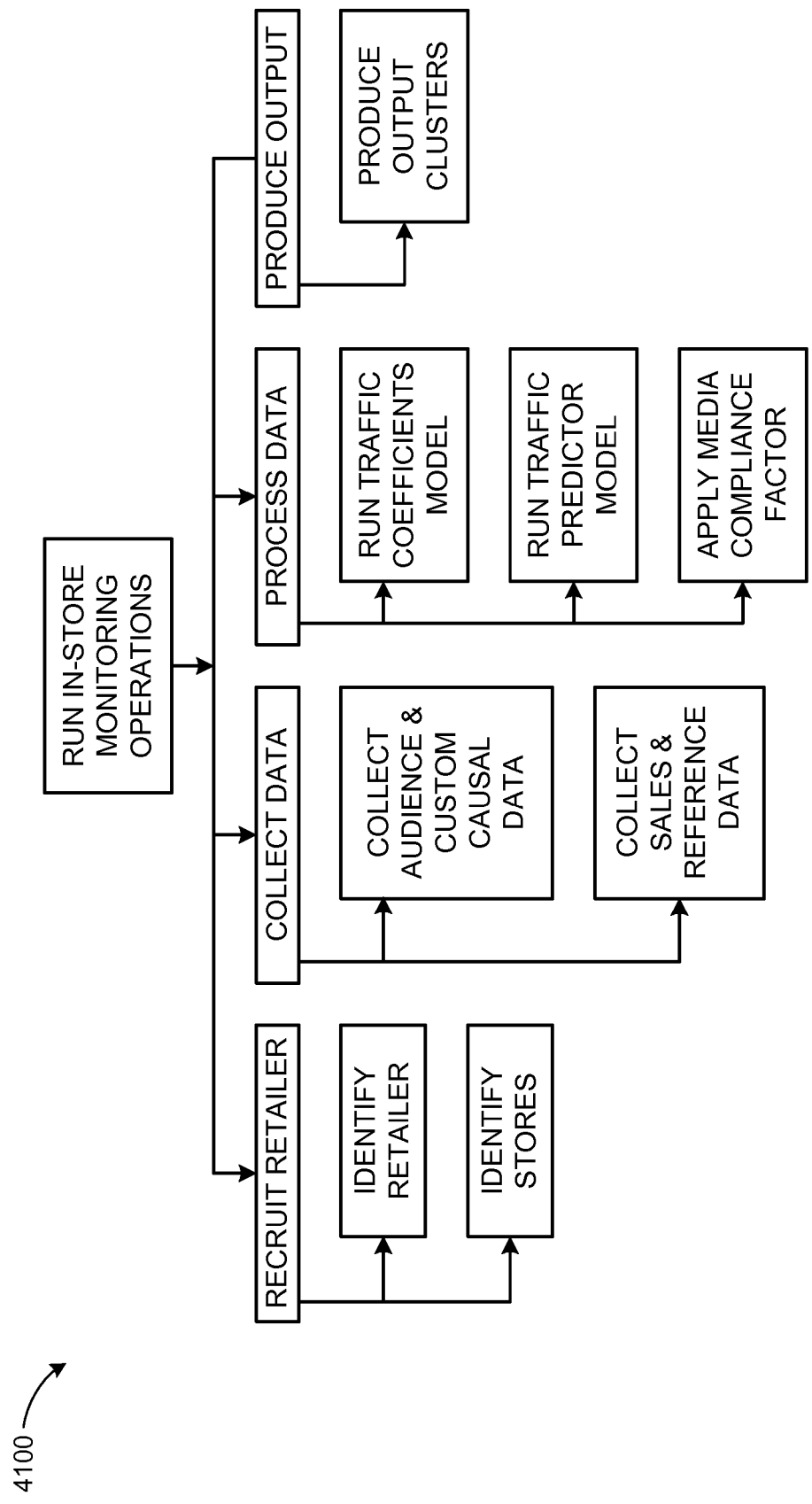
FIG. 41 is an example process hierarchy of the example processes described above in connection with FIGS. 25-40.
Figure 42:
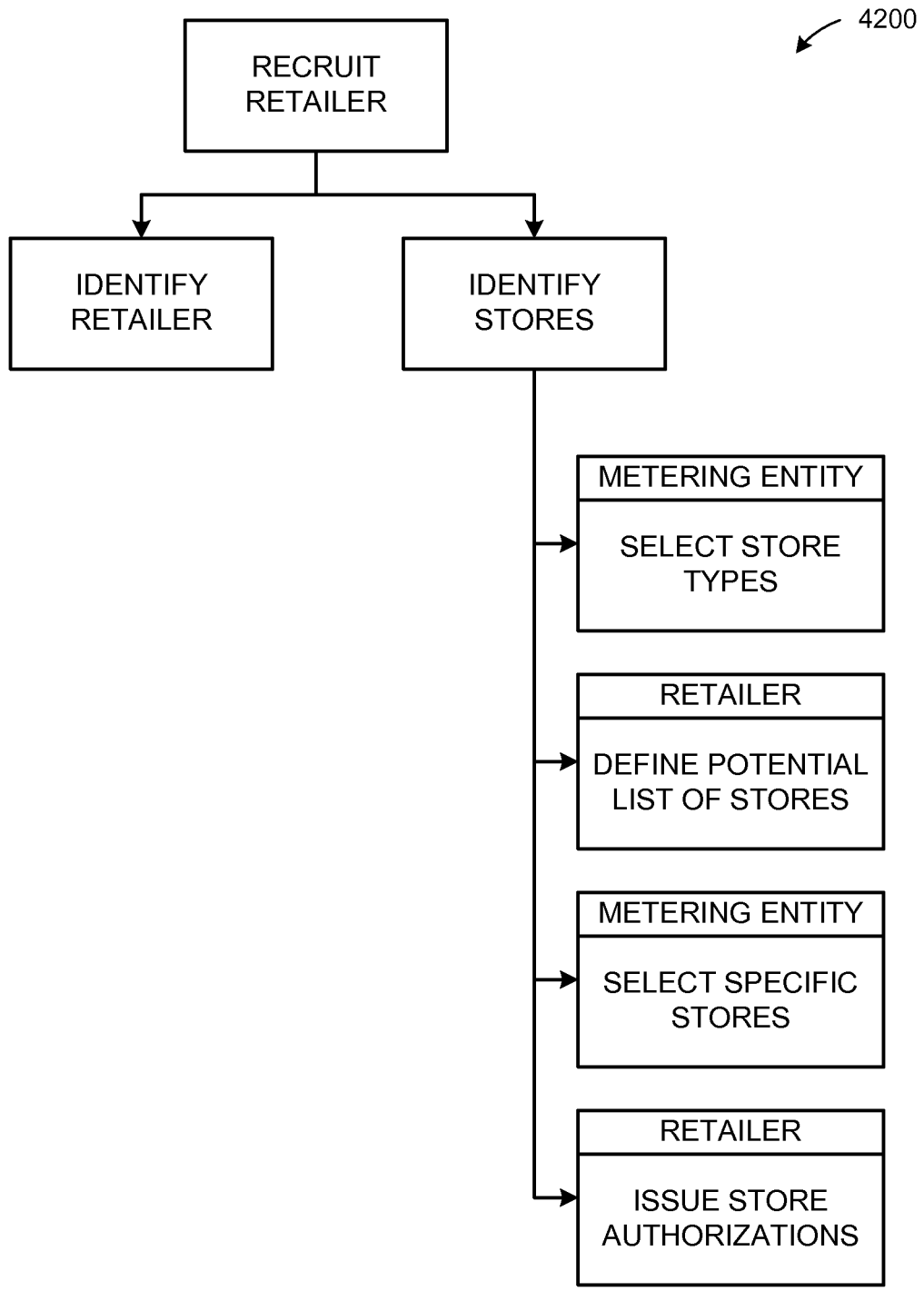
FIG. 42 is an example retailer recruiting sub-process hierarchy of the example process hierarchy of FIG. 41.
Figure 43:
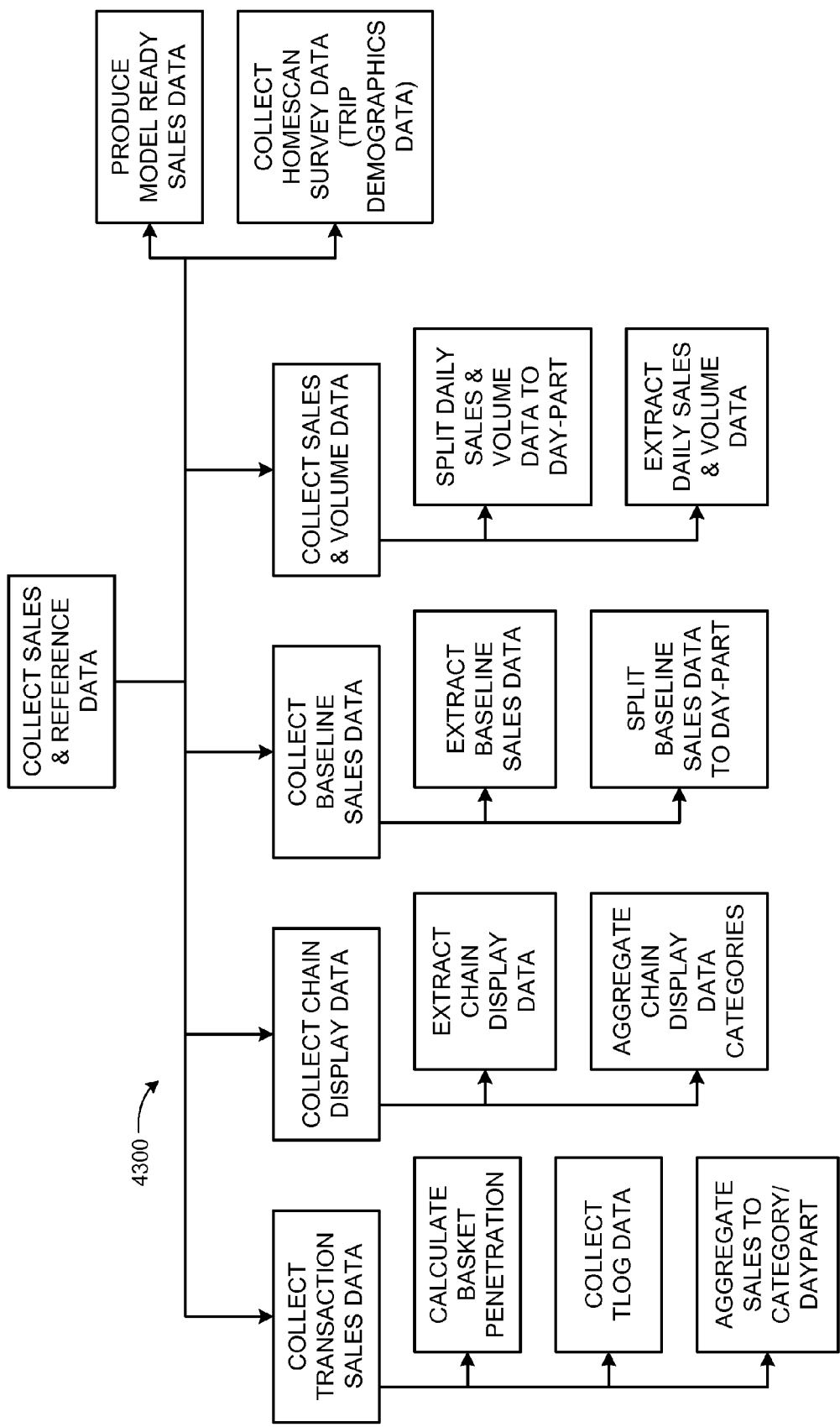
FIG. 43 is an example sales and reference data collection sub-process hierarchy of the example process hierarchy of FIG. 41.
Figure 44A:
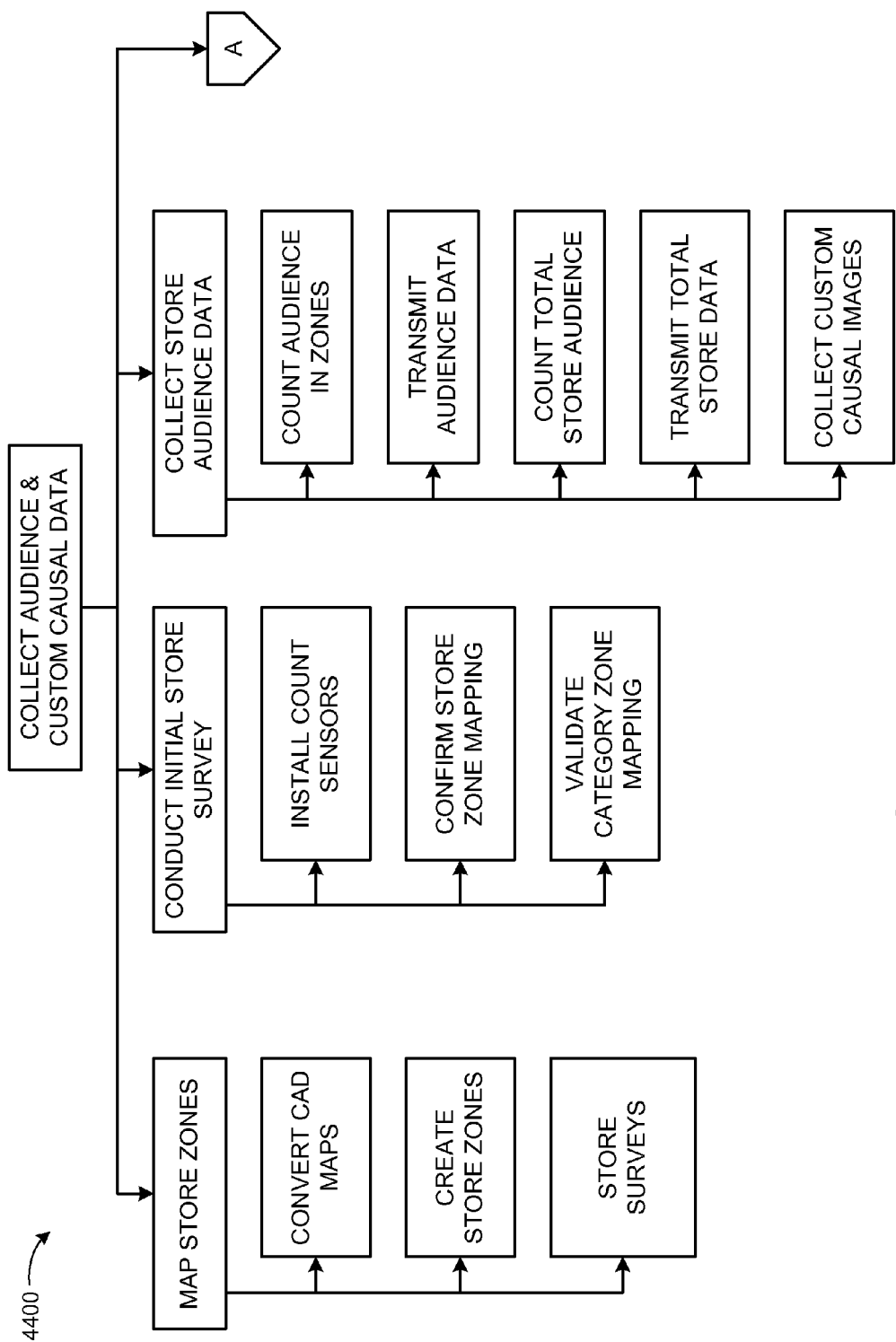
FIGS. 44A and 44B depict an example audience data collection sub-process hierarchy of the example process hierarchy of FIG. 41.
Figure 44B:
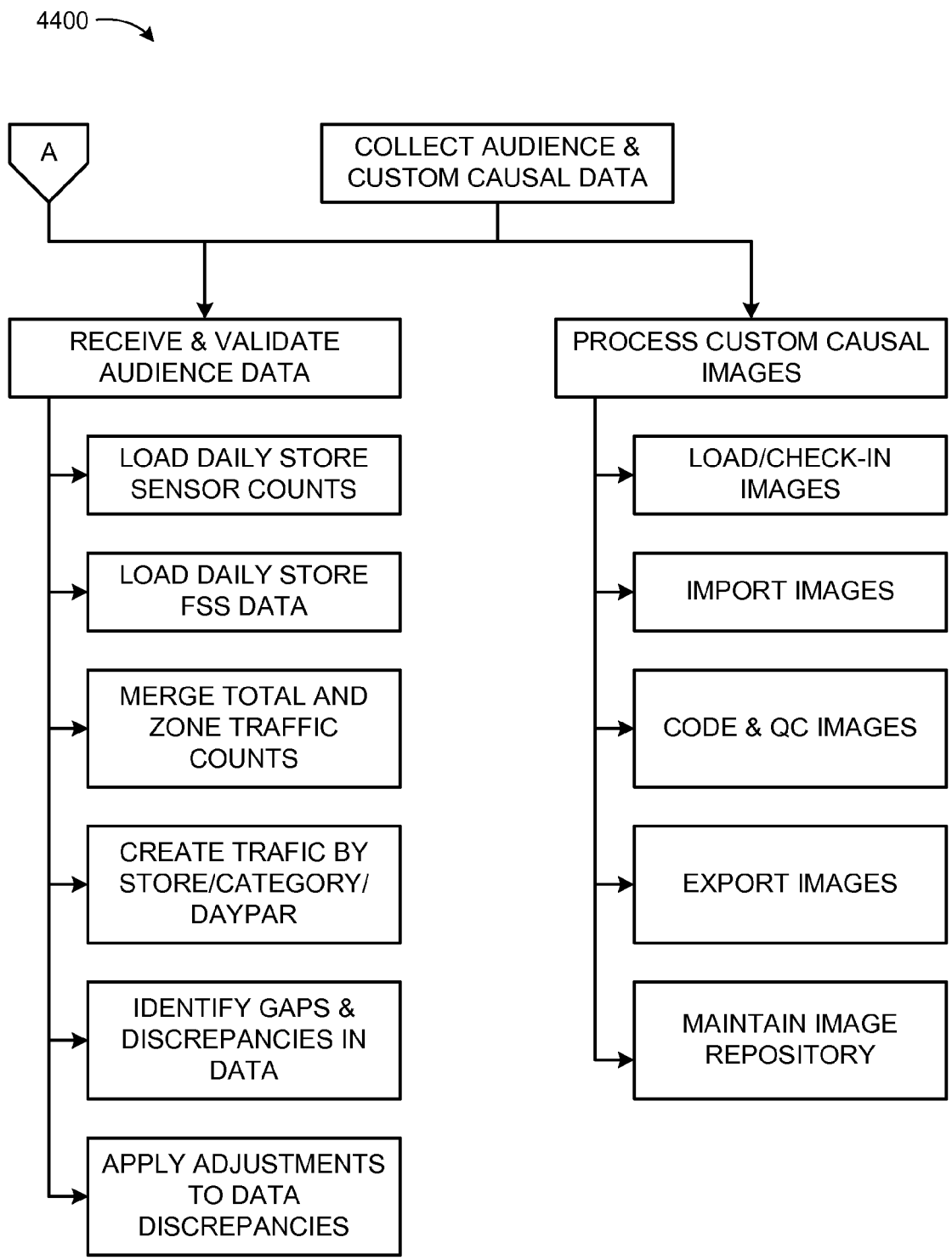

FIG. 41 is an example process hierarchy 4100 of the example processes 2500 described above in connection with FIGS. 25-22. FIG. 42 is an example retailer recruiting sub-process hierarchy 4200 of the example process hierarchy 4100 of FIG. 41. FIG. 43 is an example sales and reference data collection sub-process hierarchy 4300 of the example process hierarchy 4100 of FIG. 41. FIGS. 44A and 44B depict an example audience data collection sub-process hierarchy 4400 of the example process hierarchy 4100 of FIG. 41.

FIG. 45 is a block diagram of an example processor system that may be used to implement some or all of the example methods and apparatus described herein. As shown in FIG. 45, the processor system 4510 includes a processor 4512 that is coupled to an interconnection bus 4514. The processor 4512 includes a register set or register space 4516, which is depicted in FIG. 45 as being entirely on-chip, but which could alternatively be located entirely or partially off-chip and directly coupled to the processor 4512 via dedicated electrical connections and/or via the interconnection bus 4514. The processor 4512 may be any suitable processor, processing unit or microprocessor. Although not shown in FIG. 45, the system 4510 may be a multi-processor system and, thus, may include one or more additional processors that are identical or similar to the processor 4512 and that are communicatively coupled to the interconnection bus 4514.

The processor 4512 of FIG. 45 is coupled to a chipset 4518, which includes a memory controller 4520 and an input/output (I/O) controller 4522. As is well known, a chipset typically provides I/O and memory management functions as well as a plurality of general purpose and/or special purpose registers, timers, etc. that are accessible or used by one or more processors coupled to the chipset 4518. The memory controller 4520 performs functions that enable the processor 4512 (or processors if there are multiple processors) to access a system memory 4524 and a mass storage memory 4525.

The system memory 4524 may include any desired type of volatile and/or non-volatile memory such as, for example, static random access memory (SRAM), dynamic random access memory (DRAM), flash memory, read-only memory (ROM), etc. The mass storage memory 4525 may include any desired type of mass storage device including hard disk drives, optical drives, tape storage devices, etc.

The I/O controller 4522 performs functions that enable the processor 4512 to communicate with peripheral input/output (I/O) devices 4526 and 4528 and a network interface 4530 via an I/O bus 4532. The I/O devices 4526 and 4528 may be any desired type of I/O device such as, for example, a keyboard, a video display or monitor, a mouse, etc. The network interface 4530 may be, for example, an Ethernet device, an asynchronous transfer mode (ATM) device, an 802.11 device, a DSL modem, a cable modem, a cellular modem, etc. that enables the processor system 4510 to communicate with another processor system.

While the memory controller 4520 and the J/O controller 4522 are depicted in FIG. 45 as separate functional blocks within the chipset 4518, the functions performed by these blocks may be integrated within a single semiconductor circuit or may be implemented using two or more separate integrated circuits.

Although the above description refers to the flowcharts as being representative of methods, those methods may be implemented entirely or in part by executing machine readable instructions. Therefore, the flowcharts are representative of methods and machine readable instructions.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:
1. A method, comprising:
  generating a dependent canonical weight coefficient, an independent canonical weight coefficient, and a regression coefficient based on in-person-based shopper count data collected by a person located in a second establishment, and sensor-based shopper count data collected using an electronic detector in the second establishment,
    the dependent canonical weight coefficient to transform shopper count data to generate a shopper traffic variate,
    the independent canonical weight coefficient to transform sales data to generate a sales variate, and the regression coefficient to reduce an amount of error in a best-fit correlation between the shopper traffic variate and the sales variate;

using sales data of a first establishment in which shopper counts are not collected to predict a shopper traffic count based on the dependent canonical weight coefficient, the independent canonical weight coefficient, and the regression coefficient;

receiving information media data indicative of one or more marketing campaigns; and determining, via a processor, an influential effect of the one or more marketing campaigns on the predicted shopper traffic count in the first establishment.

2. A method as defined in claim 1, wherein the dependent canonical weight coefficient, the independent canonical weight coefficient, and the regression coefficient are further based on an auditor count collected by a second person instructed to move between a plurality of areas of the second establishment and count shoppers in the plurality of areas.

3. A method as defined in claim 1, wherein the in-person-based shopper count data and the sensor-based shopper count data are associated with substantially the same set of shoppers in an area of the second establishment.

4. A method as defined in claim 1, wherein the sales data of the first establishment is representative of sales transactions attributable to individual shoppers.

5. A method as defined in claim 1, further comprising determining opportunities for exposure to information media in the first establishment in which shopper counts are not collected, the opportunities for exposure based on advertisements presented in the first establishment from the one or more marketing campaigns.

6. A method as defined in claim 1, wherein predicting the shopper traffic count comprises predicting the shopper traffic count for a first one of a plurality of zones in the first establishment, the in-person-based shopper count data being collected by the person located in a second zone of the second establishment, and the sensor-based shopper count data being collected using the electronic detector in the second zone of the second establishment.

7. A method as defined in claim 6, wherein the first zone of the first establishment and the second zone of the second establishment correspond to the same product category.

8. An apparatus, comprising:
a traffic count calibrator to generate a prediction model comprising a dependent canonical weight coefficient, an independent canonical weight coefficient, and a regression coefficient based on in-person-based shopper count data and sensor-based shopper count data collected in a first establishment to predict a shopper traffic count in a second establishment in which shopper counts are not collected, the in-person-based shopper count data collected by a person located in the first establishment, and the sensor-based shopper count data collected using an electronic detector in the first establishment,
the dependent canonical weight coefficient to transform shopper count data to generate a shopper traffic variate,
the independent canonical weight coefficient to transform sales data to generate a sales variate, and
the regression coefficient to reduce an amount of error in a best-fit correlation between the shopper traffic variate and the sales variate;
a traffic count generator to predict the shopper traffic count for the second establishment based on the prediction model and sales data of the second establishment;
a database to store information media data indicative of one or more marketing campaigns; and
a processor to determine an influential effect of the one or more marketing campaigns on the predicted shopper traffic count in the first establishment.

9. An apparatus as defined in claim 8, wherein the traffic count calibrator is to generate the prediction model based on an auditor count collected by a second person instructed to move between a plurality of areas of the second establishment and count shoppers in the plurality of areas.

10. An apparatus as defined in claim 8, wherein the in-person-based shopper count data and the sensor-based shopper count data are associated with substantially a same set of shoppers in an area of the second establishment.

11. An apparatus as defined in claim 8, wherein the sales data of the second establishment is representative of sales transactions attributable to individual shoppers.

12. An apparatus as defined in claim 8, wherein the database is to store opportunities for exposure to information media in the first establishment in which shopper counts are not collected, the opportunities for exposure based on advertisements presented in the first establishment from the one or more marketing campaigns.

13. An apparatus as defined in claim 8, wherein the in-person-based shopper count data is collected by the person when the person is located in a first one of a plurality of zones of the first establishment, the sensor-based shopper count data being collected by the electronic detector located in the first zone of the first establishment, and the traffic count generator to predict the shopper traffic count for a second zone of the second establishment.

14. An apparatus as defined in claim 13, wherein the first zone of the first establishment corresponds to a same product category as the second zone of the second establishment.

15. A tangible machine accessible memory comprising instructions stored thereon that, when executed cause a machine to at least:
generate a dependent canonical weight coefficient, an independent canonical weight coefficient, and a regression coefficient based on in-person-based shopper count data collected by a person located in a second establishment, and sensor-based shopper count data collected using an electronic detector in the second establishment,
the dependent canonical weight coefficient to transform shopper count data to generate a shopper traffic variate,
the independent canonical weight coefficient to transform sales data to generate a sales variate, and
the regression coefficient to reduce an amount of error in a best-fit correlation between the shopper traffic variate and the sales variate;
use sales data of a first establishment in which shopper counts are not collected to predict a shopper traffic count based on the dependent canonical weight coefficient, the independent canonical weight coefficient, and the regression coefficient;
receive information media data indicative of one or more marketing campaigns; and
determine an influential effect of the one or more marketing campaigns on the predicted shopper traffic count in the first establishment.

16. A machine accessible memory, as defined in claim 15 having instructions stored thereon that, when executed cause the machine to determine the dependent canonical weight coefficient, the independent canonical weight coefficient, and the regression coefficient based on an auditor count collected by a second person instructed to move between a plurality of areas of the second establishment and count shoppers in the plurality of areas.

17. A machine accessible memory, as defined in claim 15, wherein the in-person-based shopper count data and the sensor-based shopper count data are associated with substantially a same set of shoppers in an area of the second establishment.

18. A machine accessible memory, as defined in claim 15, wherein the sales data of the first establishment is representative of sales transactions attributable to individual shoppers.

19. A machine accessible memory, as defined in claim 15 having instructions stored thereon that, when executed, cause the machine to determine opportunities for exposure to information media in the first establishment in which shopper counts are not collected, the opportunities for exposure based on advertisements presented in the first establishment from the one or more marketing campaigns.

20. A machine accessible memory, as defined in claim 15 having instructions stored thereon that, when executed, cause the machine to predict the shopper traffic count by predicting the shopper traffic count for a first one of a plurality of zones in the first establishment, the in-person-based shopper count data being collected by the person located in a second zone of the second establishment, and the sensor-based shopper count data being collected using the electronic detector in the second zone of the second establishment.

21. A machine accessible memory, as defined in claim 20, wherein the first zone of the first establishment and the second zone of the second establishment correspond to the same product category.

\* \* \* \* \*